(12) United States Patent
Iwamatsu et al.

(10) Patent No.: US 6,812,977 B1
(45) Date of Patent: Nov. 2, 2004

(54) LIQUID CRYSTAL ELEMENT

(75) Inventors: Masako Iwamatsu, Toyonaka (JP);
Kenji Nishiguchi, Kawasaki (JP);
Hideaki Ueda, Kishiwada (JP);
Nobuyuki Kobayashi, Kobe (JP);
Fumie Motoori, Ibaraki (JP);
Masakazu Okada, Kyoto (JP);
Mitsuyo Matsumoto, Ibaraki (JP);
Akihito Hisamitsu, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 359 days.

(21) Appl. No.: 09/718,138

(22) Filed: Nov. 21, 2000

(30) Foreign Application Priority Data

Nov. 22, 1999 (JP) .......................................... 11-330763
Nov. 22, 1999 (JP) .......................................... 11-330869
Nov. 22, 1999 (JP) .......................................... 11-332008
Nov. 22, 1999 (JP) .......................................... 11-332013
Nov. 22, 1999 (JP) .......................................... 11-332034

(51) Int. Cl.[7] ............................................. G02F 1/133
(52) U.S. Cl. ......................... 349/73; 349/122; 349/158
(58) Field of Search ........................... 349/73, 74, 122, 349/158

(56) References Cited

U.S. PATENT DOCUMENTS 4,966,442 A * 10/1990 Ono et al. ................... 349/155
5,179,459 A * 1/1993 Plesinger ...................... 349/73
6,133,969 A * 10/2000 Babuka et al. ................ 349/73

FOREIGN PATENT DOCUMENTS

| JP | 08-211399 A | 8/1996 | |
| JP | 08-211399 | * 8/1996 | ......... G02F/1/1343 |
| JP | 08-278508 A | 10/1996 | |
| JP | 10-031210 A | 2/1998 | |
| JP | 11-064895 A | 3/1999 | |
| JP | 11-095246 A | 4/1999 | |

* cited by examiner

*Primary Examiner*—Robert H. Kim
*Assistant Examiner*—P. R. Akkapeddi
(74) *Attorney, Agent, or Firm*—Sidley Austin Brown & Wood LLP

(57) ABSTRACT

A liquid crystal element of a layered type capable of high contrast is provided.

For example, in the liquid crystal element of the layered type including liquid crystal layers b, g and r in this order, each of the liquid crystal layers b, g and r is held between electrode formation surfaces of a pair of substrates each provided with an electrode, an insulating film is disposed between the electrodes of the substrates, and at least two liquid crystal layers of the liquid crystal layers b, g and r have the insulating films opposed to the liquid crystal layers and being different in refractive index from each other, respectively.

5 Claims, 11 Drawing Sheets

LIQUID CRYSTAL ELEMENT

The invention is based on patent application Nos. 11-332034 Pat., 11-330763 Pat., 11-330869 Pat., 11-332008 Pat. and 11-332013 Pat. filed in Japan, the contents of which are hereby incorporated by reference.

BACKGROUND OF THE INVENTION

1. Field of the Invention

The present invention relates to a liquid crystal element, and particularly a liquid crystal element of a layered type including a plurality of liquid crystal layers.

2. Description of the Background Art

A liquid crystal element is basically formed of a pair of substrates and a liquid crystal layer held between the substrates.

A drive voltage is applied to the liquid crystal layer to control orientation of liquid crystal molecules so that incoming light is modulated to perform intended display or the like.

For monochrome display of images, the element usually employs a single layer of liquid crystal. For display in multiple colors, a plurality of liquid crystal layers each capable of display in an intended color are layered to form the liquid crystal element of the layered type.

A liquid crystal element of a reflection type, which utilizes selective reflection of the liquid crystal exhibiting a cholesteric phase, may be used for full color display. This liquid crystal element has a layered structure including, for example, three liquid crystal layers, which are layered together, and perform display in blue, green and red, respectively.

For good image display, the liquid crystal element or the layered type liquid crystal element is required to achieve high-contrast and bright display and others.

For achieving such a requirement, various proposals have been made. However, it is still required or desired to improve the contrast and others of the liquid crystal elements, and particularly the liquid crystal elements of the layered type which have been proposed.

For example, light passing though the respective liquid crystal layers may cause multiple reflection. Also, the light passing through the respective liquid crystal layers may unnecessarily scatter. The influence of the multiple reflection and/or the unnecessary scattering may lower the contrast in the image display.

In the liquid crystal element of the layered type, which includes the plurality of liquid crystal elements adhered and layered together, an adhesive material (adhesive layer) for adhering the neighboring liquid crystal elements together may scatter the light, resulting in low contrast.

If the liquid crystal element uses a resin film substrate, interference of light may occur in a wavelength range from red light to infrared rays and/or unnecessary scattering of light may occur. These may lower the brightness and contrast in image display. In the structure using the resin film substrate, the thickness thereof may be minimized so that light modulation characteristics such as display characteristics may not be impaired. However, such a thin substrate may cause disadvantages such as bending of the liquid crystal element and/or breakage of an electrode. These disadvantages are particularly remarkable in the liquid crystal element of the layered type.

Further, a certain kind of liquid crystal element uses an orientation film for controlling orientation of the liquid crystal within the liquid crystal layer. The orientation film is provided, for example, for inclining the liquid crystal molecules at a predetermined angle with respect to an orientation film surface (substrate surface). The angle at which the orientation film inclines the liquid crystal molecules with respect to the substrate surface is referred to as a "pretilt angle". The orientation film is utilized also for the purpose of orientating the liquid crystal molecules in a predetermined direction. By effecting rubbing on the orientation film, the liquid crystal molecules can be orientated in the rubbing direction. The orientation film described above is arranged between the liquid crystal layer and the substrate, and is in contact with the liquid crystal in the liquid crystal layer.

It can be considered that the orientation film described above affects the contrast of the liquid crystal element, and particularly the liquid crystal element of the layered type.

SUMMARY OF THE INVENTION

An object of the invention is to provide a liquid crystal element as well as a liquid crystal element of a layered type, which have improved contrast.

Another object of the invention is to provide a liquid crystal element of a layered type, which can suppress an influence by multiple reflection and unnecessary scattering, and can have improved contrast.

Still another object of the invention is to provide a liquid crystal element of a layered type, which can perform bright image display.

Yet another object of the invention is to provide a liquid crystal element of a layered type, which can perform bright image display with a low voltage drive (low power consumption).

Further another object of the invention is to provide a liquid crystal element and a liquid crystal element of a layered type, which can perform bright image display with good contrast.

A further object of the invention is to provide a liquid crystal element of a layered type, which can achieve bright image display with a low voltage drive (low power consumption) as well as with good contrast.

A further object of the invention is to provide a liquid crystal element of a layered type, which can perform improved white-display.

A further object of the invention is to provide a liquid crystal element of a layered type, which can perform image display with a good color balance.

A further object of the invention is to provide a liquid crystal element of a layered type which includes a plurality of liquid crystal elements layered and adhered together, and particularly the liquid crystal element which can suppress scattering of light due to an adhesive layer adhering the neighboring liquid crystal elements, and thereby can achieve good contrast.

A further object of the invention is to provide a liquid crystal element and a liquid crystal element of a layered type, which can achieve high contrast, and can suppress problems such as bending of the liquid crystal element and breakage of an electrode.

A further object of the invention is to provide a liquid crystal element and a liquid crystal element of a layered type, which can ensure good electrical conductivity of electrodes.

A further object of the invention is to provide a liquid crystal element of a layered type, which is provided with a plurality of liquid crystal layers layered together as well as orientation films for the respective liquid crystal layers, and can achieve good contrast.

First, the invention provides the following first to third liquid crystal elements.

(1) First Liquid Crystal Element

A liquid crystal element of a layered type including a plurality of liquid crystal layers, wherein each of the liquid crystal layers is held between electrode formation surfaces of a pair of substrates each provided with an electrode, an insulating film is disposed between each of the liquid crystal layers and the electrode on at least one of the paired substrates holding the layer, and at least two liquid crystal layers of the plurality of liquid crystal layers have the insulating films opposed to the liquid crystal layers and being different in refractive index from each other, respectively.

(2) Second Liquid Crystal Element

A liquid crystal element of a layered type including a plurality of liquid crystal layers, wherein each of the liquid crystal layers is held between electrode formation surfaces of a pair of substrates each provided with an electrode, an insulating film is disposed between each of the liquid crystal layers and the electrode on at least one of the paired substrates holding the layer, and at least two liquid crystal layers of the plurality of liquid crystal layers have the insulating films opposed to the liquid crystal layers and being different in kind from each other, respectively.

(3) Third Liquid Crystal Element

A liquid crystal element of a layered type including a plurality of liquid crystal layers, wherein each of the liquid crystal layers is held between electrode formation surfaces of a pair of substrates each provided with an electrode, an insulating film is disposed between each of the liquid crystal layers and the electrode on at least one of the paired substrates holding the layer, and the insulating film opposed to the liquid crystal layer at an outermost position on an element observation side has a refractive index larger than a refractive index of the insulating film opposed to the neighboring liquid crystal layer.

The invention also provides the following fourth liquid crystal element.

(4) Fourth Liquid Crystal Element

A liquid crystal element of a layered type including a plurality of liquid crystal layers, wherein at least one of the liquid crystal layers has a thickness different from those of the other liquid crystal layers, and the liquid crystal layer at an outermost position on a side remote from an element observation side has a thickness equal to or larger than that of any one of the liquid crystal layers on the element observation side, and contains a liquid crystal material having a refractive index anisotropy value equal to or larger than that of any one of liquid crystal materials contained in the liquid crystal layers on the element observation side.

The invention also provides the following fifth liquid crystal element.

(5) Fifth Liquid Crystal Element

A liquid crystal element of a layered type including a plurality of liquid crystal elements layered and adhered together, wherein each of the liquid crystal elements has a pair of substrates and a liquid crystal layer held between the substrates, and an adhesive layer disposed between the neighboring substrates of the neighboring liquid crystal elements for adhering the neighboring liquid crystal elements has a thickness not exceeding a quarter of a thickness of at least one of the neighboring substrates.

According to the study by the inventors, the following has been found in connection with a liquid crystal element having a liquid crystal layer and a pair of resin films each provided with an electrode and holding the liquid crystal layer therebetween. In this liquid crystal element, at least one of the opposite electrodes, which is located on the observation side, may have a relatively large thickness for increasing the influence by the film characteristics of this electrode, and thereby the interference of light in the wavelength range from the red light to the infrared rays is reduced in each liquid crystal layer. Further, a good electrical conductivity can be ensured in the electrode. Moreover, the electrode may have a thickness of a predetermined value or less, whereby the bending of the substrate is prevented while keeping the foregoing characteristics, which facilitates manufacturing of the element, and prevents breakage of an electrode. Other effects can also be achieved. For example, a thin resin film substrate can be used without difficulty, which contributes to improvement of the display characteristics.

By increasing the refractive index of the resin film substrate, the difference in refractive index between the substrate and the electrode formed thereon decreases so that unnecessary scattering of light passing therethrough is suppressed.

Based on the knowledge described above, the invention provides the following sixth to eighth liquid crystal elements.

(6) Sixth Liquid Crystal Element

A liquid crystal element of a layered type including a plurality of liquid crystal layers, wherein each of the liquid crystal layers is held between a pair of resin films each carrying an electrode, and at least the electrode on an element observation side has a thickness from 1200 Å to 1500 Å and a surface resistance of 200 ohm/square (200Ω/□) or less.

(7) Seventh Liquid Crystal Element

A liquid crystal element of a layered type including a plurality of liquid crystal layers, wherein each of the liquid crystal layers is held between a pair of resin films each carrying an electrode, and at least the resin film substrate on an element observation side has a thickness from 50 μm to 200 μm and a refractive index of 1.58 or more, and carries the electrode having a thickness from 1200 Å to 1500 Å and a surface resistance of 200 ohm/square (200Ω/□) or less.

(8) Eighth Liquid Crystal Element

A liquid crystal element, wherein a pair of resin film substrates each carrying an electrode hold a liquid crystal layer exhibiting a cholesteric phase therebetween, and at least the electrode formed on the substrate on an element observation side has a thickness from 1200 Å to 1500 Å and a surface resistance of 200 ohm/square (200Ω/□) or less.

Further, the invention provides the following ninth liquid crystal element.

(9) Ninth Liquid Crystal Element

A liquid crystal element of a layered type including a plurality of liquid crystal layers, wherein each of the liquid crystal layers is held between a pair of substrates, an orientation film is disposed between each of the liquid crystal layers and at least one of the paired substrates holding the liquid crystal layer, the orientation film opposed to at least one of the liquid crystal layers has a pretilt angle different from those of the orientation films opposed to the other liquid crystal layers, the orientation film opposed to the liquid crystal layer disposed nearest to an element observation side has the pretilt angle equal to or larger than the pretilt angles of the orientation films opposed to the other liquid crystal layers.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
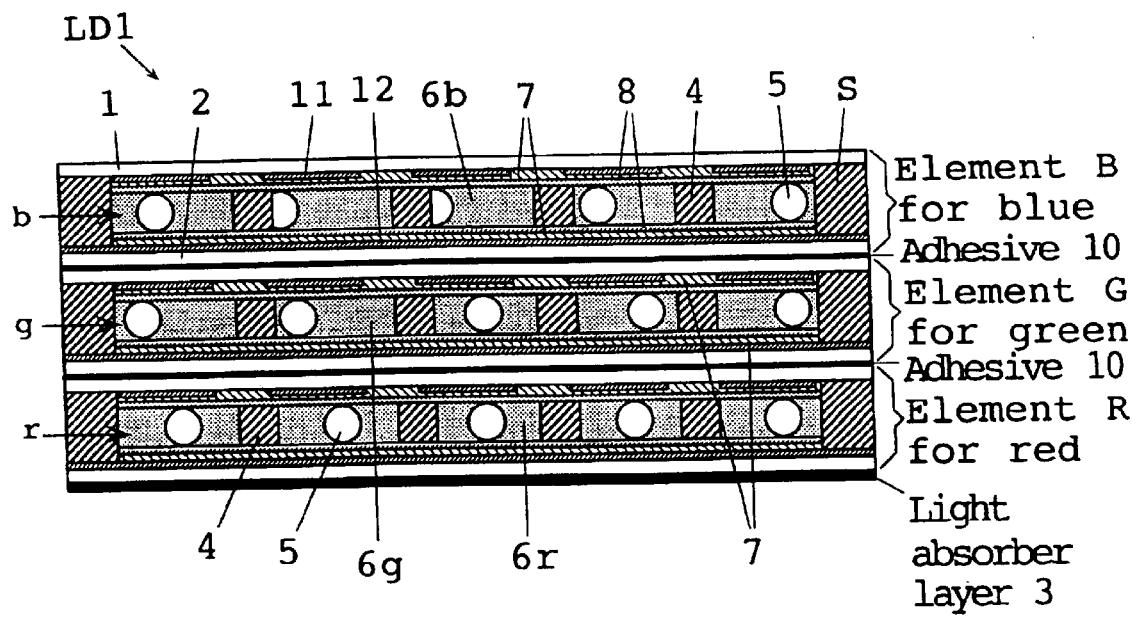
FIG. 1 is a schematic cross section of an example of a liquid crystal element of a layered type according to the invention.

The invention provides the following first to third liquid crystal elements as preferred embodiments.

(1) First Liquid Crystal Element

A liquid crystal element of a layered type including a plurality of liquid crystal layers, wherein each of the liquid crystal layers is held between electrode formation surfaces of a pair of substrates each provided with an electrode, an insulating film is disposed between each of the liquid crystal layers and the electrode on at least one of the paired substrates holding the layer, and at least two liquid crystal layers of the plurality of liquid crystal layers have the insulating films opposed to the liquid crystal layers and being different in refractive index from each other, respectively.

(2) Second Liquid Crystal Element

A liquid crystal element of a layered type including a plurality of liquid crystal layers, wherein each of the liquid crystal layers is held between electrode formation surfaces of a pair of substrates each provided with an electrode, an insulating film is disposed between each of the liquid crystal layers and the electrode on at least one of the paired substrates holding the layer, and at least two liquid crystal layers of the plurality of liquid crystal layers have the insulating films opposed to the liquid crystal layers and being different in kind from each other, respectively.

(3) Third Liquid Crystal Element

A liquid crystal element of a layered type including a plurality of liquid crystal layers, wherein each of the liquid crystal layers is held between electrode formation surfaces of a pair of substrates each provided with an electrode, an insulating film is disposed between each of the liquid crystal layers and the electrode on at least one of the paired substrates holding the layer, and the insulating film opposed to the liquid crystal layer at an outermost position on an element observation side has a refractive index larger than a refractive index of the insulating film opposed to the neighboring liquid crystal layer.

The liquid crystal element of the layered type described above are suitable to image display with intended contrast in the case where the liquid crystal element is of a reflection type.

In any one of the liquid crystal elements of the layered type described above, each liquid crystal layer may contain a liquid crystal material exhibiting a cholesteric phase.

According to the study by the inventors, the followings are known. The layered type liquid crystal element of the reflection type, which uses a liquid crystal material exhibiting, e.g., a cholesteric phase, has refractive index anisotropy. Therefore, when a part of light coming from the element observer side is reflected by any one of the liquid crystal layers in accordance with the control of orientation of liquid crystal molecules in the respective liquid crystal layers, multiple reflection occurs, and the reflected light is scattered when returning to the element observation side. The light passes through the respective liquid crystal layers in accordance with the control of orientation of liquid crystal molecules, and the light thus passed through the layers scatters when it returns to the element observation side after being reflected by a background color layer or film, which is arranged on the outer side of the outermost liquid crystal layer remote from the observation side.

The multiple reflection by the liquid crystal layer and the scattering of the light returned therethrough impede clear display, which is to be performed with the light reflected by the liquid crystal layer in a deeper position (i.e., position remoter from the observation side).

It can be considered that the contrast and therefore the display quality are low in the liquid crystal element of the layered type due to the above reasons. According to the study by the inventors, the refractive indexes of the liquid crystal layer nearest to the observation side and the liquid crystal layer neighboring thereto significantly affect the scattering of the returned light, and also affect the clarity of display by the liquid crystal layer on a deeper position.

According to the first to third liquid crystal elements of the layered type described above, each element includes a plurality of liquid crystal layers. Each liquid crystal layer is held between the paired substrates each carrying the electrode, and the insulating film is disposed between the electrode of at least one of the substrates and the liquid crystal layer. In the first liquid crystal element of the layered type, the plurality of liquid crystal layers include at least two liquid crystal layers opposed to the insulating films having different refractive indexes, respectively. The second liquid crystal element of the layered type includes at least two liquid crystal layers opposed to the insulating films of different kinds, respectively.

As described above, each of the first and second liquid crystal elements of the layered type includes at least two liquid crystal layers having the insulating films opposed to the liquid crystal layers, respectively, and these insulating films have different refractivities, or are of different types, respectively. These structures are advantageous in improvement of contrast. As the most typical example, the structure of the third liquid crystal element of the layered type can be employed. In this structure, the insulating film opposed to the liquid crystal layer at the outermost position on the element observation side has a larger refractive index than the insulating film opposed to the neighboring liquid crystal layer.

According to the third liquid crystal element of the layered type, since the insulating film opposed to the liquid crystal layer at the outermost position on the element observation side has a larger refractive index than the insulating film opposed to the neighboring liquid crystal layer, unnecessary scattering is suppressed. Such a situation is also suppressed that the influence of multiple reflection is exerted from the liquid crystal layer in the outermost position on the element observation side to the liquid crystal layer in the position remote from the element observation side. Since the influence of the multiple reflection and the unnecessary scattering can be suppressed, the contrast in image display can be improved.

According to the third liquid crystal element of the layered type, the insulating film opposed to the liquid crystal layer at the outermost position on the element observation side has a refractive index different from that of the insulating film opposed to the neighboring liquid crystal layer, and for achieving this difference, the insulating film opposed to the liquid crystal layer at the outermost position on the element observation side may be made of a material different from that of the insulating film opposed to the neighboring liquid crystal layer. A difference in refractive index, which is present between the insulating film opposed to the liquid crystal layer at the outermost position on the element observation side and the insulating film opposed to the neighboring liquid crystal layer, may be preferably in a range from about 0.15 to about 0.4, and more preferably in a range from about 0.15 to about 0.3.

The insulating film opposed to each liquid crystal layer may be made of an inorganic insulating material such as silicon oxide, titanium oxide or zirconium oxide, or may be made of an organic insulating material such as polyimide resin, epoxy resin, acrylic resin or silicone resin.

From the viewpoint of suppressing unnecessary scattering of light, it is desired that a large difference in refractive index is not present between the insulating film opposed to each liquid crystal layer and the material of substrates holding the same liquid crystal layer. Accordingly, the refractive index of the insulating film is preferably in a range from about 1.4 to about 1.8, although this range depends on the refractive index of the material of the substrate holding the liquid crystal layer with the insulating film therebetween.

In a typical example of the foregoing structures, the liquid crystal layers may be three or more in number. In this case, the insulating film(s) opposed to the liquid crystal layer(s) in the third and subsequent positions viewed from the observation side may have the refractive index(es) larger than that of the insulating film opposed to the liquid crystal layer at the second position viewed from the observation side. Full color display can be performed by employing at least the three liquid crystal layers performing the display in blue, green and red, respectively.

The invention also provides the following fourth liquid crystal element as another preferred embodiment.

(4) Fourth Liquid Crystal Element

A liquid crystal element of a layered type including a plurality of liquid crystal layers, wherein at least one of the liquid crystal layers has a thickness different from those of the other liquid crystal layers, and the liquid crystal layer at an outermost position on a side remote from an element observation side has a thickness equal to or larger than that of any one of the liquid crystal layers on the element observation side, and contains a liquid crystal material having a refractive index anisotropy value equal to or larger than that of any one of liquid crystal materials contained in the liquid crystal layers on the element observation side.

The fourth liquid crystal element of the layered type is suitable to the liquid crystal element of the reflection type for performing image display with desired brightness.

According to the fourth liquid crystal element of the layered type, the liquid crystal layer in the outermost position remote from the element observation side may not sufficiently receive the external light coming from the element observation side, and may not sufficiently reflect the light toward the element observation side. This liquid crystal layer in the outermost position has a thickness equal to or larger than the other liquid crystal layers. Besides, at least one of the plurality of liquid crystal layers has a thickness different from those of the other liquid crystal layers. In other words, at least one of the liquid crystal layers other than the liquid crystal layer in the outermost position remote from the element observation side has a smaller thickness than the liquid crystal layer in the outermost position remote from the element observation side. As described above, the liquid crystal layer in the outermost position remote from the element observation side has the sufficiently large thickness compared with the other liquid crystal layers. Accordingly, the liquid crystal layer can exhibit a large reflectivity. Further, the liquid crystal layer in the outermost position remote from the element observation side is made of the liquid crystal material having the refractive index anisotropy value equal to or larger than that of any one of liquid crystal materials in the other liquid crystal layers on the element observation side. Therefore, the liquid crystal element of the layered type can perform the bright display as a whole.

At least one of the liquid crystal layers other than the liquid crystal layer in the outermost position remote from the element observation side has a smaller thickness than the outermost liquid crystal layer. Therefore, the drive voltage for this thin liquid crystal layer requires only a low drive voltage, and thus bright display can be performed or the drive voltage of the whole liquid crystal layer of the layered type can be low.

The liquid crystal layer in the outermost position remote from the element observation side may contain the liquid crystal material having the refractive index anisotropy value of 0.17 or more for achieving bright display. The upper limit thereof may be about 0.30 or about 0.28 in view of, e.g., availability of the liquid crystal material.

The refractive index anisotropy value of the liquid crystal material contained in the liquid crystal layer can be controlled, e.g., by changing the composition and/or composition ratio.

As components causing scattering in image display increases in amount, the contrast lowers so that the scattering components adversely affecting the contrast may be suppressed by the following configuration.

In connection with the neighboring liquid crystal layers, a difference of about 0–0.03, and more preferably of about 0–0.01 may be present in refractive index anisotropy value between the liquid crystal material contained in the liquid crystal layer on the element observation side and the liquid crystal material contained in the liquid crystal layer remote from the element observation side.

A difference of about 0–0.04, and more preferably of about 0–0.02 may be present in refractive index anisotropy value between the liquid crystal material contained in the outermost liquid crystal layer on the element observation side and the liquid crystal material contained in the outermost liquid crystal material remote from the element observation side. In other words, a value of about 0–0.04, and more preferably of 0–0.02 may be obtained by subtracting (the refractive index anisotropy value of the liquid crystal material contained in the outermost liquid crystal layer on the element observation side) from (the refractive index anisotropy value of the liquid crystal material contained in the outermost liquid crystal layer remote from the element observation side).

In an example, the liquid crystal layers may have different thicknesses, which successively increase as the position move from the element observation side to the side remote from the element observation side. In another example, the liquid crystal layer in the outermost position remote from the element observation side has the maximum thickness, and the thicknesses of the other liquid crystal layers are smaller than the maximum thickness and substantially equal from each other.

As a typical example of the foregoing structures, the liquid crystal layers layered together may be three or more in number. If this structure is employed in the liquid crystal element of the layered type, e.g., utilizing the selective reflection of the cholesteric liquid crystal, full color display by additive color mixture can be performed by employing the liquid crystal layers, which perform the display in blue, green and red, respectively.

Any one of the foregoing liquid crystal elements of the layered type may be intended to achieve a transparent state and, for example, may be provided with a black layer, which is located on the side remotest from the observation side of the liquid crystal element of the layered type. In this structure, it is preferable to achieve high transparency (degree of black, if to be displayed), good contrast and low voltage drive. Also, it is preferable to avoid excessive increase in reflectance, which may impede white display, and to allow good white display. In this case, the maximum thickness among those of the plurality of liquid crystal layers may be 7 µm or less.

Each liquid crystal layer may contain the liquid crystal material exhibiting the cholesteric phase. In this case, the outermost liquid crystal layer remote from the element observation side may be the liquid crystal layer for the red display, and may contain the liquid crystal material having a selective reflection wavelength of 650 nm–690 nm for achieving a good color balance in image display. The outermost liquid crystal layer on the observation side may be the liquid crystal layer for blue display, and may contain the liquid crystal material having the selective reflection wavelength of 460 nm–500 nm.

The selective reflection wavelength of such a red display liquid crystal layer is slightly shifted toward the shorter side from that of a general liquid crystal layer for the red display. The degree of this shift can be controlled, for example, in the structure employing a liquid crystal composition made of chiral nematic liquid crystal as the liquid crystal material. This control can be performed by increasing the amount of a chiral material added to nematic liquid crystal, or by using a chiral material having a large optical rotary power.

The selective reflection wavelength of the blue display liquid crystal layer is slightly shifted toward the longer side from that of a general liquid crystal layer for blue display. The degree of this shift can be controlled, for example, in the structure employing a liquid crystal composition made of chiral nematic liquid crystal as the liquid crystal material. This control can be performed by decreasing the amount of the chiral material added to nematic liquid crystal, or by using the chiral material having a small optical rotary power.

It is not preferable that the blue display liquid crystal layer has the selective reflection wavelength exceeding 500 nm because the wavelength exceeding 500 nm tends to cause green display to a certain extent.

Any one of the foregoing structures may employ a liquid crystal layer containing an ultraviolet absorber agent for reducing scattering components on the observation side in image display, and thereby improving the black display quality and contrast. In this case, the content of the ultraviolet absorber agent may be equal to 0.1%–5% by weight. If it were smaller than 0.1% by weight, it would be difficult to achieve the effect of suppressing occurrence of the scattering compositions. If it were larger than 5% by weight, the solubility with respect to the liquid crystal would be deteriorated, and deterioration in characteristics due to deposition of crystals might be caused.

The invention also provides the following fifth liquid crystal element as another preferred embodiment.

(5) Fifth Liquid Crystal Element

A liquid crystal element of a layered type including a plurality of liquid crystal elements layered and adhered together, wherein each of the liquid crystal elements has a pair of substrates and a liquid crystal layer held between the substrates, and an adhesive layer disposed between the neighboring substrates of the neighboring liquid crystal elements for adhering the neighboring liquid crystal elements has a thickness not exceeding a quarter of a thickness of at least one of the neighboring substrates.

The fifth liquid crystal element of the layered type can be utilized, e.g., as a display element of a reflection type.

The fifth liquid crystal element of the layered type has the plurality of liquid crystal elements (liquid crystal cells) layered together.

Each liquid crystal element has the liquid crystal layer containing liquid crystal material (liquid crystal composition), and the liquid crystal layer is held between the pair of substrates.

The substrate may be a resin substrate made of resin such as polyether sulfone (PES), polycarbonate (PC), polyethylene terephthalate or polyarylate (PA). The substrate may be a resin film substrate. The substrate may be a glass substrate. An electrode is arranged on each substrate for applying a voltage to liquid crystal in the liquid crystal layer. If necessary, an insulating layer, orientation film, gas barrier layer and/or filter layer may be arranged on each substrate.

The liquid crystal layer may include a spacer for adjusting a thickness of liquid crystal (liquid crystal layer), and/or a resin structure for adhering the opposite substrates holding the liquid crystal layer therebetween and/or increasing a strength of the whole liquid crystal element. The liquid crystal layer may be of a liquid crystal composite layer of a so-called polymer-dispersed type. The liquid crystal composite film of the polymer-dispersed type may be configured such that liquid crystal is dispersed within a three-dimensional mesh structure of the polymer, or that the three-dimensional structure of polymer is formed in the liquid crystal.

The fifth liquid crystal element of the layered type may include three or more liquid crystal elements (liquid crystal cells) layered together. The liquid crystal element of the layered type may be formed of three liquid crystal elements, i.e., a liquid crystal element (red liquid crystal element) containing a liquid crystal layer having a selective reflection wavelength in a red region, a liquid crystal element (green liquid crystal element) containing a liquid crystal layer having a selective reflection wavelength in a green region and a liquid crystal element (blue liquid crystal element) containing a liquid crystal layer having a selective reflection wavelength in a blue region. The liquid crystal element of the layered type including the three, i.e., red, green and blue liquid crystal elements can be utilized as a color liquid crystal display element of a reflection type.

In the fifth liquid crystal element of the layered type, the neighboring liquid crystal elements are adhered together by an adhesive material such as an adhesive, double-side adhesive tape or the like. The adhesive layer, which is arranged between the neighboring substrates (i.e., the substrates on the element observation side and the side remote from the element observation side) in the neighboring liquid crystal elements for adhering the neighboring liquid crystal elements, may be an adhesive material, and may further include a spacer for adjusting the thickness of the adhesive layer, providing a uniform gap between the neighboring liquid crystal elements and/or keeping the neighboring liquid crystal elements in parallel with each other. Typically, the adhesive layer may be translucent (preferably, transparent).

According to the fifth liquid crystal element of the layered type, the adhesive layer for adhering the neighboring liquid crystal elements has the thickness equal to or lower than a quarter of the thickness of at least one substrate of the neighboring substrates in the neighboring elements. The thickness of the adhesive layer is equal to or lower than a quarter of the thickness of at least one substrate of the neighboring substrates as described above, and is equal to or larger than a value required for adhering the neighboring liquid crystal elements. Preferably, the thickness of the adhesive layer is equal to or lower than a quarter of the thickness of the thinner one between the neighboring substrates. The thickness of the adhesive layer affects the degree of light scattering caused by the adhesive layer itself. The adhesive layer of a smaller thickness scatters the light only to a smaller extent, and has a high transparency. As will be described in connection with the experimental results, the adhesive layer having the thickness equal to or smaller than a quarter of the thickness of the substrate can effectively suppress the scattering of light compared with the adhesive layer having the thickness larger than a quarter of the thickness of the substrate. If the adhesive layer is excessively thick compared with the substrate, it is difficult to ensure an intended flatness of the substrate (particularly, the resin film substrate).

In the case where the fifth liquid crystal element of the layered type is utilized as a display element of a reflection type, it is possible to suppress the scattering of light by the adhesive layer as described above, and therefore the whole liquid crystal element of the layered type can have improved transparency and improved display contrast when the liquid crystal in each liquid crystal layer is in a transparent state.

If the substrates of the respective liquid crystal elements may have different thicknesses, or the paired substrates may have different thicknesses, it is recommended that the adhesive layer has the thickness equal to or smaller than a quarter of the thickness of the thinnest substrate.

The thickness of substrate may be in a range from 50 $\mu$m to 250 $\mu$m in view of the suppression of scattering of light by the substrate itself, the strength of the liquid crystal element and others, although not restricted thereto. The adhesive layer may have the thickness of 30 $\mu$m or less, although it depends on the thickness of the substrate.

If the fifth liquid crystal element of the layered type includes the two or more adhesive layers, it is merely required that at least one of the adhesive layers has the thickness equal to or smaller than a quarter of the foregoing thickness of the substrate. In the case where the fifth liquid crystal element of the layered type is utilized as the display element of the reflection type, such a structure may be employed that only the adhesive layer, which is nearest to the observation side and therefore may exert the largest influence, has the thickness equal to or smaller than a quarter of the thickness of the substrate. Naturally, it is preferable that all the adhesive layers have thicknesses each equal to or smaller than a quarter of the thickness of the substrate, in view of contrast and others.

The liquid crystal (liquid crystal composition) in the liquid crystal layer may be a liquid crystal composition including liquid crystal exhibiting the cholesteric phase (e.g., liquid crystal exhibiting the cholesteric phase in the room temperature). The liquid crystal composition in the liquid crystal layer may contain dye(s) added thereto. The liquid crystal exhibiting the cholesteric phase selectively reflects the light of the wavelength corresponding to the helical pitch of the liquid crystal. Therefore, the liquid crystal element containing such liquid crystal can be utilized as the liquid crystal element of the reflection type. The liquid crystal exhibiting the cholesteric phase may be, e.g., cholesteric liquid crystal which exhibit the cholesteric phase by itself, or chiral nematic liquid crystal formed of nematic liquid crystal and a chiral material added thereto. The chiral nematic liquid crystal has such an advantage that the helical pitch thereof can be adjusted in accordance with an amount of the added chiral material, and thereby the selective reflection wavelength can be easily adjusted. The helical pitch is a pitch of a helical structure of the liquid crystal molecules, and is a distance between molecules in the state where the liquid crystal molecules turn 360 degrees in accordance with the helical structure of the liquid crystal molecules. The selective reflection wavelength can be set, e.g., in a visible light range or invisible light range (e.g., infrared range).

The nematic liquid crystal has such a structure that rod-like liquid crystal molecules are parallel to each other, but does not have a layered structure. Various kinds of nematic liquid crystal can be used without particular restriction. In particular, ester compound exhibiting liquid crystal property, pyrimidine compound exhibiting liquid crystal property, cyanobiphenyl compound exhibiting liquid crystal property, cyanophenyl cyclohexane compound exhibiting liquid crystal property, cyano terphenyl compound exhibiting liquid crystal property, difluoro stilbene compound exhibiting liquid crystal property or tolane compound exhibiting liquid crystal property may be used. The nematic liquid crystal containing such a compound exhibiting liquid crystal property having a polar group can be effectively used because it can increase the dielectric anisotropy of the chiral nematic liquid crystal composition. The nematic liquid crystal may be a mixture of two or more kinds of compounds exhibiting liquid crystal property. The nematic liquid crystal may contain a liquid crystal component(s) other than the above compound, and more specifically may contain, e.g., a polycyclic compound or N-type compound for raising a temperature of phase transition to isotropy.

The chiral material is an additive having a function of twisting molecules of the nematic liquid crystal. Addition of the chiral material to the nematic liquid crystal produces the spiral structure of liquid crystal molecules having a twist distance corresponding to the amount of the additive. As a result, the liquid crystal composition formed of the nematic liquid crystal and the chiral material added thereto can exhibit the cholesteric phase.

The chiral material may be a material containing at least one kind of compound having at least one kind of symmetric carbon, and the helical senses (the directions of twist applied to the liquid crystal) may be uniform or different. The addition rate of the chiral material with respect to the nematic liquid crystal is preferably equal to about 45% or less by weight, and is more preferably equal to about 40% or less by weight. If the addition rate were larger than 45% by weight, disadvantages such as deposition of crystal would be liable to occur. The lower limit of the addition rate of the chiral material is preferably 10% or more by weight, although not restricted if an intended effect can be achieved.

Several kinds of chiral materials may be added to the nematic liquid crystal. Several kinds of chiral materials which are added to the nematic liquid crystal may have a uniform optical rotation or different optical rotations. By adding several kinds of chiral materials to the nematic liquid crystal, or by adding a liquid crystal component such as the polycyclic compound, N-type compound-or the like, it is possible to change the phase transition temperature of the chiral nematic liquid crystal, to reduce the change in selective reflection wavelength due to change in temperature, and to change properties of the chiral nematic liquid crystal such as dielectric anisotropy, refractive index anisotropy and viscosity. Thereby, characteristics as the display element can be improved.

The invention also provides the following sixth to eighth liquid crystal elements as further preferred embodiments.

(6) Sixth Liquid Crystal Element

A liquid crystal element of a layered type including a plurality of liquid crystal layers, wherein each of the liquid crystal layers is held between a pair of resin films each carrying an electrode, and at least the electrode on an element observation side has a thickness from 1200 Å to 1500 Å and a surface resistance of 200 ohm/square(200Ω/□) or less.

(7) Seventh Liquid Crystal Element

A liquid crystal element of a layered type including a plurality of liquid crystal layers, wherein each of the liquid crystal layers is held between a pair of resin films each carrying an electrode, and at least the resin film substrate on an element observation side has a thickness from 50 μm to 200 μm and a refractive index of 1.58 or more, and carries the electrode having a thickness from 1200 Å to 1500 Å and a surface resistance of 200 ohm/square(200Ω/□) or less.

(8) Eighth Liquid Crystal Element

A liquid crystal element, wherein a pair of resin film substrates each carrying an electrode hold a liquid crystal layer exhibiting a cholesteric phase therebetween, and at least the electrode formed on the substrate on an element observation side has a thickness from 1200 Å to 1500 Å and a surface resistance of 200 ohm/square(200Ω/□) or less.

The sixth and seventh liquid crystal elements of the layered type may be of a reflection type, in which case the liquid crystal elements are suitable to the image display with intended contrast.

The sixth to eighth liquid crystal elements have such structures that the liquid crystal layer is held between the paired resin film substrates each carrying the electrode.

In the sixth liquid crystal element of the layered type, at least the electrode on the element observation side has a relatively large thickness from 1200 Å to 1500 Å. Since the electrode is relatively thick, the surface resistance can be reduced, and can be equal to 200 ohm/square(200Ω/□) or less in this embodiment.

In the seventh liquid crystal element of the layered type, at least the substrate on the element observation side has a thickness from 50 μm to 200 μm, and therefore has a small thickness which can prevent impairing of the display of the liquid crystal element of the layered type. The refractive index is 1.58 or more, and therefore is relatively large. Although the resin film substrate generally has a relatively large refractive index, it may be made of a material such as polyether sulfone (PES), polycarbonate (PC) or polyarylate (PA), whereby the resin film substrate can have the required refractive index of 1.58 or more. The upper limit of the refractive index of the resin film substrate is substantially 1.7 or less, although it depends on, e.g., the material of the substrate and/or the refractive index of the electrode formed on the substrate.

The electrode, which is formed on the resin film substrate having the thickness and refractive index described above, has a relatively large thickness from 1200 Å to 1500 Å. Since the electrode is relatively thick, the surface resistance thereof can be small, and is equal to or smaller than 200 ohm/square(200Ω/□) in this embodiment.

In the eighth liquid crystal element, at least the electrode formed on the substrate on the element observation side has a relatively large thickness from 1200 Å to 1500 Å. Since the electrode is relatively thick, the surface resistance thereof can be small, and is equal to or smaller than 200 ohm/square (200Ω/□) in this embodiment.

According to the sixth to eighth liquid crystal elements, at least the electrode on the element observation side has a relatively large thickness of 1200 Å–1500 Å. The electrode having such a large thickness increases the influence by the refractive index so that the interference of light in the wavelength range from red light to infrared rays is reduced in each liquid crystal layer, and the brightness and contrast in the image display can be improved. Since the electrode has the surface resistance of 200 ohm/square or less, electrical conductivity can be easily achieved. In the seventh liquid crystal element of the layered type, at least the substrate on the element observation side has the refractive index of 1.58 or more, which is close to the refractive index of a usually employed transparent substrate. This suppresses unnecessary scattering of the light passing through the substrate and the electrode. This also improves the contrast.

According to the sixth to eighth liquid crystal elements, therefore, bright image display with high contrast can be performed, and electrical conductivity can be easily achieved.

In the seventh liquid crystal element of the layered type, at least the substrate on the element observation side has a small thickness of 50 μm–200 μm, which does not impair the display characteristics of the liquid crystal element of the layered type. Although the substrate is formed of the thin resin film described above, the bending of the substrate can be suppressed because the electrode formed on the substrate has the thickness of 1200 Å to 1500 Å. This facilitates manufacturing of the element, and problems (e.g., breakage of electrode(s)) due to bending of the substrate are prevented.

In the sixth and seventh liquid crystal elements of the layered type, the plurality of liquid crystal layers are employed, and each liquid crystal layer is held between the paired resin film substrates. However, by keeping the thickness of the electrode in the foregoing range from 1200 Å to about 1500 Å, the thin resin film substrates can be employed without difficulty for preventing the undesirable influence, which may be exerted by the layered structure of the liquid crystal layers to the light modulation characteristics such as display characteristics.

In the eighth liquid crystal element, the liquid crystal layer exhibiting the cholesteric phase is used so that the display by the selective reflection of the cholesteric phase can be performed while keeping good contrast.

In the sixth to eighth liquid crystal element, the electrode larger than 1500 Å in thickness is liable to cause disadvantages such as separation of the electrode and bending of the substrate due to a difference in thermal expansion between the electrode and the substrate carrying it. Therefore, the thickness of 1500 Å or less is preferable.

In the sixth to eighth liquid crystal element, at least the electrode on the element observation side of the liquid crystal layer may have a thickness from 1200 Å to 1500 Å as well as a surface resistance of 200 ohm/square or less. In the sixth and seventh liquid crystal element of the layered type, all the electrodes included in the element may have a thickness from 1200 Å to 1500 Å as well as a surface resistance of 200 ohm/square or less.

The electrode may be made of, e.g., indium tin oxide (ITO).

The invention also provides the following ninth liquid crystal element as a further preferred embodiment.

(9) Ninth Liquid Crystal Element

A liquid crystal element of a layered type including a plurality of liquid crystal layers, wherein each of the liquid crystal layers is held between a pair of substrates, an orientation film is disposed between each of the liquid crystal layers and at least one of the paired substrates holding the liquid crystal layer, the orientation film opposed to at least one of the liquid crystal layers has a pretilt angle different from those of the orientation films opposed to the other liquid crystal layers, the orientation film opposed to the liquid crystal layer disposed nearest to an element observation side has the pretilt angle equal to or larger than the pretilt angles of the orientation films opposed to the other liquid crystal layers.

The ninth liquid crystal element of the layered type can be utilized, e.g., as a display element of a reflection type.

The ninth liquid crystal element of the layered type has the plurality of liquid crystal layers layered together.

Each liquid crystal layer contains liquid crystal (liquid crystal composition), and is held between the paired substrates.

The orientation film is arranged between the liquid crystal layer and at least one of the paired substrates holding the liquid crystal layer. The orientation film disposed for the liquid crystal layer is opposed to the liquid crystal layer, and is in contact with it. The orientation film arranged for the liquid crystal layer is formed on the substrate holding the liquid crystal layer.

For each liquid crystal layer, the orientation film is arranged in the above fashion. Thus, the orientation film is arranged between each liquid crystal layer and one of the paired substrates holding the liquid crystal layer.

For example, the ninth liquid crystal element of the layered type is formed of the plurality of liquid crystal elements (liquid crystal cells), which are layered together and each include the paired substrates, the liquid crystal layer held between the paired substrates and the orientation film arranged in the foregoing fashion with respect to the liquid crystal layer. In the liquid crystal element of the layered type including the plurality of layered liquid crystal cells, two substrates may be generally present between the neighboring liquid crystal layers. In the liquid crystal element of the layered type according to the invention, however, only one substrate may be arranged between the neighboring liquid crystal layers, and may be used for holding the liquid crystal layers.

The substrate may be a resin substrate made of resin such as polyether sulfone (PES), polycarbonate (PC), polyethylene terephthalate or polyarylate (PA). The substrate may be a glass substrate. An electrode is arranged on each substrate for applying a voltage to liquid crystal in the liquid crystal layer. If necessary, an insulating layer, orientation film, gas barrier layer and/or filter layer may be arranged on each substrate.

The liquid crystal layer may include a spacer for adjusting a thickness of liquid crystal (liquid crystal layer). The liquid crystal layer may include a resin structure for adhering the opposite substrates holding the liquid crystal layer therebetween and/or increasing a strength of the whole liquid crystal element. The liquid crystal layer may be of a liquid crystal composite layer of a so-called polymer-dispersed type. The liquid crystal composite film of the polymer-dispersed type may be configured such that liquid crystal is dispersed within a three-dimensional mesh structure of the polymer, or that the three-dimensional structure of polymer is formed in the liquid crystal.

The ninth liquid crystal element of the layered type may include three or more liquid crystal layers layered together. The liquid crystal element of the layered type may be formed of three liquid crystal layers, i.e., a liquid crystal layer (R-liquid crystal layer) having a selective reflection wavelength in a red region, a liquid crystal layer (G-liquid crystal layer) having a selective reflection wavelength in a green region and a liquid crystal layer (B-liquid crystal layer) having a selective reflection wavelength in a blue region. The liquid crystal element of the layered type including the three, i.e., R-, G- and B-liquid crystal elements will be referred to as a "liquid crystal element of an RGB layered type", hereinafter. The liquid crystal element of the RGB layered type can be utilized, e.g., as a color liquid crystal display element of a reflection type.

In the ninth liquid crystal element of the layered type, the orientation film arranged for at least one of the liquid crystal layers has the pretilt angle different from those of the orientation films arranged for the other liquid crystal layers, and the orientation film arranged for the liquid crystal layer disposed nearest to the observation side has the pretilt angle equal to or larger than the pretilt angles of the orientation films arranged for the other liquid crystal layers. In other words, the pretilt angle of the orientation film arranged for at least one of the liquid crystal layers is different from the pretilt angles of the orientation films arranged for the other liquid crystal layers, and the pretilt angle of the orientation film arranged for one of the two liquid crystal layers in the outermost positions is equal to or larger than the pretilt angle of the orientation film arranged for the other liquid crystal layer.

The pretilt angle of the orientation film is an angle, at which the orientation film inclines the liquid crystal molecules with respect to the orientation film surface (substrate surface). The pretilt angles of all the orientation films arranged for the respective liquid crystal layers are measured with respect to the same liquid crystal (liquid crystal composition). The liquid crystal in the liquid crystal layer held between the substrates may be different from the liquid crystal with respect to which the pretilt angle of the orientation film is measured.

In the ninth liquid crystal element of the layered type, the orientation film arranged for the liquid crystal layer nearest to the observation side provides the pretilt angle equal to or larger than the pretilt angles of the orientation films arranged for the other liquid crystal layers, and the pretilt angle of the orientation film arranged for at least one of the liquid crystal layers is different from the pretilt angles of the orientation films arranged for the other liquid crystal layers (the pretilt angles of all the orientation films arranged for the respective liquid crystal layers are not equal to each other). Therefore, one or some of the orientation films, which are arranged for the liquid crystal layers other than that nearest to the observation side, have the pretilt angle(s) smaller than that of the orientation film arranged for the liquid crystal layer nearest to the observation side. For example, the orientation film arranged for the liquid crystal layer nearest to the observation side may be larger than the pretilt angles of the orientation films arranged for the other liquid crystal layers. In other words, the orientation film arranged, e.g., for one of the two liquid crystal layers arranged in the outermost positions may have the pretilt angle larger than the pretilt angle of the orientation film arranged for the other liquid crystal layer.

In the case where the ninth liquid crystal element of the layered type is utilized as the display element of the reflection type, the pretilt angle of the orientation film arranged for each liquid crystal layer affects the reflectance and brightness of the liquid crystal layer (liquid crystal) kept in the selective reflection state as well as the transparency of the liquid crystal layer kept in the transparent state. The larger pretilt angle reduces the reflectance (and brightness) in the selective reflection state, and increases the transparency. The smaller pretilt angle increases the reflectance (and brightness) in the selective reflection state, and reduces the transparency. Better display contrast can be achieved as the reflectance (and brightness) are increased in the selective reflection state, and can also be achieved as the transparency in the transparent state is increased.

In the liquid crystal element of the layered type including the layered structure of the plurality of liquid crystal layers, not only the magnitude of the pretilt angle of each of the orientation films for the liquid crystal layers but also the relationship between the pretilt angles significantly affect the contrast, as will be apparent from the results of experiments to be described layer.

In the liquid crystal element of the layered type, the orientation film arranged for the liquid crystal layer nearest to the observation side exerts the largest influence on the contrast of the whole element. In the ninth liquid crystal element of the layered type, the pretilt angle of the orientation film arranged for the liquid crystal layer nearest to the observation side is equal to or larger than the pretilt angles of the orientation films arranged for the other liquid crystal layers, whereby the whole element can have high transparency when each liquid crystal layer is in the transparent state and high contrast. Further, one or some of the orientation films arranged for the liquid crystal layers other than the liquid crystal layer nearest to the observation side include the orientation film having the pretilt angle smaller than the pretilt angle of the orientation film arranged for the liquid crystal layer nearest to the observation side. Thereby, the desired brightness can be ensured. Owing to these features, the ninth liquid crystal element of the layered type can be utilized as a display element having high contrast.

In contrast to the ninth liquid crystal element of the layered type, the pretilt angle of the orientation film arranged for the liquid crystal layer nearest to the observation side may be smaller than the pretilt angles of the orientation films for the other liquid crystal layers, and the orientation film(s) arranged for at least one of the liquid crystal layers may have the pretilt angle(s) different from the pretilt angles of the orientation films for the other liquid crystal layers. However, this structure causes the following disadvantages. Since the pretilt angle of the orientation film arranged for the liquid crystal layer nearest to the observation side is small, the transparency is low in the transparent state. Since one or some of the orientation films arranged for the liquid crystal layers other than the liquid crystal layer nearest to the observation side include the orientation film having the pretilt angle(s) larger than the pretilt angle of the orientation film arranged for the liquid crystal layer nearest to the observation side, the brightness is low, resulting in low contrast of the whole liquid crystal element of the layered type.

In the ninth liquid crystal element of the layered type, the orientation film may be made of a material such as polyimide. The orientation film can be formed on the substrate by a known method such as a sputtering method, spin coat method, roll coat method or vapor deposition method. The pretilt angle of the orientation film can be adjusted, e.g., in the following manners. If the orientation film is made of, e.g., polyimide, a length of an alkyl chain of the polyimide is adjusted for adjusting the pretilt angle of the orientation film. If the orientation film is formed by an oblique vapor deposition method, the pretilt angle of the orientation film can be adjusted, e.g., by the vapor deposition angle.

In the ninth liquid crystal element of the layered type, the orientation film arranged for the liquid crystal layer may be formed of an orientation film not subjected to rubbing. If the rubbing were effected on the orientation film to orient the liquid crystal molecules of the liquid crystal layer in the rubbing direction, the displayed color would change with change in observation direction, and the dependency on the angle of view would be large. By employing the orientation film not subjected to the rubbing, the liquid crystal molecules are not oriented and are arranged randomly so that the dependency on the angle of view can be suppressed. By employing the orientation film not subjected to the rubbing, the rubbing step is not required so that the liquid crystal element of the layered type can be inexpensively manufactured without much expense in time and effort. The orientation film(s) not subjected to the rubbing may be employed as at least one of the orientation films arranged for the liquid crystal layers, whereby the dependency on the angle of view can be suppressed. In view of suppression of the dependency on the angle of view, it is preferable that none of the orientation films arranged for the liquid crystal layers is subjected to the rubbing.

In the ninth liquid crystal element of the layered type, the orientation film arranged for the liquid crystal layer nearest to the observation side may have the pretilt angle of 5° or more (preferably, 7° or more) with respect to the nematic liquid crystal. Thereby, the liquid crystal element of the layered type can have relatively good contrast, as can be apparent from the results of experiments to be described later. In connection with the upper limit of the pretilt angle, the orientation film arranged for the liquid crystal layer nearest to the observation side has the pretilt angle not exceeding, e.g., 10 degrees or less (preferably, 9 degrees or less) with respect to the nematic liquid crystal in view of the contrast or the like, although not restricted to these values.

In the case where the ninth liquid crystal element of the layered type has the layered structure of three or more liquid crystal layers, the orientation films arranged for the liquid crystal layers other than the liquid crystal layer nearest to the observation side may be equal to each other. If this structure is employed in liquid crystal element of the layered type (e.g., the foregoing RGB liquid crystal element of the layered type) employing the three or more liquid crystal layers layered together, the orientation films arranged for the liquid crystal layers other than the liquid crystal layer nearest to the observation side can be manufactured in the same steps using the same material. This improves the manufacturing efficiency, and allows inexpensive production of the liquid crystal element of the layered type.

In the ninth liquid crystal element of the layered type, the liquid crystal (liquid crystal composition) in the liquid crystal layer may be a liquid crystal composition including liquid crystal exhibiting the cholesteric phase (e.g., liquid crystal exhibiting the cholesteric phase in the room temperature). The liquid crystal composition in the liquid crystal layer may contain dye(s) added thereto. The liquid crystal exhibiting the cholesteric phase selectively reflects the light of the wavelength corresponding to the helical pitch of the liquid crystal. Therefore, the liquid crystal element of the layered type, which includes the layered liquid crystal layers each containing such liquid crystal, can be utilized as the liquid crystal element of the reflection type. The liquid crystal exhibiting the cholesteric phase may be, e.g., cholesteric liquid crystal which exhibit the cholesteric phase by itself, or chiral nematic liquid crystal formed of nematic liquid crystal and a chiral material added thereto. The chiral nematic liquid crystal has such an advantage that the helical pitch thereof can be adjusted in accordance with an amount of the added chiral material, and thereby the selective reflection wavelength can be easily adjusted. The helical pitch is a pitch of a helical structure of the liquid crystal molecules, and is a distance between-molecules in the state where the liquid crystal molecules turn 360 degrees in accordance with the helical structure of the liquid crystal molecules. The selective reflection wavelength can be set, e.g., in a visible light range or invisible light range (e.g., infrared range).

The nematic liquid crystal has such a structure that rod-like liquid crystal molecules are parallel to each other, but does not have a layered structure. Various kinds of nematic liquid crystal can be used without particular restriction. In particular, ester compound exhibiting liquid crystal property, pyrimidine compound exhibiting liquid crystal property, cyanobiphenyl compound exhibiting liquid crystal property, cyanophenyl cyclohexane compound exhibiting liquid crystal property, cyano terphenyl compound exhibiting liquid crystal property, difluoro stilbene compound exhibiting liquid crystal property or tolane compound exhibiting liquid crystal property may be used. The nematic liquid crystal containing such a compound exhibiting liquid crystal property having a polar group can be effectively used because it can increase the dielectric anisotropy of the chiral nematic liquid crystal composition. The nematic liquid crystal may be a mixture of two or more kinds of compounds exhibiting liquid crystal property. The nematic liquid crystal may contain a liquid crystal component(s) other than the above compound, and more specifically may contain, e.g., a polycyclic compound or N-type compound for raising a temperature of phase transition to isotropy.

The chiral material is an additive having a function of twisting molecules of the nematic liquid crystal. Addition of the chiral material to the nematic liquid crystal produces the spiral structure of liquid crystal molecules having a twist distance corresponding to the amount of the additive. As a result, the liquid crystal composition formed of the nematic liquid crystal and the chiral material added thereto can exhibit the cholesteric phase.

The chiral material may be a material containing at least one kind of compound having at least one kind of asymmetric carbon, and the helical senses (the directions of twist applied to the liquid crystal) may be uniform or different. The addition rate of the chiral material with respect to the nematic liquid crystal is preferably equal to about 45% or less by weight, and is more preferably equal to about 40% or less by weight. If the addition rate were larger than 45% by weight, disadvantages such as deposition of crystal would be liable to occur. The lower limit of the addition rate of the chiral material is preferably 10% or more by weight, although not restricted if an intended effect can be achieved.

Several kinds of chiral materials may be added to the nematic liquid crystal. Several kinds of chiral materials which are added to the nematic liquid crystal may have a uniform optical rotation or different optical rotations. By adding several kinds of chiral materials to the nematic liquid crystal, or by adding a liquid crystal component such as the polycyclic compound, N-type compound or the like, it is possible to change the phase transition temperature of the chiral nematic liquid crystal, to reduce the change in selective reflection wavelength due to change in temperature, and to change properties of the chiral nematic liquid crystal such as dielectric anisotropy, refractive index anisotropy and viscosity. Thereby, characteristics as the display element can be improved.

Among the liquid crystal elements described above, the liquid crystal elements of the first to fourth types will first be described with reference to the drawings. The liquid crystal elements of the fifth to ninth types will be described later.

(1) Liquid Crystal Elements of First to Fourth Types

Figure 2:
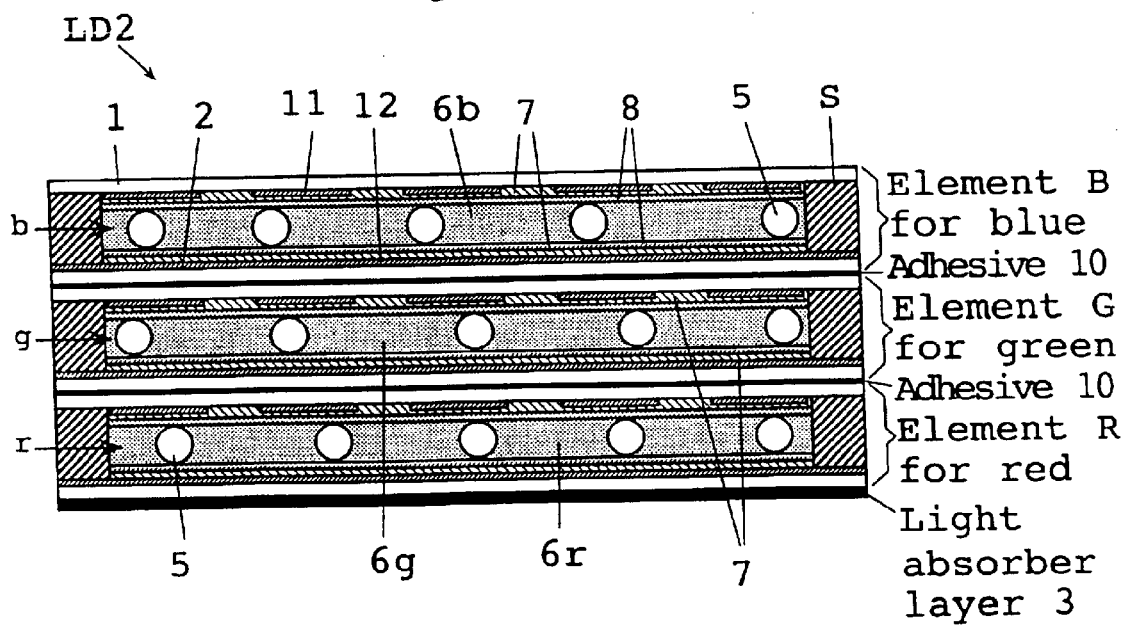
FIG. 2 is a schematic cross section of another example of the liquid crystal element of the layered type according to the invention.
Figure 3:
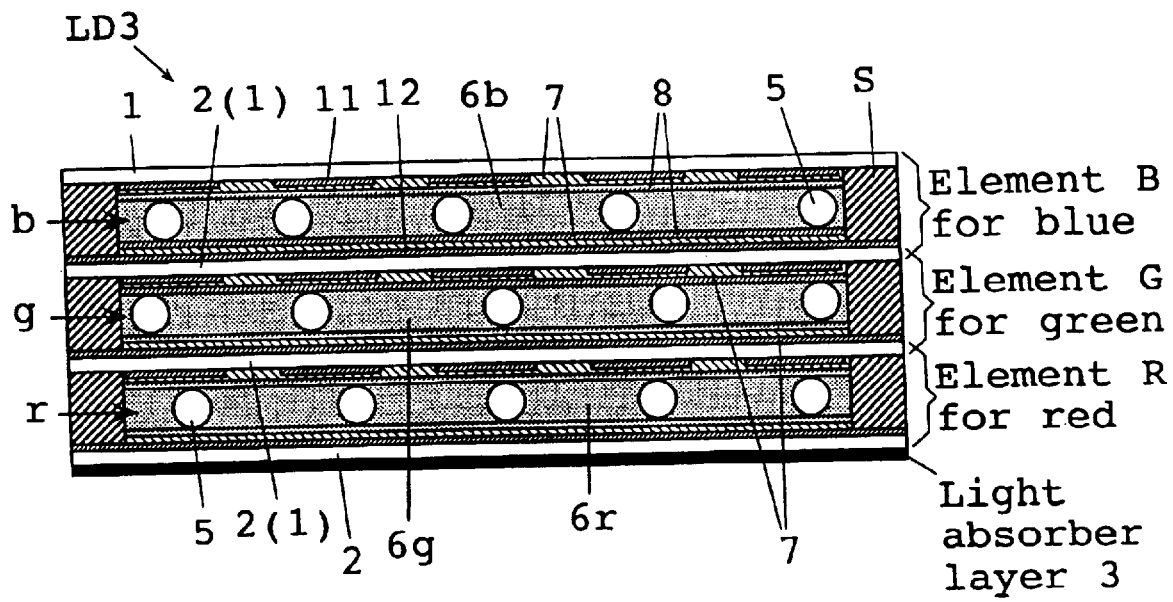
FIG. 3 is a schematic cross section of still another example of the liquid crystal element of the layered type according to the invention.

FIG. 1 is a schematic cross section of an example of a liquid crystal element structure of the layered type. FIG. 2 is a schematic cross section of another example of the liquid crystal element structure of the layered type. FIG. 3 is a schematic cross section of still another example of the liquid crystal element structure of the layered type.

FIGS. 1 to 3 show liquid crystal display elements of the layered type capable of full color display in a simple matrix drive method.

Each of liquid crystal display elements LD1, LD2 and LD3 of the layered type shown in FIGS. 1 to 3 includes a liquid crystal element B for blue display, a liquid crystal element G for green display and a liquid crystal element R for red display, which are layered in this order.

In the layered type liquid crystal elements LD1, LD2 and LD3, each liquid crystal element for color display includes a liquid crystal layer b, g or r held between a pair of transparent substrates 1 and 2. In the element LD3, however, the substrate 2 of the liquid crystal element B neighboring to the element G serves also as the substrate 1 of the element G, and the substrate 2 of the liquid crystal element G neighboring to the element R serves also as the substrate 1 of the element R.

In each of the layered type liquid crystal elements LD1, LD2 and LD3, the liquid crystal layer of each liquid crystal element includes a liquid crystal material which exhibits a cholesteric phase having a selective reflection wavelength in a visible range.

The liquid crystal element B is nearest to an observation side, and includes the liquid crystal layer b, which contains a liquid crystal material performing selective reflection of blue light. The subsequent liquid crystal element, i.e., element G includes the liquid crystal layer g, which contains a liquid crystal material performing selective reflection of green light. The liquid crystal element R is remotest from the element observation side, and includes the liquid crystal layer r, which contains a liquid crystal material performing selective reflection of red light. A light absorber layer 3 is arranged on the outer surface (rear surface) of the element R.

The liquid crystal layer included in each liquid crystal element is responsive to a voltage applied across transparent electrodes 11 and 12, which are arranged on the paired substrates 1 and 2 holding the liquid crystal layer therebetween, respectively, and thereby can change its state from a transparent state for passing visible light to a selective reflection state for selectively reflecting visible light of a specific wavelength, and vice versa.

When one of the liquid crystal layers is set to the selective reflection state, and white light such as natural light is emitted to the layered type liquid crystal element from the upper side (observation side) in FIG. 1, 2 or 3, the liquid crystal layer in the selective reflection state reflects the visible light of a specific wavelength, and thereby the color is displayed and observed. When the liquid crystal layer is in the transparent state, the incoming light passes through the liquid crystal layer. Accordingly, the desired color can be displayed by setting the liquid crystal element corresponding to the color to be displayed to the selective reflection state while setting the liquid crystal element(s) on the observation side to the transparent state. When all the liquid crystal elements R, B and G are in the transparent state, the light absorber layer 3 absorbs the incoming light to perform black display.

The liquid crystal material, which is included in each liquid crystal layer and exhibits the cholesteric phase, will also be referred to as a "cholesteric liquid crystal material", hereinafter. This cholesteric liquid crystal material may be a liquid crystal material including cholesteric liquid crystal, which exhibits the cholesteric phase by itself, or may be a liquid crystal material formed of nematic liquid crystal and a chiral material added thereto. The liquid crystal material will be described later in greater detail.

The cholesteric liquid crystal material assumes the planar state when a relatively high pulse voltage is applied thereto, and assumes the focal conic state when a relatively low pulse voltage is applied thereto. When an intermediate voltage pulse is applied thereto, the cholesteric liquid crystal material assumes a state where the planar state and the focal conic state are mixed.

When the cholesteric liquid crystal material is in the planar state, it selectively reflects the light of a wavelength $\lambda = P \cdot n$ where P represents a spiral pitch of the liquid crystal, and n represents an average refractive index.

The cholesteric liquid crystal material, which has the selective reflection wavelength in an infrared range, scatters the visible light when it is in the focal conic state, and weakens the degree of scattering to pass the visible light when the selective reflection wavelength is shorter than that in the infrared range.

When the cholesteric liquid crystal material is in the state where the planar state and the focal conic state are mixed, halftone is displayed.

Accordingly, by setting the selective reflection wavelength in the visible light range, and providing the light absorber (black layer in this example) on the side remotest from the observation side of the liquid crystal element, the display can be switched among the specific color (planar state), black (focal conic state) and halftone.

For example, red display is performed when the liquid crystal elements for the blue display and green display are in the transparent state achieved by the focal conic state of the cholesteric liquid crystal materials thereof, and the liquid crystal element for red display is in the selective reflection state achieved by the planar state of the cholesteric liquid crystal material. Also, yellow display is performed when the liquid crystal element for the blue display is in the transparent state achieved by the focal conic state of the cholesteric liquid crystal material thereof, and the liquid crystal elements for red display and blue display are in the selective reflection state achieved by the planar state of the cholesteric liquid crystal materials. Likewise, display in red, green, blue, white, cyan, magenta, yellow and black can be selectively and appropriately performed by appropriately setting the respective liquid crystal elements in the transparent state or the selective reflection state. Further, an intermediate selective reflection state can be selected in each liquid crystal element for color display so that full color display can be performed.

The layered type liquid crystal element LD1 shown in FIG. 1 will now be described in greater detail.

As shown in FIG. 1, each of the liquid crystal elements B, G and R is provided with a plurality of belt-like transparent electrodes 11 and 12, which are formed on the transparent substrate 1 and 2, and are parallel to each other with a minute space therebetween. Columnar resin structures 4 are disposed on the surfaces of the substrate 1 and 2 carrying the transparent electrodes 11 and 12, and are adhered thereto for supporting the substrates 1 and 2. Spacers 5 are also disposed between the substrates 1 and 2 so that these resin structures 4 and spacers 5 determine the distance between the substrates. Each of the liquid crystal layers b, g and r is formed of the resin structures 4, the spacers 5 and a liquid crystal material 6b, 6g or 6r filling the spaces between them.

In each element, the substrates 1 and 2 are arranged such that the transparent electrode 11 and 12 cross perpendicularly each other, and regions where the transparent electrodes 11 and 12 overlap with each other form pixels, respectively. In this specification, the region where the liquid crystal material performs the image display is referred to as a "display region". A seal member S is arranged between the substrates 1 and 2 for sealing the liquid crystal material. The seal member S is located on the peripheral portions of the substrates 1 and 2 outside the display region.

An inorganic film of, e.g., oxide silicon or an organic film of, e.g., polyimide resin or epoxy resin may be arranged as an insulating layer and a gas barrier layer on each of the surface(s) of substrate 1 and/or 2 carrying the transparent electrodes. This prevents shot-circuit between the substrates 1 and 2, and improves the reliability of the liquid crystal element.

In the example shown in FIG. 1, an insulating film 7 is arranged on the surface (i.e., transparent electrode formation surface) of each of substrates 1 and/or 2 carrying the transparent electrode. The insulating film 7 is arranged as an insulating layer and/or a gas barrier layer. The insulating film 7 may be made of an inorganic material such as silicon oxide, titanium oxide or zirconium oxide, or may be made of an organic insulating material such as polyimide resin, epoxy resin, acrylic resin or silicone resin. Thereby, short-circuit between the substrates 1 and 2 can be prevented, and the reliability of the liquid crystal element can be improved. The insulating film 7 opposed to the liquid crystal layer (liquid crystal layer b in this example) in the outermost position on the element observation side has a refractive index larger than that of the insulating film 7 opposed to the neighboring liquid crystal layer (liquid crystal layer g in this example). This can achieve an advantage, which will be described later.

An orientation control film, which is typically made of polyimide, may be arranged on each transparent electrode formation surface of the substrates 1 and/or 2.

In the example shown in FIG. 1, an orientation control film 8 is arranged over the insulating film 7, which is arranged on each of the belt-like electrodes 11 or 12. The insulating film and the orientation control film are not essential.

Each of the transparent substrates 1 and 2 may be formed of a glass substrate, or may be formed of another kind of substrate such as a flexible substrate made of polycarbonate, polyether sulfone (PES), polyethylene terephthalate or the like.

The transparent electrode may be formed of, e.g., a transparent conductive film, which is typically made of Indium Tin Oxide (ITO), a metal electrode made of aluminum, silicon or the like, or a photoconductive film made of amorphous silicon or Bishmuth Silicon Oxide (BSO).

Figure 4:
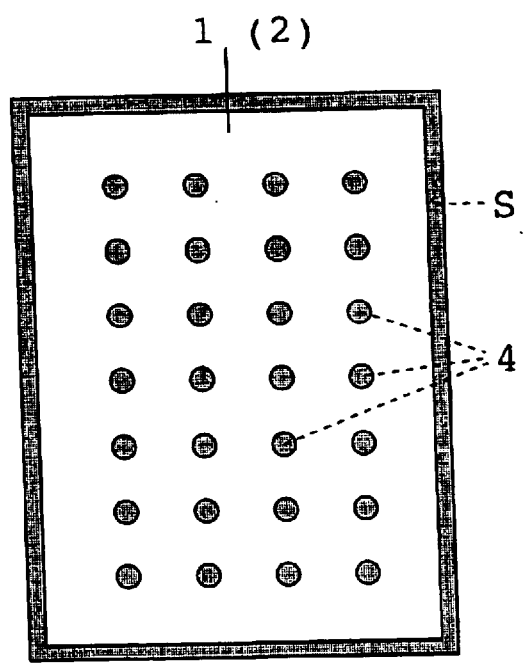
FIG. 4 shows an arrangement of resin structures in each liquid crystal element of the liquid crystal element of the layered type shown in FIG. 1.

FIG. 4 shows an arrangement of the resin structures 4. As shown in FIG. 4, the resin structures 4 within the display region are equally spaced from each other, and are arranged, e.g., in a matrix form in accordance with a predetermined arrangement rule. Each resin structure 4 has a dot-like columnar form having a circular, square, elliptic section or the like. The dot-like resin structures have sizes and pitches which are appropriately determined in accordance with the sizes of the liquid crystal element and the pixel resolution. It is preferable to arrange the dot-like resin structures between the electrodes with priority because this increases the ratio of apertures. Various forms other than the dot-like form may be employed. The resin structures may be equally spaced from each other, or may be spaced by a distance which gradually varies in accordance with the position. A predetermined pattern of arrangement may be repeated regularly. Any one of these forms and arrangements may be employed, if these are determined in accordance with appropriate arrangement rules keeping an appropriate gap between the substrates, and not impeding image display. For example, the resin structures may take the form of stripes spaced by a predetermined distance from each other.

The resin structure may be made of a material which can be softened when heated, and can be solidified by cooling. An organic material which does not chemically react with the liquid crystal material, and has an appropriate elasticity is suitable.

The resin material of the resin structure may be preferably a thermoplastic polymer material.

The thermoplastic polymer material may be, e.g., polyvinyl chloride resin, polyvinylidene chloride resin, polyvinyl acetate resin, polymethacrylate ester resin, polyacrylate ester resin, polystyrene resin, polyamide resin, polyethylene resin, polypropylene resin, fluororesin, polyurethane resin, polyacrylonitrile resin, polyvinyl ether resin, polyvinyl ketone resin, polyether resin, polyvinyl pyrolidone resin, saturated polyester resin, polycarbonate resin, chlorinated polyether resin or the like. The resin structure may be made of one of the above materials, or a mixture containing two or more of the above materials.

The spacers are preferably formed of particles made of a hard material, which is not deformed by the heat and pressure. For example, the spacer particles may be made of, e.g., an inorganic material such as finely divided glass fibers, silicate glass in the ball-like form or alumina powder, or spheric particles of an organic material such as divinylbenzene-contained cross-linked polymer or polystyrene-contained cross-linked polymer.

As described above, the layer is provided with the hard spacers 5, which keep the gap of a predetermined size between the two substrates 1 and 2, as well as the resin structures 4, which are arranged within the display region in accordance with a predetermined arrangement rule, and are primarily made of the thermoplastic polymer material for adhering and supporting the paired substrates. Thereby, both the substrates 1 and 2 are entirely and firmly supported without irregularity in distance between them, and it is possible to suppress generation of bubbles from the liquid crystal material in a low temperature environment.

The resin structures 4 may be eliminated if the substrate area is small, and the distance between the substrates 1 and 2 can be stably maintained without the structures 4.

In the layered type liquid crystal elements LD2 and LD3 shown in FIGS. 2 and 3, respectively, the resin structure 4 is eliminated. As already described, the layered type liquid crystal element LD3 has such a structure that the substrate 2 of the element B also serves as the substrate 1 of the neighboring element G, and the substrate 2 of the element G also serves as the substrate 1 of the neighboring element R.

Brief description will be given on an example of manufacturing each liquid crystal element in the layered type liquid crystal element LD1 shown in FIG. 1.

First, the plurality of belt-like transparent electrodes are first formed on each of the two transparent substrates 1 and 2. The transparent electrodes 11 and 12 are formed by forming ITO films on the substrates by a sputtering method or the like, and then patterning them by photolithography.

Then, the insulating film 7 and the orientation control film 8 are formed on the transparent electrode formation surface of each substrate. The insulating film 7 and orientation control film 8 can be formed by a known method such as a sputtering method, spin coat method or a roll coat method using an inorganic material such as silicon oxide or an organic material such as polyimide resin.

Then, the resin structures 4 are formed on the electrode formation surface of one of the substrates 1 and 2, on which the transparent electrodes 11 (or 12), insulating film 7 and orientation control film 8 are formed in the above manner. The resin structures 4 are made of resin material paste prepared by dissolving resin in solvent, and are formed in a printing method, in which the above resin material is squeezed out by a squeegee via a screen or a metal mask, and printing is effected on the substrate 1 (or 2) laid on a flat plate. Instead of the printing, the resin structures 4 may be prepared by a method such as a dispenser method or an ink jet method in which the resin material is supplied onto the substrate from a nozzle(s), or a transfer method in which the resin material supplied onto a flat plate or roller is transferred onto the substrate surface. When forming the resin structures, it is preferable that the resin structure has a height larger than the desired thickness of the liquid crystal layer.

The seal member S made of ultraviolet-curing resin, thermosetting resin or the like is arranged on the electrode formation surface of the other substrate 2 (or 1). The seal member S has a continuous and annular form extending on the peripheral portion of the substrate. The seal member S may be disposed in a method similar to that-for the resin structures 4, and thus may be disposed by a method such as a dispenser method or an ink jet method executed by discharging resin onto the substrate from a nozzle, a printing method such as a screen or a metal mask, or a transfer method executed by applying resin onto a flat plate or a roller, and then transferring it onto the substrate.

Then, the spacers 5 are dispersed on the surface of at least one of the substrates 1 and 2 in a known method.

The paired substrates 1 and 2 are overlaid together with the electrode formation surfaces opposed to each other, and the liquid crystal material 6b, 6g or 6r is disposed between the substrates. Pressure and heat are applied to the opposite sides of the substrate pair (1 and 2) thus arranged. The pressure and heat can be applied, e.g., in the following manner shown in FIG. 5. The substrate 1 carrying the resin structures is laid on a flat plate 91, and the other substrate 2 is laid over it. The pressure and heat are applied to the substrate pair by a heating and pressing roller 92 while moving the substrate pair through the position between the roller 92 and the flat plate 91.

According to the above method, the liquid crystal element can be accurately produced even if the element uses the flexible substrate such as a film substrate having a flexibility. By employing the resin structures 4 made of a thermoplastic polymer material, the resin structures 4 can adhere the substrates 1 and 2 together by heating the resin structures 4 to soften them, and then cooling the softened resin structures 4 to solidify them. In the case where the seal member S is made of thermosetting resin, the seal member S can be solidified by the heat applied for fixing the substrates together as described above.

The liquid crystal material is applied during the foregoing substrate overlaying step in such a manner that droplets of the liquid crystal material 6b, 6g or 6r are applied onto the substrates 1 and/or 2 for supplying the liquid crystal material at the same time as the overlaying of the substrates. In this case, the spacers may be disposed within the liquid crystal material before application, and the droplets of the liquid crystal material containing the spacers may be applied onto the electrode formation surface(s) of the substrate 1 and/or 2.

Figure 5:
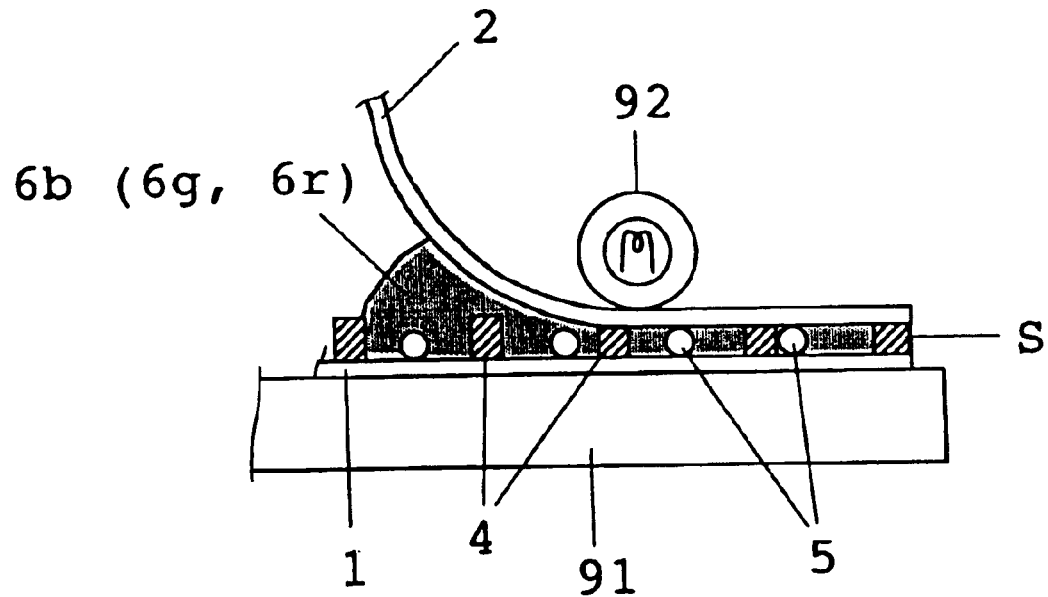
FIG. 5 shows by way of example a step in a method of manufacturing the liquid crystal element of the layered type shown in FIG. 1.

As shown in FIG. 5, droplets of the liquid crystal material 6b, 6g or 6r may be applied onto an end of the substrate 1 or 2, and then may be spread toward the other end while overlaying the substrates 1 and 2 by the roller 92. Thereby, the liquid crystal material can be disposed over the entire area of the substrate. This manner can suppress such a situation that bubbles are generated and held within the liquid crystal material when overlaying the substrates 1 and 2.

The application of the pressure to the substrates 1 and 2 is continued until the substrate temperature lowers to or below the softening temperature of the resin material forming the resin structures 4, and then is stopped. If the seal member S is made of a photosetting resin material, light irradiation is performed to solidify the seal member S after the above processing. Through the above processing, the liquid crystal element is produced.

The liquid crystal elements B, G and R for the blue display, green display and red display are produced in the similar manner except for the selective reflection wavelengths of the liquid crystal materials to be used. The three layers of the liquid crystal elements thus produced are layered together, and the neighboring liquid crystal elements B and G as well as the neighboring liquid crystal elements G and R are mutually adhered by transparent adhesive or adhesive sheets 10 (generally referred to as "adhesive 10" in the figures), which is configured to eliminate or minimize an adverse effect on the layered type liquid crystal element characteristics. Further, the light absorber layer 3 is formed on the outer surface of the red display liquid crystal element R for providing the layered type liquid crystal element capable of full color display.

Figure 6:
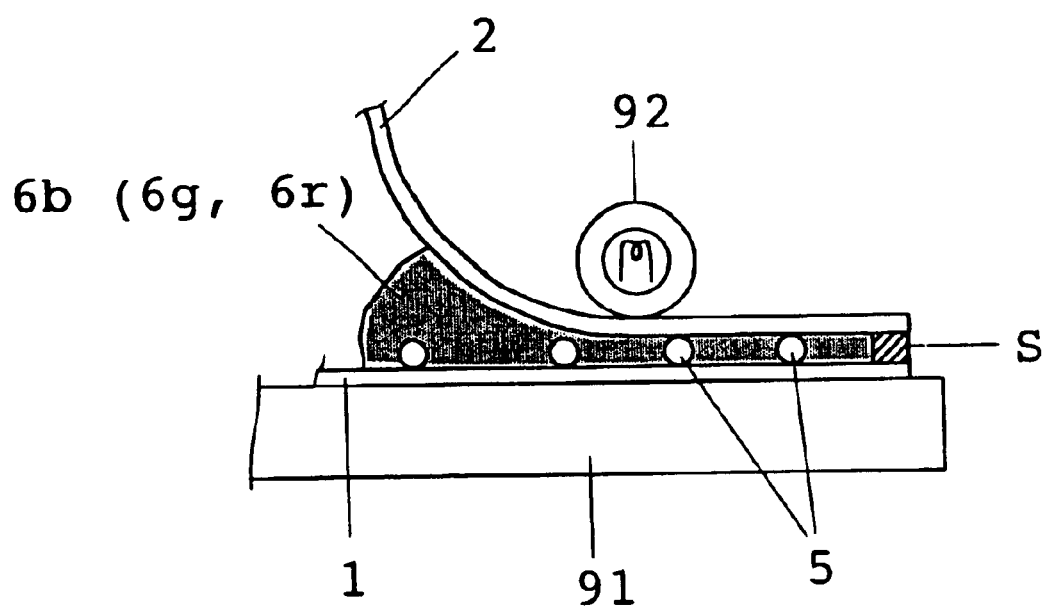
FIG. 6 shows by way of example a step in a method of manufacturing the liquid crystal element of the layered type shown in FIG. 2.

The layered type liquid crystal element LD2 shown in FIG. 2 is manufactured in the same manner as the layered type liquid crystal element LD1 except for that the formation of the resin structures 4 is not performed, and the step shown in FIG. 5 is replaced with the step shown in FIG. 6 not forming the resin structures 4.

The layered type liquid crystal element LD3 shown in FIG. 3 is manufactured in the same manner as the layered type liquid crystal element LD1 except for the following steps. The electrodes as well as the insulating films and orientation control films, if necessary, are formed in advance on the opposite surfaces of each of the substrates to be located between the neighboring liquid crystal layers b and g and between neighboring liquid crystal layers g and r. One of the liquid crystal elements is first formed, and then the other liquid crystal elements are successively formed on the element already formed, or are formed on the opposite sides of the element already formed.

A liquid crystal material (liquid crystal composition) will now be described in detail.

As already described, it is preferable to use the liquid crystal material exhibiting the cholesteric phase in the room temperature. It is particularly preferable to use the chiral nematic liquid crystal formed of the nematic liquid crystal and the chiral material added thereto. The selective reflection wavelength can be adjusted according to the amount of added chiral material, and can be selectively set to be within and out of the visible light range.

The liquid crystal material may contain dye(s). Various kinds of nematic liquid crystal can be used without particular restriction. In particular, compound exhibiting liquid crystal property such as ester compound, pyrimidine compound, cyanobiphenyl compound, cyanophenyl cyclohexane compound, cyano terphenyl compound, difluoro stilbene compound or tolane compound may be used. The nematic liquid crystal containing such a compound having a polar group can be effectively used because it can increase the dielectric anisotropy of the liquid crystal composition. The nematic liquid crystal may be a mixture of two or more kinds of compounds exhibiting liquid crystal property. The nematic liquid crystal may contain a liquid crystal component(s) other than the above compound, and more specifically may contain, e.g., a polycyclic compound or N-type compound for raising a temperature of phase transition to isotropy.

The chiral nematic liquid crystal has such an advantage that the pitch of the spiral structure can be adjusted in accordance with an amount of the added chiral material, and thereby the selective reflection wavelength of the liquid crystal can be controlled.

The addition rate of the chiral material with respect to the liquid crystal compound is preferably equal to about 45% or less by weight, and is more preferably equal to about 40% or less by weight. If the addition rate were larger than 45% by weight, disadvantages such as deposition of crystal would be liable to occur. The lower limit of the addition rate of the chiral material is preferably 10% or more by weight, although not restricted if the liquid crystal composition can perform the selective reflection.

Several kinds of chiral materials may be added to the nematic liquid crystal. Several kinds of chiral materials which are added to the nematic liquid crystal may have a uniform optical rotation or different optical rotations. By adding several kinds of chiral materials to the nematic liquid crystal, or by adding the liquid crystal component such as a polycyclic compound or N-type compound, it is possible to change the phase transition temperature of the cholesteric liquid crystal, to reduce the change in selective reflection wavelength due to change in temperature, and to change properties of the cholesteric liquid crystal material such as dielectric anisotropy, refractive index anisotropy and viscosity. Thereby, characteristics as the display element can be improved.

In each of the liquid crystal elements B, G and R, dye(s) may be added to each element for improving the color purity in display performed by the selective reflection, and for absorbing light components which may lower the transparency in the transparent state. Also, a color filter layer (i.e., a plate member such as a color glass filter or a color film) achieving similar effects may be arranged on each element. The dye(s) may be added to any one of the element component materials, i.e., the liquid crystal material, resin material, transparent electrode material and transparent substrate material, and a plurality of element component materials may contain dyes.

For preventing lowering of the display quality, it is desired that the added dye(s) or filter layer does not impede the color display by the selective reflection of each element.

Figure 7:
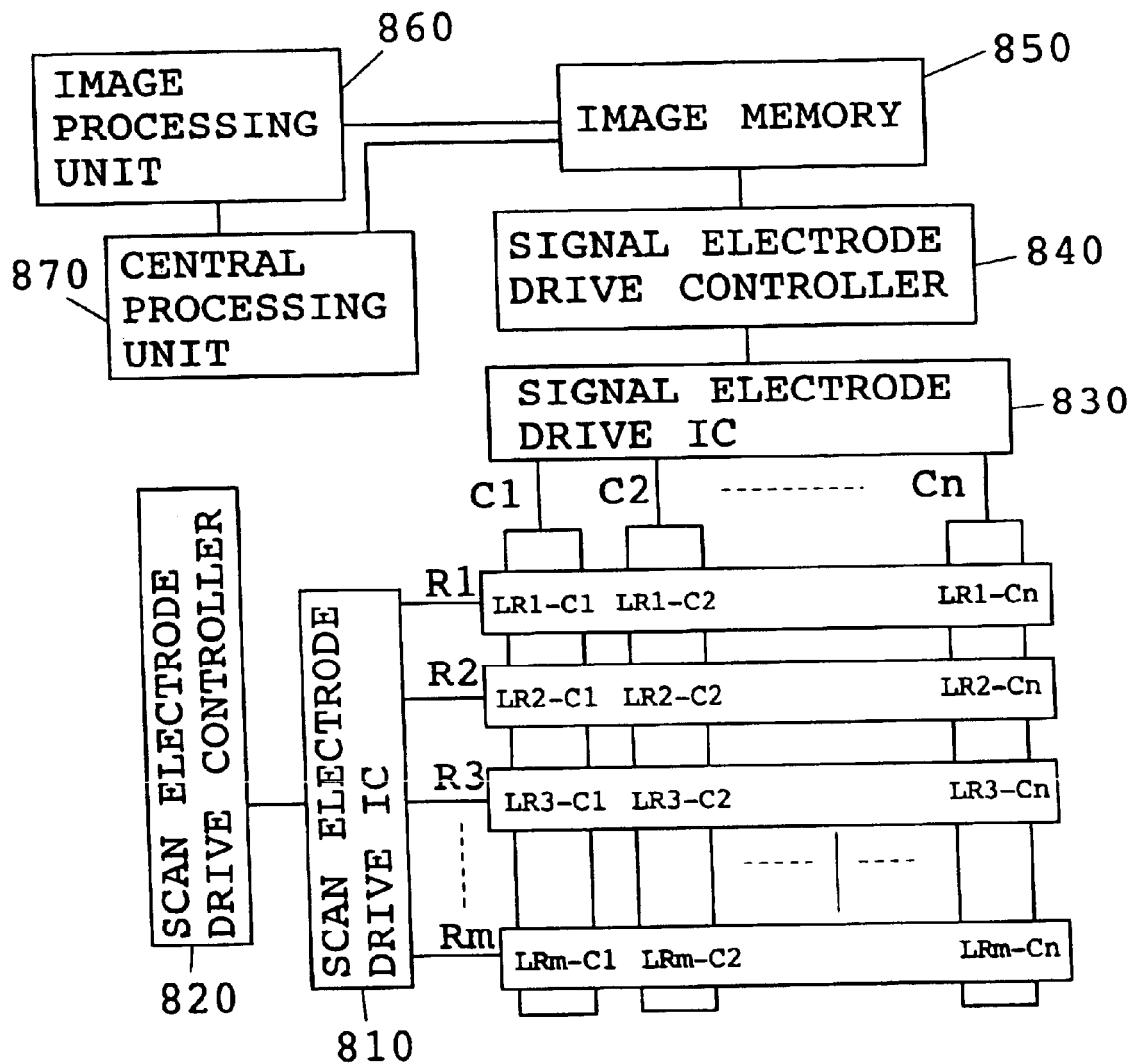
FIG. 7 is a block diagram showing by way of example a drive circuit of the liquid crystal element.

Description will be given on the drive of the layered type liquid crystal elements LD1, LD2 and LD3. FIG. 7 is a block diagram of a drive circuit. Each of the liquid crystal elements of the layered type liquid crystal elements shown in FIGS. 1 to 3 is driven by the drive circuit having the structure shown in FIG. 7.

As shown in FIG. 7, the pixel structure of each liquid crystal element is depicted as a matrix of a plurality of scan electrodes R1–Rm and signal electrodes C1–Cn (n and m are natural numbers, respectively). The scan electrodes R1–Rm correspond to the plurality of belt-like electrodes 11 on one of the substrates, respectively, and signal electrodes C1–Cn correspond to the plurality of belt-like electrodes 12 on the other substrate, respectively.

The scan electrodes R1–Rm are connected to output terminals of a scan electrode drive IC 810, respectively. The signal electrodes C1–Cn are connected to output terminals of signal electrode drive IC 830, respectively. The scan electrode drive IC 810 issues a select signal to a predetermined one among the scan electrodes R1–Rm for setting it to the selected state, and issues non-selection signals to the others for setting them to the unselected state.

The scan electrode drive IC 810 switches the electrodes at predetermined time intervals for successively applying a select signal to the respective scan electrodes. The signal electrode drive IC 830 simultaneously issues signals corresponding to image data to the respective signal electrodes for rewriting the respective pixels on the scan electrodes in the selected state. For example, when the scan electrode R1 is selected, the pixels LR1-CL–LR1-Cn on the crossings between the scan electrode R1 and the signal electrodes C1–Cn are simultaneously rewritten. Thereby, the voltage difference between the scan electrode and the signal electrode of each pixel forms the pixel rewrite voltage, and the pixel is rewritten in accordance with this rewrite voltage.

In FIG. 7, 850 indicates an image memory, into which image data is written by an image processing unit 860 and a central processing unit 870. 840 indicates a signal electrode drive controller, and 820 indicates a scan electrode drive controller.

The signal electrode drive IC switches the output signal in accordance with selection of the next scan electrode, and thereby rewrites the pixel(s) of the next scan electrode.

Some of the liquid crystal elements described above include the liquid crystal layers containing the resin structures, and the other include the liquid crystal layer not containing the resin structures. Various forms other than the above may be employed. For example, the element may include a liquid crystal composite film of a so-called polymer-dispersed type, in which a liquid crystal material is dispersed in a three-dimensional structure of polymer, or a three-dimensional structure of polymer is formed in the liquid crystal material, provided that the rise of the drive voltage is allowed to a certain extent.

In the first to third layered type liquid crystal elements, the insulating film 7 opposed to the liquid crystal layer b in the outermost position on the element observation side has a refractive index different from that of the insulating film 7 opposed to the neighboring liquid crystal layer g. For achieving these refractivities, the insulating film opposed to the liquid crystal layer b is made of a material different from that of the insulating film opposed to the liquid crystal layer g. The difference in refractive index between the insulating films 7, which are opposed to the liquid crystal layers b and g, respectively, is substantially in a range from 0.15 to 0.4, and more preferably in a range from 0.15 to 0.3. From the viewpoint of suppressing unnecessary scattering of light, it is desired that a large difference in refractive index is not present between the insulating film 7 opposed to each of the liquid crystal layers b, g and r and the substrate(s) 1 and/or 2 holding the liquid crystal layer b, g or r with the same insulating film 7 therebetween. Accordingly, the range of the refractive index of the insulating film 7 is substantially in a range from about 1.4 to about 1.8, although it depends on the refractive index of the substrates 1 and/or 2 holding the liquid crystal layer b, g or r with the insulating film 7 therebetween.

According to the layered type liquid crystal elements, which are shown in FIGS. 1 to 3, and form the first to third liquid crystal elements, respectively, the orientation of the liquid crystal molecules are controlled in each of the liquid crystal layers b, g and r by the drive voltage applied to the liquid crystal layer b, g or r so that the light coming from the observation side is modulated. In this layered type liquid crystal element, the insulating film 7 opposed to the liquid crystal layer b in the outermost position on the element observation side has the refractive index larger than that of the insulating film opposed to the neighboring liquid crystal layer g. Therefore, unnecessary scattering of the light is suppressed. Such a situation can be suppressed that the influence of multiple reflection by the liquid crystal layer b in the outermost position on the element observation side is exerted on the liquid crystal layers g and r on the side remote from the element observation side. Since the influence of the multiple reflection and unnecessary scattering can be suppressed, the contrast in image display can be improved.

In connection with the first to third liquid crystal elements, description will now be given on specific experimental examples 1–6 and experimental examples for comparison 1–2. However, the invention is not restricted to such experimental examples. Layered type liquid crystal elements in the following experimental examples have the substantially same structures as the layered type liquid crystal element LD2 shown in FIG. 2. The neighboring liquid crystal elements are fixed together by acrylic adhesive sheets.

In the respective examples described below, the reflectances were determined by measuring the luminous reflectance (Y-values) with a reflective spectrocolorimeter CM-3700d (manufactured by Minolta Co., Ltd.). A smaller Y-value means a high transparency. The contrast is given by (Y-value in the high reflectance state)/(Y-value in the low reflectance state). In the layered type liquid crystal element having the three-layer structure in each of the experimental examples described below, a high reflectance state (i.e., white or nearly white state) was attained when the liquid crystal cells (liquid crystal elements) in all the layers were simultaneously set to the colored state, and a low reflectance state, in which all the elements became transparent or nearly transparent so that the black light absorber film could be viewed, was attained when the liquid crystal cells in all the layers were simultaneously set to the colorless state. Accordingly, the contrast is represented as the reflectance ratio (W/B) between the white display and black display.

EXPERIMENTAL EXAMPLE 1

Predetermined amounts of chiral materials S-811 (manufactured by Merck & Co.) were added to nematic liquid crystal A having refractive index anisotropy value $\Delta n$ of 0.187 and dielectric anisotropy (permittivity anisotropy) $\Delta \epsilon$ of 4.47, nematic liquid crystal B ($\Delta n=0.177$, $\Delta \epsilon=5.33$) and nematic liquid crystal C ($\Delta n=0.20$, $\Delta \epsilon=6.25$) so that liquid crystal compositions a1, b1 and c1 were prepared. The compositions a1, b1 and c1 could reflect the light of the wavelengths of about 680 nm, about 560 nm and about 480 nm, respectively.

A polyimide-contained orientation film of 800 Å in thickness was formed on ITO (Indium Tin Oxide) transparent electrodes, which were arranged on a polycarbonate (PC) film substrate, and spacers (manufactured by Sekisui Finechemical Co., Ltd.) of 9 µm in diameter were dispersed on the orientation film. On ITO transparent electrodes formed on the other PC film substrate, an inorganic insulating film D of 2000 Å in thickness having a refractive index of 1.7 and made of silicon oxide, titanium oxide and zirconium oxide was formed, and a polyimide-contained orientation film of 800 Å in thickness was formed on the insulating film D.

Then, a seal material XN21S (manufactured by Mitsui Chemicals Co., Ltd.) was applied by screen printing onto the peripheral portion of one of the substrates so that a wall of a predetermined height was formed.

Thereafter, the liquid crystal composition a1 of an amount, which was calculated from the height of and area surrounded by the seal material, was applied onto the substrate, and both the substrates were fixed together by a fixing device shown in FIG. 6. Thereafter, heating at 150° C. was performed for one hour to produce the liquid crystal cell (liquid crystal element) A1.

Then, a polyimide-contained orientation film of 800 Å in thickness was formed on transparent electrodes, which were arranged on a PC film substrate, and spacers (manufactured by Sekisui Finechemical Co., Ltd.) of 5 µm in diameter were dispersed on the orientation film.

On transparent electrodes formed on the other PC film substrate, an inorganic insulating film E of 2000 Å in thickness having a refractive index of 1.45 and made of silicon oxide and titanium oxide was formed, and a polyimide-contained orientation film of 800 Å in thickness was formed on the insulating film E. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition b1 of an amount, which was calculated from the height of and area surrounded by the seal material, was applied onto the substrate, and both the substrates were fixed together by a similar fixing device. Thereafter, heating at 150° C. was performed for one hour to produce the liquid crystal cell (liquid crystal element) B1.

Further, a polyimide-contained orientation film of 800 Å in thickness was formed on transparent electrodes, which were arranged on a PC film substrate, and spacers (manufactured by Sekisui Finechemical Co., Ltd.) of 5 µm in diameter were dispersed on the orientation film.

On transparent electrodes formed on the other PC film substrate, an inorganic insulating film D of 2000 Å in thickness having a refractive index of 1.7 and made of silicon oxide, titanium oxide and zirconium oxide was formed, and a polyimide-contained orientation film of 800 Å in thickness was formed on the insulating film D. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition c1 of an amount, which was calculated from the height of and area surrounded by the seal material, was applied onto the substrate, and both the substrates were fixed together by the fixing device. Thereafter, heating at 150° C. was performed for one hour to produce the liquid crystal cell (liquid-crystal element) C1.

These three kinds of cells A1, B1 and C1 were layered in this order, and a black light absorber film was arranged on the rear surface of the layered structure (i.e., external (rear) surface of the liquid crystal cell A1).

The layered structure was driven with the predetermined voltages to set each cell selectively to the colored state and colorless state. It was observed from the cell C1 side that the layered structure exhibited the Y-value of 29.0 in the white display state, the Y-value of 4.8 in the black display state and contrast of 6.0:1 (W/B), and thus it had good display characteristics for both the black and white, and achieved the element of high contrast.

For the color display and the colorless display, the liquid crystal composition a1 was supplied with drive voltages of 90 V and 60 V, respectively. Likewise, the liquid crystal composition b1 was supplied with drive voltages of 65 V and 45 V for the color display and the colorless display, respectively. The liquid crystal composition c1 was supplied with drive voltages of 65 V and 40 V for the color display and the colorless display, respectively.

EXPERIMENTAL EXAMPLE 2

The liquid crystal compositions a1, b1 and c1 were prepared similarly to the experimental example 1.

A polyimide-contained orientation film of 800 Å in thickness was formed on transparent electrodes, which were arranged on a polycarbonate (PC) film substrate, and spacers (manufactured by Sekisui Finechemical Co., Ltd.) of 9 µm in diameter were dispersed on the orientation film. On transparent electrodes formed on the other PC film substrate, an inorganic insulating film E of 2000 ÅA in thickness having a refractive index of 1.45 and made of silicon oxide and titanium oxide was formed, and a polyimide-contained orientation film of 800 Å in thickness was formed on the insulating film E.

Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition al of an amount, which was calculated from the height of and area surrounded by the seal material, was applied onto the substrate, and both the substrates were fixed together by the fixing device. Thereafter, heating at 150° C. was performed for one hour to produce the liquid crystal cell A1.

Then, a polyimide-contained orientation film of 800 Å in thickness was formed on transparent electrodes, which were arranged on a PC film substrate, and spacers (manufactured by Sekisui Finechemical Co., Ltd.) of 5 µm in diameter were dispersed on the orientation film.

On transparent electrodes formed on the other PC film substrate, an inorganic insulating film E of 2000 Å in thickness having a refractive index of 1.45 and made of silicon oxide and titanium oxide was formed, and a polyimide-contained orientation film of 800 Å in thickness was formed on the insulating film E. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition b1 of an amount, which was calculated from the height of and area surrounded by the seal material, was applied onto the substrate, and both the substrates were fixed together by the fixing device. Thereafter, heating at 150° C. was performed for one hour to produce the liquid crystal cell B1.

Further, a polyimide-contained orientation film of 800 Å in thickness was formed on transparent electrodes, which were arranged on the PC film substrate, and spacers (manufactured by Sekisui Finechemical Co., Ltd.) of 5 μm in diameter were dispersed on the orientation film.

On transparent electrodes formed on the other PC film substrate, an inorganic insulating film D of 2000 Å in thickness having a refractive index of 1.7 and made of silicon oxide, titanium oxide and zirconium oxide was formed, and a polyimide-contained orientation film of 800 Å in thickness was formed on the insulating film D. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition c1 of an amount, which was calculated from the height of and area surrounded by the seal material, was applied onto the substrate, and both the substrates were fixed together by the fixing device. Thereafter, heating at 150° C. was performed for one hour to produce the liquid crystal cell C1.

These three kinds of cells A1, B1 and C1 were layered in this order, and a black light absorber film was arranged on the rear surface of the layered structure (i.e., external (rear) surface of the liquid crystal cell A1).

The layered structure was driven with the predetermined voltages to set each cell selectively to the colored state and colorless state. The layered structure exhibited the Y-value of 28.8 in the white display state, the Y-value of 5.0 in the black display state and contrast of 5.8:1 (W/B), and thus it had good display characteristics for both the black and white, and achieved the element of high contrast.

For the color display and the colorless display, the liquid crystal composition a1 was supplied with drive voltages of 90 V and 60 V, respectively. Likewise, the liquid crystal composition b1 was supplied with drive voltages of 65 V and 45 V for the color display and the colorless display, respectively. The liquid crystal composition c1 was supplied with drive voltages of 65 V and 40 V for the color display and the colorless display, respectively.

EXPERIMENTAL EXAMPLE 3

The liquid crystal compositions a1, b1 and c1 were prepared similarly to the experimental example 1

A polyimide-contained orientation film of 800 A in thickness was formed on transparent electrodes, which were arranged on a polycarbonate (PC) film substrate, and spacers (manufactured by Sekisui Finechemical Co., Ltd.) of 9 μm in diameter were dispersed on the orientation film. On transparent electrodes formed on the other PC film substrate, an organic insulating film F of 2000 Å in thickness having a refractive index of 1.6 and made of polyimide resin was formed, and a polyimide-contained orientation film of 800 Å in thickness was formed on the insulating film F.

Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition a1 of an amount, which was calculated from the height of and area surrounded by the seal material, was applied onto the substrate, and both the substrates were fixed together by the fixing device. Thereafter, heating at 150° C. was performed for one hour to produce the liquid crystal cell A1.

Then, a polyimide-contained orientation film of 800 Å in thickness was formed on transparent electrodes, which were arranged on a PC film substrate, and spacers (manufactured by Sekisui Finechemical Co., Ltd.) of 5 μm in diameter were dispersed on the orientation film.

On transparent electrodes formed on the other PC film substrate, an inorganic insulating film G of 2000 Å in thickness having a refractive index of 1.4 and made of silicon oxide was formed, and the polyimide-contained orientation film of 800 Å in thickness was formed on the insulating film G. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition b1 of an amount, which was calculated from the height of and area surrounded by the seal material, was applied onto the substrate, and both the substrates were fixed together by the fixing device. Thereafter, heating at 150° C. was performed for one hour to produce the liquid crystal cell B1.

Further, a polyimide-contained orientation film of 800 Å in thickness was formed on transparent electrodes, which were arranged on a PC film substrate, and spacers (manufactured by Sekisui Finechemical Co., Ltd.) of 5 μm in diameter were dispersed on the orientation film.

On transparent electrodes formed on the other PC film substrate, an organic insulating film F of 2000 Å in thickness having a refractive index of 1.6 and made of polyimide was formed, and a polyimide-contained orientation film of 800 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition c1 of an amount, which was calculated from the height of and area surrounded by the seal material, was applied onto the substrate, and both the substrates were fixed together by the fixing device. Thereafter, heating at 150° C. was performed for one hour to produce the liquid crystal cell C1.

These three kinds of cells A1, B1 and C1 were layered in this order, and a black light absorber film was arranged on the rear surface of the layered structure (i.e., external (rear) surface of the liquid crystal cell A1).

The layered structure was driven with the predetermined voltages to set each cell selectively to the colored state and colorless state. The layered structure exhibited the Y-value of 28.5 in the white display state, the Y-value of 4.8 in the black display state and contrast of 5.9:1 (W/B), and thus it had good display characteristics for both the black and white, and achieved the element of high contrast.

For the color/colorless display, the liquid crystal compositions a1, b1 and c1 were supplied with drive voltages of 90/60 V, 65/45 V and 65/40 V, respectively.

EXPERIMENTAL EXAMPLE 4

The liquid crystal compositions a1, b1 and c1 were prepared similarly to the experimental example 1.

A polyimide-contained orientation film of 800 Å in thickness was formed on transparent electrodes, which were arranged on a polycarbonate (PC) film substrate, and spacers (manufactured by Sekisui Finechemical Co., Ltd.) of 9 μm in diameter were dispersed on the orientation film. On transparent electrodes formed on the other PC film substrate, an inorganic insulating film D of 2000 Å in thickness having a refractive index of 1.7 and made of silicon oxide, titanium oxide and zirconium oxide was formed, and a polyimide-contained orientation film of 800 Å in thickness was formed on the insulating film D.

Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition a1 of an amount, which was calculated from the height of and area surrounded by the seal material, was applied onto the substrate, and both the substrates were fixed together by the fixing device. Thereafter, heating at 150° C. was performed for one hour to produce the liquid crystal cell A1.

Then, a polyimide-contained orientation film of 800 Å in thickness was formed on transparent electrodes, which were arranged on a PC film substrate, and spacers (manufactured by Sekisui Finechemical Co., Ltd.) of 5 μm in diameter were dispersed on the orientation film.

On transparent electrodes formed on the other PC film substrate, an inorganic insulating film G of 2000 Å in thickness having a refractive index of 1.4 and made of silicon oxide was formed, and a polyimide-contained orientation film of 800 Å in thickness was formed on the insulating film G. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition b1 of an amount, which was calculated from the height of and area surrounded by the seal material, was applied onto the substrate, and both the substrates were fixed together by the fixing device. Thereafter, heating at 150° C. was performed for one hour to produce the liquid crystal cell B1.

Further, a polyimide-contained orientation film of 800 Å in thickness was formed on transparent electrodes, which were arranged on a PC film substrate, and spacers (manufactured by Sekisui Finechemical Co., Ltd.) of 5 μm in diameter were dispersed on the orientation film.

On transparent electrodes formed on the other PC film substrate, an inorganic insulating film D of 2000 Å in thickness having a refractive index of 1.7 and made of silicon oxide, titanium oxide and zirconium oxide was formed, and a polyimide-contained orientation film of 800 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition c1 of an amount, which was calculated from the height of and area surrounded by the seal material, was applied onto the substrate, and both the substrates were fixed together by the fixing device. Thereafter, heating at 150° C. was performed for one hour to produce the liquid crystal cell C1.

These three kinds of cells A1, B1 and C1 were layered in this order, and a black light absorber film was arranged on the rear surface of the layered structure (i.e., external (rear) surface of the liquid crystal cell A1).

The layered structure was driven with the predetermined voltages to set each cell selectively to the colored state and colorless state. The layered structure exhibited the Y-value of 30.4 in the white display state, the Y-value of 4.9 in the black display state and contrast of 6.2:1 (W/B), and thus it had good display characteristics for both the black and white, and achieved the element of high contrast.

For the color/colorless display, the liquid crystal compositions a1, b1 and c1 were supplied with drive voltages of 90/60 V, 65/45 V and 65/40 V, respectively.

EXPERIMENTAL EXAMPLE 5

The liquid crystal compositions a1, b1 and c1 were prepared similarly to the experimental example 1

A polyimide-contained orientation film of 800 Å in thickness was formed on transparent electrodes, which were arranged on a polycarbonate (PC) film substrate, and spacers (manufactured by Sekisui Finechemical Co., Ltd.) of 9 μm in diameter were dispersed on the orientation film. On transparent electrodes formed on the other PC film substrate, an inorganic insulating film D of 2000 Å in thickness having a refractive index of 1.7 and made of silicon oxide, titanium oxide and zirconium oxide was formed, and a polyimide-contained orientation film of 800 Å in thickness was formed on the insulating film D.

Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition a1 of an amount, which was calculated from the height of and area surrounded by the seal material, was applied onto the substrate, and both the substrates were fixed together by the fixing device. Thereafter, heating at 150° C. was performed for one hour to produce the liquid crystal cell A1.

Then, a polyimide-contained orientation film of 800 Å in thickness was formed on transparent electrodes, which were arranged on a PC film substrate, and spacers (manufactured by Sekisui Finechemical Co., Ltd.) of 5 μm in diameter were dispersed on the orientation film.

On transparent electrodes formed on the other PC film substrate, an organic insulating film H of 2000 Å in thickness having a refractive index of 1.5 and made of acrylic resin was formed, and a polyimide-contained orientation film of 800 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition b1 of an amount, which was calculated from the height of and area surrounded by the seal material, was applied onto the substrate, and both the substrates were fixed together by the fixing device. Thereafter, heating at 150° C. was performed for one hour to produce the liquid crystal cell B1.

Further, a polyimide-contained orientation film of 800 Å in thickness was formed on transparent electrodes, which were arranged on the PC film substrate, and spacers (manufactured by Sekisui Finechemical Co., Ltd.) of 5 μm in diameter were dispersed on the orientation film.

On transparent electrodes formed on the other PC film substrate, an inorganic insulating film D of 2000 Å in thickness having a refractive index of 1.7 and made of silicon oxide, titanium oxide and zirconium oxide was formed, and the polyimide-contained orientation film of 800 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition c1 of an amount, which was calculated from the height of and area surrounded by the seal material, was applied onto the substrate, and both the substrates were fixed together by the fixing device. Thereafter, heating at 150° C. was performed for one hour to produce the liquid crystal cell C1.

These three kinds of cells A1, B1 and C1 were layered in this order, and a black light absorber film was arranged on the rear surface of the layered structure (i.e., external (rear) surface of the liquid crystal cell A1).

The layered structure was driven with the predetermined voltages to set each cell selectively to the colored state and colorless state. The layered structure exhibited the Y-value of 29.2 in the white display state, the Y-value of 5.0 in the black display state and contrast of 5.8:1 (W/B), and thus it had good display characteristics for both the black and white, and achieved the element of high contrast.

For the color/colorless display, the liquid crystal compositions a1, b1 and c1 were supplied with drive voltages of 90/60 V, 65/45 V and 65/40 V, respectively.

EXPERIMENTAL EXAMPLE 6

The liquid crystal compositions a1, b1 and c1 were prepared similarly to the experimental example 1

A polyimide-contained orientation film of 800 Å in thickness was formed on transparent electrodes, which were arranged on a polycarbonate (PC) film substrate, and spacers (manufactured by Sekisui Finechemical Co., Ltd.) of 9 μm in diameter were dispersed on the orientation film. On transparent electrodes formed on the other PC film substrate, an organic insulating film F of 2000 Å in thickness having a refractive index of 1.6 and made of polyimide resin was formed, and a polyimide-contained orientation film of 800 Å in thickness was formed on the insulating film F.

Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition al of an amount, which was calculated from the height of and area surrounded by the seal material, was applied onto the substrate, and both the substrates were fixed together by the fixing device. Thereafter, heating at 150° C. was performed for one hour to produce the liquid crystal cell A1.

Then, a polyimide-contained orientation film of 800 Å in thickness was formed on transparent electrodes, which were arranged on the PC film substrate, and spacers (manufactured by Sekisui Finechemical Co., Ltd.) of 5 μm in diameter were dispersed on the orientation film.

On transparent electrodes formed on the other PC film substrate, an organic insulating film I of 2000 Å in thickness having a refractive index of 1.3 and made of silicone resin was formed, and a polyimide-contained orientation film of 800 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition b1 of an amount, which was calculated from the height of and area surrounded by the seal material, was applied onto the substrate, and both the substrates were fixed together by the fixing device. Thereafter, heating at 150° C. was performed for one hour to produce the liquid crystal cell B1.

Further, a polyimide-contained orientation film of 800 Å in thickness was formed on transparent electrodes, which were arranged on a PC film substrate, and spacers (manufactured by Sekisui Finechemical Co., Ltd.) of 5 μm in diameter were dispersed on the orientation film.

On transparent electrodes formed on the other PC film substrate, an inorganic insulating film D of 2000 Å in thickness having a refractive index of 1.7 and made of silicon oxide, titanium oxide and zirconium oxide was formed, and a polyimide-contained orientation film of 800 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition c1 of an amount, which was calculated from the height of and area surrounded by the seal material, was applied onto the substrate, and both the substrates were fixed together by the fixing device. Thereafter, heating at 150° C. was performed for one hour to produce the liquid crystal cell C1.

These three kinds of cells A1, B1 and C1 were layered in this order, and a black light absorber film was arranged on the rear surface of the layered structure (i.e., external (rear) surface of the liquid crystal cell A1).

The layered structure was driven with the predetermined voltages to set each cell selectively to the colored state and colorless state. The layered structure exhibited the Y-value of 31.2 in the white display state, the Y-value of 4.9 in the black display state and contrast of 6.4:1 (W/B), and thus it had good display characteristics for both the black and white, and achieved the element of high contrast.

For the color/colorless display, the liquid crystal compositions a1, b1 and c1 were supplied with drive voltages of 90/60 V, 65/45 V and 65/40 V, respectively.

Comparative Experimental Example 1

The liquid crystal compositions a1, b1 and c1 which were prepared similarly to the experimental example 1 were used in the comparative example 1.

A polyimide-contained orientation film of 800 Å in thickness was formed on transparent electrodes, which were arranged on a polycarbonate (PC) film substrate, and spacers (manufactured by Sekisui Finechemical Co., Ltd.) of 9 μm in diameter were dispersed on the orientation film. On transparent electrodes formed on the other PC film substrate, an inorganic insulating film D of 2000 Å in thickness having a refractive index of 1.7 and made of silicon oxide, titanium oxide and zirconium oxide was formed, and a polyimide-contained orientation film of 800 Å in thickness was formed on the insulating film D.

Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition a1 of an amount, which was calculated from the height of and area surrounded by the seal material, was applied onto the substrate, and both the substrates were fixed together by the fixing device. Thereafter, heating at 150° C. was performed for one hour to produce the liquid crystal cell A1.

Then, a polyimide-contained orientation film of 800 Å in thickness was formed on transparent electrodes, which were arranged on a PC film substrate, and spacers (manufactured by Sekisui Finechemical Co., Ltd.) of 5 μm in diameter were dispersed on the orientation film.

On transparent electrodes formed on the other PC film substrate, an inorganic insulating film D of 2000 Å in thickness having a refractive index of 1.7 and made of silicon oxide, titanium oxide and zirconium oxide was formed, and a polyimide-contained orientation film of 800 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition b1 of an amount, which was calculated from the height of and area surrounded by the seal material, was applied onto the substrate, and both the substrates were fixed together by the fixing device. Thereafter, heating at 150° C. was performed for one hour to produce the liquid crystal cell B1.

Further, a polyimide-contained orientation film of 800 Å in thickness was formed on transparent electrodes, which were arranged on a PC film substrate, and spacers (manufactured by Sekisui Finechemical Co., Ltd.) of 5 μm in diameter were dispersed on the orientation film.

On transparent electrodes formed on the other PC film substrate, an inorganic insulating film D of 2000 Å in thickness having a refractive index of 1.7 and made of silicon oxide, titanium oxide and zirconium oxide was formed, and a polyimide-contained orientation film of 800 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition c1 of an amount, which was calculated from the height of and area surrounded by the seal material, was applied onto the substrate, and both the substrates were fixed together by the fixing device. Thereafter, heating at 150° C. was performed for one hour to produce the liquid crystal cell C1.

These three kinds of cells A1, B1 and C1 were layered in this order, and a black light absorber film was arranged on the rear surface of the layered structure (i.e., external (rear) surface of the liquid crystal cell A1).

The layered structure was driven with the predetermined voltages to set each cell selectively to the colored state and colorless state. The layered structure exhibited the Y-value of 26.0 in the white display state, the Y-value of 9.0 in the black display state and contrast of 2.9:1 (W/B). In this element, therefore, scattering occurred to a large extent in black display, and contrast was low.

For the color/colorless display, the liquid crystal compositions a1, b1 and c1 were supplied with drive voltages of 90/60 V, 65/45 V and 65/40 V, respectively.

Comparative Experimental Example 2

The liquid crystal compositions a1, b1 and c1 which were prepared similarly to the experimental example 1 were used.

A polyimide-contained orientation film of 800 Å in thickness was formed on transparent electrodes, which were arranged on a polycarbonate (PC) film substrate, and spacers (manufactured by Sekisui Finechemical Co., Ltd.) of 9 μm in diameter were dispersed on the orientation film. On transparent electrodes formed on the other PC film substrate, an inorganic insulating film E of 2000 Å in thickness having a refractive index of 1.45 and made of silicon oxide and titanium oxide was formed, and a polyimide-contained orientation film of 800 Å in thickness was formed on the insulating film.

Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition a1 of an amount, which was calculated from the height of and area surrounded by the seal material, was applied onto the substrate, and both the substrates were fixed together by the fixing device. Thereafter, heating at 150° C. was performed for one hour to produce the liquid crystal cell A1.

Then, a polyimide-contained orientation film of 800 Å in thickness was formed on transparent electrodes, which were arranged on a PC film substrate, and spacers (manufactured by Sekisui Finechemical Co., Ltd.) of 5 μm in diameter were dispersed on the orientation film.

On transparent electrodes formed on the other PC film substrate, an inorganic insulating film E of 2000 Å in thickness having a refractive index of 1.45 and made of silicon oxide and titanium oxide was formed, and a polyimide-contained orientation film of 800 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition b1 of an amount, which was calculated from the height of and area surrounded by the seal material, was applied onto the substrate, and both the substrates were fixed together by the fixing device. Thereafter, heating at 150° C. was performed for one hour to produce the liquid crystal cell B1.

Further, a polyimide-contained orientation film of 800 Å in thickness was formed on transparent electrodes, which were arranged on the PC film substrate, and spacers (manufactured by Sekisui Finechemical Co., Ltd.) of 5 μm in diameter were dispersed on the orientation film.

On transparent electrodes formed on the other PC film substrate, an inorganic insulating film E of 2000 Å in thickness having a refractive index of 1.45 and made of silicon oxide and titanium oxide was formed, and a polyimide-contained orientation film of 800 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition c1 of an amount, which was calculated from the height of and area surrounded by the seal material, was applied onto the substrate, and both the substrates were fixed together by the fixing device. Thereafter, heating at 150° C. was performed for one hour to produce the liquid crystal cell C1.

These three kinds of cells A1, B1 and C1 were layered in this order, and a black light absorber film was arranged on the rear surface of the layered structure (i.e., external (rear) surface of the liquid crystal cell A1).

The layered structure was driven with the predetermined voltages to set each cell selectively to the colored state and colorless state. The layered structure exhibited the Y-value of 23.3 in the white display state, the Y-value of 6.8 in the black display state and contrast of 3.4:1 (W/B). In this element, therefore, scattering occurred to a large extent in black display, and contrast was low.

For the color/colorless display, the liquid crystal compositions a1, b1 and c1 were supplied with drive voltages of 90/60 V, 65/45 V and 65/40 V, respectively.

The following table 1 represents the results of the experimental examples 1–6 and the comparative experimental examples 1 and 2 described above.

TABLE 1

|  |  | Remotest Side Layer (Cell A1) | Intermediate Layer (Cell B1) | Observation Side Layer (Cell C1) | Difference in Refractivity of IF (C1-B1) |
|---|---|---|---|---|---|
| Ex. 1 | IF Refractivty | 1.7 | 1.45 | 1.7 | 0.25 |
|  | Y in White |  | 29 |  |  |
|  | Y in Black |  | 4.8 |  |  |
|  | Contrast |  | 6.0:1 |  |  |
| Ex. 2 | IF Refractivty | 1.45 | 1.45 | 1.7 | 0.25 |
|  | Y in White |  | 28.8 |  |  |
|  | Y in Black |  | 5 |  |  |
|  | Contrast |  | 5.8:1 |  |  |
| Ex. 3 | IF Refractivty | 1.6 | 1.4 | 1.6 | 0.2 |
|  | Y in White |  | 28.5 |  |  |
|  | Y in Black |  | 4.8 |  |  |
|  | Contrast |  | 5.9:1 |  |  |
| Ex. 4 | IF Refractivty | 1.7 | 1.4 | 1.7 | 0.3 |
|  | Y in White |  | 30.4 |  |  |
|  | Y in Black |  | 4.9 |  |  |
|  | Contrast |  | 6.2:1 |  |  |
| Ex. 5 | IF Refractivty | 1.7 | 1.5 | 1.7 | 0.2 |
|  | Y in White |  | 29.2 |  |  |
|  | Y in Black |  | 5 |  |  |
|  | Contrast |  | 5.8:1 |  |  |
| Ex. 6 | IF Refractivty | 1.6 | 1.3 | 1.7 | 0.4 |
|  | Y in White |  | 31.2 |  |  |
|  | Y in Black |  | 4.9 |  |  |
|  | Contrast |  | 6.4:1 |  |  |
| C. Ex. 1 | IF Refractivty | 1.7 | 1.7 | 1.7 | 0 |
|  | Y in White |  | 26 |  |  |
|  | Y in Black |  | 9 |  |  |
|  | Contrast |  | 2.9:1 |  |  |
| C. Ex. 2 | IF Refractivty | 1.45 | 1.45 | 1.45 | 0 |
|  | Y in White |  | 23.3 |  |  |
|  | Y in Black |  | 6.8 |  |  |
|  | Contrast |  | 34:1 |  |  |

Ex.: Experimental Example
C. Ex.: Comparative Experimental Example
IF: Insulating Film As shown in Table 1, the insulating film in the layer on the observation side (liquid crystal cell C1) has the refractive index larger than that of the insulating film in the intermediate layer (liquid crystal cell B1) in each of the layered type liquid crystal elements of the experimental examples 1–6. In these elements, the ratio between the Y-value in white display and the Y-value in black display is in a range from 5.8:1–6.4:1, and therefore can achieve high contrast. In contrast to this, the insulating film in the layer on the observation side (liquid crystal cell C1) has the refractive index equal to that of the insulating film in the intermediate layer (liquid crystal cell B1) in each of the layered type liquid crystal elements of the comparative experimental examples 1 and 2. In these elements, the ratio between the Y-value in white display and the Y-value in black display is in a range from 2.9:1–3.4:1, and therefore the contrast is low.

For achieving the fourth layered type liquid crystal element, each of the layered type liquid crystal elements shown in FIGS. 1 to 3 is configured such that at least one of the liquid crystal layers b, g and r in the layered three liquid crystal elements B, G and R is different in thickness from the other liquid crystal layers, and the liquid crystal layer r in the outermost position remote from the element observation side has the thickness equal to or larger than those of the liquid crystal layers b and g on the observation side, and contains the liquid crystal material having the refractive index anisotropy value equal to or larger than that of the liquid crystal materials of the liquid crystal layers b and g on the observation side.

In each of the layered type liquid crystal elements LD1, LD2 and LD3 forming the liquid crystal element of the fourth type, the liquid crystal layer r in the outermost position remote from the observation side has the thickness equal to or larger than those of the other liquid crystal layers b and g. This liquid crystal layer r receive the external light coming from the element observation side only to a restricted extent, and the light reflected thereby can return to the element observation side only to a restricted extent. Further, at least one of the three liquid crystal layers b, g and r is different in thickness from the other liquid crystal layers, and in other words, at least one of the liquid crystal layers b and g except for the liquid crystal layer r, which is in the outermost position remote from the element observation side, has a smaller thickness than the liquid crystal layer r. As described above, the liquid crystal layer r reliably has the sufficient thickness compared with the other liquid crystal layers b and g, and therefore can have a large reflectance. Thereby, the layered type liquid crystal element can perform bright display as a whole.

Further, the liquid crystal layer r contains the liquid crystal material having the refractive index anisotropy value equal to or larger than those of the liquid crystal layers b and g on the element observation side. Therefore, bright display can be performed.

At least one of the liquid crystal layers b and g other than the liquid crystal layer r has a smaller thickness than the liquid crystal layer r, and therefore requires a low drive voltage so that the bright display can be performed, with the reduced power consumption of the layered type liquid crystal element as a whole.

For achieving the bright display, the liquid crystal layer r contains the liquid crystal material having the refractive index anisotropy value of 0.17 or more. The upper limit of this value may be in a range from about 0.30 to about 0.28 from the viewpoint of availability of the liquid crystal and others. The excessively large refractive index anisotropy value excessively increases the scattering components contributing to increase in brightness so that sufficient transparency (degree of black) cannot be achieved in the transparent state (in other words, in black display) of the layered type liquid crystal element, and the contrast lowers. Therefore, the refractive index anisotropy value is determined within a range not causing the foregoing disadvantages.

If the scattering components are large in image display, the contrast lowers. Therefore, for suppressing the scattering components which adversely affect the contrast, a difference from about 0 to about 0.03, and more preferably from about 0 to about 0.01 is set in refractive index anisotropy value between the neighboring liquid crystal layers being located on the element observation side and the side remote from the element observation side. Further, a difference from about 0 to about 0.04, and more preferably from about 0 to about 0.02 is set between the refractive index anisotropy value of the liquid crystal layer b and the refractive index anisotropy value of the liquid crystal layer r.

In the transparent state, and in other words, in the black display according to this example, it is desired to achieve a high transparency (degree of black) and good contrast, and it is also preferable to allow low-voltage drive. For achieving these situations and avoiding such a situation that white display is difficult due to an excessively large reflection intensity (i.e., for allowing good white display), the maximum thickness of the thicknesses of the three liquid crystal layers b, g and r is 7 µm or less. Accordingly, the thickness of the liquid crystal layer r is 7 µm or less.

For improving the color balance in image display, it is preferable that the liquid crystal layer r for red display has the selective reflection wavelength of 650 nm–690 nm, and the liquid crystal layer b for blue display has the selective reflection wavelength of 460 nm–500 nm. It is particularly preferable that the liquid crystal layer r for red display has the selective reflection wavelength, which is in a range from 650 nm to 680 nm (further preferably, 650 nm–670 nm), and thus is shifted toward the shorter side from the general selective reflection wavelength for the red display, and the liquid crystal layer b for blue display has the selective reflection wavelength, which is in a range from 480 nm to 500 nm (further preferably, from 490 nm–500 nm), and thus is shifted toward the longer side from the general selective reflection wavelength for the blue display. This is advantageous for improving the color balance.

In any one of the above structures, one of the liquid crystal layers may contain an ultraviolet-absorbing agent for reducing the scattering components on the observation side and improving the contrast in the image display. More specifically, the content of the ultraviolet-absorbing agent is substantially in a range from 0.1% to 5% by weight.

In connection with the liquid crystal element of the fourth type, description will now be given on specific experimental examples 7–12 and a comparative Experimental example 3. However, the invention is not restricted to such experimental examples. Layered type liquid crystal elements in the following experimental examples have the substantially same structures as the layered type liquid crystal element LD2 shown in FIG. 2. The neighboring liquid crystal elements are fixed together by acrylic adhesive sheets.

In the respective examples described below, the reflectances were determined by measuring the luminous reflectance (Y-values) with a reflective spectrocolorimeter CM-3700d (manufactured by Minolta Co., Ltd.). A smaller Y-value means a high transparency. The contrast is given by (Y-value in the high reflectance state)/(Y-value in the low reflectance state). In the layered type liquid crystal element having the three-layer structure in each of the experimental examples described below, a high reflectance state (i.e., white or nearly white state) was attained when the liquid crystal cells (liquid crystal elements) in all the layers were simultaneously set to the colored state, and a low reflectance state, in which all the elements became transparent or nearly transparent so that the black light absorber film could be viewed, was attained when the liquid crystal cells in all the layers were simultaneously set to the colorless state.

Accordingly, the contrast is represented as the reflectance ratio (W/B) between the white display and black display.

EXPERIMENTAL EXAMPLE 7

Three kinds of nematic liquid crystal A, B and C described below were used.

Nematic liquid crystal A has refractive index anisotropy value $\Delta n$ of 0.212, dielectric anisotropy (permittivity anisotropy) $\Delta \epsilon$ of 40 and isotropic phase transition temperature $T_{NI}$ of 103° C.

Nematic liquid crystal B has refractive index anisotropy value $\Delta n$ of 0.210, dielectric anisotropy $\Delta \epsilon$ of 39 and isotropic phase transition temperature $T_{NI}$ of 100° C.

Nematic liquid crystal C has refractive index anisotropy value $\Delta n$ of 0.214, dielectric anisotropy $\Delta \epsilon$ of 76 and isotropic phase transition temperature $T_{NI}$ of 143° C.

Predetermined amounts of chiral materials S-811 (manufactured by Merck & Co.) were added to the respective kinds of nematic liquid crystal so that the liquid crystal compositions a1, b1 and c1 were prepared. The compositions a1, b1 and c1 could reflect the light of the wavelengths of about 680 nm, about 560 nm and about 480 nm, respectively.

The liquid crystal compositions a1, b1 and c1 had the dielectric anisotropies $\Delta \epsilon$ of 22, 17 and 8, respectively, and also had refractive index anisotropy values $\Delta n$ of 0.183, 0.171 and 0.176, respectively.

A polyimide-contained orientation film of 800 Å in thickness was formed on transparent electrodes, which were arranged on a polycarbonate (PC) film substrate and have belt-like patterned forms, and spacers (manufactured by Sekisui Finechemical Co., Ltd.) of 6 µm in diameter were dispersed on the orientation film. On transparent electrodes formed on the other PC film substrate, a polyimide-contained insulating film of 2000 Å in thickness was formed, and a polyimide-contained orientation film of 800 Å in thickness was formed thereon.

Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition a1 of an amount, which was calculated from the height of and area surrounded by the seal material, was applied onto the substrate, and both the substrates were fixed together by a fixing device shown in FIG. 6. Thereafter, heating at 150° C. was performed for one hour to produce the liquid crystal cell (liquid crystal element) A1.

Then, a polyimide-contained orientation film of 800 Å in thickness was formed on transparent electrodes, which were arranged on a PC film substrate, and spacers (manufactured by Sekisui Finechemical Co., Ltd.) of 5 µm in diameter were dispersed on the orientation film.

On transparent electrodes formed on the other PC film substrate, a polyimide-contained insulating film of 2000 Å in thickness was formed, and a polyimide-contained orientation film of 800 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition b1 of an amount, which was calculated from the height of and area surrounded by the seal material, was applied onto the substrate, and both the substrates were fixed together by a similar fixing device. Thereafter, heating at 150° C. was performed for one hour to produce the liquid crystal cell (liquid crystal element) B1.

Further, a polyimide-contained orientation film of 800 Å in thickness was formed on transparent electrodes, which were arranged on the PC film substrate, and spacers (manufactured by Sekisui Finechemical Co., Ltd.) of 4 µm in diameter were dispersed on the orientation film.

On transparent electrodes formed on the other PC film substrate, a polyimide-contained insulating film of 2000 Å in thickness was formed, and a polyimide-contained orientation film of 800 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition c1 of an amount, which was calculated from the height of and area surrounded by the seal material, was applied onto the substrate, and both the substrates were fixed together by the fixing device. Thereafter, heating at 150° C. was performed for one hour to produce the liquid crystal cell (liquid crystal element) C1.

The cells A1, B1 and C1 were filled with the liquid crystal compositions a1, b1 and c1 having thicknesses of 6 μm, 5 μm and 4 μm, respectively.

These three kinds of cells A1, B1 and C1 were layered in this order, and a black light absorber film was arranged on the rear surface of the layered structure (i.e., external (rear) surface of the liquid crystal cell A1).

The layered structure was driven with the predetermined voltages to set each cell selectively to the colored state and colorless state. It was observed from the cell C1 side that the layered structure exhibited the contrast of 5.8:1 (W/B).

In this layered type liquid crystal element, the liquid crystal layer of the cell A1 remotest from the observation side had the largest thickness, and contained the liquid crystal composition a1 having the largest refractive index value Δn. The liquid crystal composition a1 contained in the liquid crystal layer of the element A1 remotest from the observation side had the refractive index anisotropy value Δn of 0.17 or more. Further, a difference of 0.005 was present in refractive index anisotropy value Δn between the liquid crystal composition c1 on the observation side and the intermediate liquid crystal composition b1. Also, a difference of 0.012 was present in refractive index anisotropy value Δn between the liquid crystal compositions b1 and a1. Further, a difference of 0.007 was present in refractive index anisotropy value Δn between the liquid crystal composition c1 on the observation side and the liquid crystal composition a1 remotest from the observation side. Both the white display characteristics and the black display characteristics were good, and the layered type liquid crystal element could achieve high contrast.

For the color display and the colorless display, the liquid crystal composition a1 was supplied with drive voltages of 50 V and 30 V, respectively. Likewise, the liquid crystal composition b1 was supplied with drive voltages of 45 V and 30 V for the color display and the colorless display, respectively. The liquid crystal composition c1 was supplied with drive voltages of 65 V and 45 V for the color display and the colorless display, respectively.

EXPERIMENTAL EXAMPLE 8

Predetermined amounts of chiral materials CB15, R811, R1011 (all manufactured by Merck & Co.) were added to the nematic liquid crystal B employed in the experimental example 7 so that the liquid crystal compositions b2, b3 and b4 were prepared. The compositions b2, b3 and b4 could reflect the light at the wavelengths of about 670 nm, about 550 nm and about 470 nm, respectively.

The liquid crystal compositions b2, b3 and b4 had the dielectric anisotropies Δε of 21, 17 and 15, respectively, and also had refractive index anisotropy values Δn of 0.182, 0.170 and 0.170, respectively.

A polyimide-contained orientation film of 800 Å in thickness was formed on transparent electrodes, which were arranged on a polycarbonate (PC) film substrate, and spacers (manufactured by Sekisui Finechemical Co., Ltd.) of 6 μm in diameter were dispersed on the orientation film.

On transparent electrodes formed on the other PC film substrate, a polyimide-contained insulating film of 2000 Å in thickness was formed, and a polyimide-contained orientation film of 800 Å in thickness was formed thereon. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition b2 of an amount, which was calculated from the height of and area surrounded by the seal material, was applied onto the substrate, and both the substrates were fixed together by a fixing device. Thereafter, heating at 150° C. was performed for one hour to produce the liquid crystal cell B2.

Then, a polyimide-contained orientation film of 800 Å in thickness was formed on transparent electrodes, which were arranged on a PC film substrate, and spacers (manufactured by Sekisui Finechemical Co., Ltd.) of 5 μm in diameter were dispersed on the orientation film.

On transparent electrodes formed on the other PC film substrate, a polyimide-contained insulating film of 2000 Å in thickness was formed, and a polyimide-contained orientation film of 800 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition b3 of an amount, which was calculated from the height of and area surrounded by the seal material, was applied onto the substrate, and both the substrates were fixed together by the fixing device. Thereafter, heating at 150° C. was performed for one hour to produce the liquid crystal cell B3.

Further, a polyimide-contained orientation film of 800 Å in thickness was formed on transparent electrodes, which were arranged on a PC film substrate, and spacers (manufactured by Sekisui Finechemical Co., Ltd.) of 5 μm in diameter were dispersed on the orientation film.

On transparent electrodes formed on the other PC film substrate, a polyimide-contained insulating film of 2000 Å in thickness was formed, and a polyimide-contained orientation film of 800 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition b4 of an amount, which was calculated from the height of and area surrounded by the seal material, was applied onto the substrate, and both the substrates were fixed together by the fixing device. Thereafter, heating at 150° C. was performed for one hour to produce the liquid crystal cell (liquid crystal element) B4.

The cells B2, B3 and B4 were filled with the liquid crystal compositions b2, b3 and b4 having thicknesses of 6 μm, 5 μm and 5 μm, respectively.

These three kinds of cells B2, B3 and B4 were layered in this order, and a black light absorber film was arranged on the rear surface of the layered structure (i.e., external (rear) surface of the liquid crystal cell B2).

The layered structure was driven with the predetermined voltages to set each cell selectively to the colored state and colorless state. It was observed that the layered structure exhibited the contrast of 6.2:1 (W/B).

In this layered type liquid crystal element, the liquid crystal layer of the element B2 remotest from the observation side had the largest thickness, and contained the liquid crystal composition b2 having the largest refractive index anisotropy value Δn. The liquid crystal composition b2 contained in the liquid crystal layer of the element B2 remotest from the observation side had the refractive index anisotropy value Δn of 0.17 or more. Further, no difference was present in refractive index anisotropy value Δn between the liquid crystal composition b4 on the observation side and the intermediate liquid crystal composition b3. Also, a difference of 0.012 was present in refractive index anisotropy value Δn between the liquid crystal compositions b3 and b2. Further, a difference of 0.012 was present in refractive index anisotropy value Δn between the liquid crystal composition b4 on the observation side and the liquid crystal composition b2 remotest from the observation side. Both the white display characteristics and the black display characteristics were good, and the layered type liquid crystal element could achieve high contrast.

For the color/colorless display, the liquid crystal compositions b2, b3 and b4 were supplied with drive voltages of 45/30 V, 45/30 V and 50/35 V, respectively.

EXPERIMENTAL EXAMPLE 9

Three kinds of nematic liquid crystal D, E and C described below were used.

Nematic liquid crystal D has refractive index anisotropy value Δn of 0.217, dielectric anisotropy Δε of 7.9 and temperature $T_{NI}$ of transition to isotropic phase of 122° C.

Nematic liquid crystal E has refractive index anisotropy value Δn of 0.216, dielectric anisotropy Δε of 7.6 and temperature $T_{NI}$ of transition to isotropic phase of 126° C.

Nematic liquid crystal C was the same as the nematic liquid crystal C used in the experimental example 7.

Predetermined amounts of chiral material R811 (all manufactured by Merck & Co.) were added to the respective kinds of nematic liquid crystal so that the liquid crystal compositions d1, e1 and c2 were prepared. The compositions d1, e1 and c2 could reflect the light at the wavelengths of about 650 nm, about 560 nm and about 490 nm, respectively.

The liquid crystal compositions d1, e1 and c2 had the dielectric anisotropies Δε of 7, 6.5 and 17, respectively, and also had refractive index anisotropy values Δn of 0.198, 0.179 and 0.176, respectively.

A polyimide-contained orientation film of 800 Å in thickness was formed on transparent electrodes, which were arranged on a polycarbonate (PC) film substrate, and spacers (manufactured by Sekisui Finechemical Co., Ltd.) of 6 μm in diameter were dispersed on the orientation film.

On transparent electrodes formed on the other PC film substrate, a polyimide-contained insulating film of 2000 Å in thickness was formed, and a polyimide-contained orientation film of 800 Å in thickness was formed thereon. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition d1 of an amount, which was calculated from the height of and area surrounded by the seal material, was applied onto the substrate, and both the substrates were fixed together by a fixing device. Thereafter, heating at 150° C. was performed for one hour to produce the liquid crystal cell D1.

Then, a polyimide-contained orientation film of 800 Å in thickness was formed on transparent electrodes, which were arranged on a PC film substrate, and spacers (manufactured by Sekisui Finechemical Co., Ltd.) of 5 μm in diameter were dispersed on the orientation film.

On transparent electrodes formed on the other PC film substrate, a polyimide-contained insulating film of 2000 Å in thickness was formed, and a polyimide-contained orientation film of 800 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition e1 of an amount, which was calculated from the height of and area surrounded by the seal material, was applied onto the substrate, and both the substrates were fixed together by the fixing device. Thereafter, heating at 150° C. was performed for one hour to produce the liquid crystal cell E1.

Further, a polyimide-contained orientation film of 800 Å in thickness was formed on transparent electrodes, which were arranged on a PC film substrate, and spacers (manufactured by Sekisui Finechemical Co., Ltd.) of 3 μm in diameter were dispersed on the orientation film.

On transparent electrode formed on the other PC film substrate, a polyimide-contained insulating film of 2000 Å in thickness was formed, and a polyimide-contained orientation film of 800 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition c2 of an amount, which was calculated from the height of and area surrounded by the seal material, was applied onto the substrate, and both the substrates were fixed together by the fixing device. Thereafter, heating at 150° C. was performed for one hour to produce the liquid crystal cell (liquid crystal element) C2.

The liquid crystal cells D1, E1 and C2 were filled with the liquid crystal compositions d1, e1 and c2 having thicknesses of 6 μm, 5 μm and 3 μm, respectively.

These three kinds of cells D1, E1 and C2 were layered in this order, and a black light absorber film was arranged on the rear surface of the layered structure (i.e., external (rear) surface of the liquid crystal cell D1).

The layered structure was driven with the predetermined voltages to set each cell selectively to the colored state and colorless state. It was observed that the layered structure exhibited the contrast of 5.8:1 (W/B).

In this layered type liquid crystal element, the liquid crystal layer of the element D1 remotest from the observation side had the largest thickness, and contained the liquid crystal composition d1 having the largest refractive index anisotropy value. The liquid crystal composition d1 contained in the liquid crystal layer of the element D1 remotest from the observation side had the refractive index anisotropy value Δn of 0.17 or more. Further, a difference of 0.003 was present in refractive index anisotropy value Δn between the liquid crystal composition c2 on the observation side and the intermediate liquid crystal composition e1. Also, a difference of 0.019 was present in refractive index anisotropy value Δn between the liquid crystal compositions e1 and d1.

Further, a difference of 0.022 was present in refractive index anisotropy value Δn between the liquid crystal composition c2 on the observation side and the liquid crystal composition d1 remotest from the observation side. Both the white display characteristics and the black display characteristics were good, and the layered type liquid crystal element could achieve high contrast.

For the color/colorless display, the liquid crystal compositions d1, e1 and c2 were supplied with drive voltages of 70/50 V, 75/50 V and 65/45 V, respectively.

EXPERIMENTAL EXAMPLE 10

Predetermined amounts of chiral material R811 were added to the respective kinds of nematic liquid crystal D, E and C, which are the same as those used in the experimental example 9 so that the liquid crystal compositions d1, e1 and c2 were prepared. The compositions d1, e1 and c2 could reflect the light at the wavelengths of about 650 nm, about 560 nm and about 490 nm, respectively. An ultraviolet absorber agent BT-175 (manufactured by Nippon Kayaku Co., Ltd.) was added at 0.5% by weight to the composition c2 to produce a liquid crystal composition c2'.

The liquid crystal compositions d1, e1 and c2' had the dielectric anisotropies Δε of 7, 6.5 and 17, respectively, and also had refractive index anisotropy values of 0.198, 0.179 and 0.176, respectively.

A polyimide-contained orientation film of 800 Å in thickness was formed on transparent electrodes, which were arranged on a polycarbonate (PC) film substrate, and spacers (manufactured by Sekisui Finechemical Co., Ltd.) of 6 Mm in diameter were dispersed on the orientation film.

On transparent electrodes formed on the other PC film substrate, a polyimide-contained insulating film of 2000 Å in thickness was formed, and a polyimide-contained orientation film of 800 Å in thickness was formed thereon. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition d1 of an amount, which was calculated from the height of and area surrounded by the seal material, was applied onto the substrate, and both the substrates were fixed together by a fixing device. Thereafter, heating at 150° C. was performed for one hour to produce the liquid crystal cell D1.

Then, a polyimide-contained orientation film of 800 Å in thickness was formed on transparent electrodes, which were arranged on a PC film substrate, and spacers (manufactured by Sekisui Finechemical Co., Ltd.) of 5 μm in diameter were dispersed on the orientation film.

On transparent electrodes formed on the other PC film substrate, a polyimide-contained insulating film of 2000 Å in thickness was formed, and a polyimide-contained orientation film of 800 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition e1 of an amount, which was calculated from the height of and area surrounded by the seal material, was applied onto the substrate, and both the substrates were fixed together by the fixing device. Thereafter, heating at 150° C. was performed for one hour to produce the liquid crystal cell E1.

Further, a polyimide-contained orientation film of 800 Å in thickness was formed on the transparent electrodes, which were arranged on a PC film substrate, and spacers (manufactured by Sekisui Finechemical Co., Ltd.) of 3 μm in diameter were dispersed on the orientation film.

On transparent electrodes formed on the other PC film substrate, a polyimide-contained insulating film of 2000 Å in thickness was formed, and a polyimide-contained orientation film of 800 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition c2' of an amount, which was calculated from the height of and area surrounded by the seal material, was applied onto the substrate, and both the substrates were fixed together by the fixing device. Thereafter, heating at 150° C. was performed for one hour to produce the liquid crystal cell (liquid crystal element) C2'.

The liquid crystal cells D1, E1 and C2' were filled with the liquid crystal compositions d1, e1 and c2' having thicknesses of 6 μm, 5 μm and 3 μm, respectively.

These three kinds of cells D1, E1 and C2' were layered in this order, and a black light absorber film was arranged on the rear surface of the layered structure.

The layered structure was driven with the predetermined voltages to set each cell selectively to the colored state and colorless state. It was observed that the layered structure exhibited the contrast of 6.5:1 (W/B).

In this layered type liquid crystal element, the liquid crystal layer of the element D1 remotest from the observation side had the largest thickness, and contained the liquid crystal composition d1 having the largest refractive index anisotropy value. The liquid crystal composition d1 contained in the liquid crystal layer of the element D1 remotest from the observation side had the refractive index anisotropy value Δn of 0.17 or more. Further, a difference of 0.003 was present in refractive index anisotropy value Δn between the liquid crystal composition c2' on the observation side and the intermediate liquid crystal composition e1. Also, a difference of 0.019 was present in refractive index anisotropy value Δn between the liquid crystal compositions e1 and d1.

Further, a difference of 0.022 was present in refractive index anisotropy value Δn between the liquid crystal composition c2' on the observation side and the liquid crystal composition d1 remotest from the observation side. Further, the liquid crystal composition c2' contains the ultraviolet absorber agent.

Compared with the experimental example 9, scattering of the light of the short wavelengths was reduced. Further, both the white display characteristics and the black display characteristics were good, and the layered type liquid crystal element could achieve high contrast.

For the color/colorless display, the liquid crystal compositions d1, e1 and c2' were supplied with drive voltages of 70/50 V, 75/50 V and 65/45 V, respectively.

EXPERIMENTAL EXAMPLE 11

Predetermined amounts of chiral material R811 were added to the respective kinds of nematic liquid crystal D, E and B, which are the same as those used in the foregoing experimental examples so that the liquid crystal compositions d1, e1 and b4 were prepared. The compositions d1, e1 and b4 could reflect the light at the wavelengths of about 650 nm, about 560 nm and about 470 nm, respectively.

The liquid crystal compositions d1, e1 and b4 had the dielectric anisotropies $\Delta\epsilon$ of 7, 6.5 and 15, respectively, and also had refractive index anisotropy values of 0.198, 0.179 and 0.170, respectively.

A polyimide-contained orientation film of 800 Å in thickness was formed on transparent electrodes, which were arranged on a PC film substrate, and spacers (manufactured by Sekisui Finechemical Co., Ltd.) of 6 µm in diameter were dispersed on the orientation film.

On transparent electrodes formed on the other PC film substrate, a polyimide-contained insulating film of 2000 Å in thickness was formed, and a polyimide-contained orientation film of 800 Å in thickness was formed thereon. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition d1 of an amount, which was calculated from the height of and area surrounded by the seal material, was applied onto the substrate, and both the substrates were fixed together by a fixing device. Thereafter, heating at 150° C. was performed for one hour to produce the liquid crystal cell D1.

Then, a polyimide-contained orientation film of 800 Å in thickness was formed on transparent electrodes, which were arranged on a PC film substrate, and spacers (manufactured by Sekisui Finechemical Co., Ltd.) of 5 µm in diameter were dispersed on the orientation film.

On transparent electrodes formed on the other PC film substrate, a polyimide-contained insulating film of 2000 Å in thickness was formed, and a polyimide-contained orientation film of 800 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition e1 of an amount, which was calculated from the height of and area surrounded by the seal material, was applied onto the substrate, and both the substrates were fixed together by the fixing device. Thereafter, heating at 150° C. was performed for one hour to produce the liquid crystal cell E1.

Further, a polyimide-contained orientation film of 800 Å in thickness was formed on transparent electrodes, which were arranged on a PC film substrate, and spacers (manufactured by Sekisui Finechemical Co., Ltd.) of 5 µm in diameter were dispersed on the orientation film.

On transparent electrodes formed on the other PC film substrate, a polyimide-contained insulating film of 2000 Å in thickness was formed, and a polyimide-contained orientation film of 800 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition b4 of an amount, which was calculated from the height of and area surrounded by the seal material, was applied onto the substrate, and both the substrates were fixed together by the fixing device. Thereafter, heating at 150° C. was performed for one hour to produce the liquid crystal cell (liquid crystal element) B4.

The liquid crystal cells D1, E1 and B4 were filled with the liquid crystal compositions d1, e1 and b4 having thicknesses of 6 µm, 5 µm and 5 µm, respectively.

These three kinds of cells D1, E1 and B4 were layered in this order, and a black light absorber film was arranged on the rear surface of the layered structure.

The layered structure was driven with the predetermined voltages to set each cell selectively to the colored state and colorless state. It was observed that the layered structure exhibited the contrast of 6.0:1 (W/B).

In this layered type liquid crystal element, the liquid crystal layer of the element D1 remotest from the observation side had the largest thickness, and contained the liquid crystal composition d1 having the largest refractive index anisotropy value $\Delta n$. The liquid crystal composition d1 contained in the liquid crystal layer of the element D1 remotest from the observation side had the refractive index anisotropy value $\Delta n$ of 0.17 or more. Further, a difference of 0.009 was present in refractive index anisotropy value $\Delta n$ between the liquid crystal composition b4 on the observation side and the intermediate liquid crystal composition e1. Also, a difference of 0.019 was present in refractive index anisotropy value $\Delta n$ between the liquid crystal compositions e1 and d1.

Further, a difference of 0.028 was present in refractive index anisotropy value $\Delta n$ between the liquid crystal composition b4 on the observation side and the liquid crystal composition d1 remotest from the observation side. Further, both the white display characteristics and the black display characteristics were good, and the layered type liquid crystal element could achieve high contrast.

For the color/colorless display, the liquid crystal compositions d1, e1 and b4 were supplied with drive voltages of 70/50 V, 75/50 V and 50/35 V, respectively.

EXPERIMENTAL EXAMPLE 12

Predetermined amounts of chiral material R811 were added to the respective kinds of nematic liquid crystal A, E and C, which are the same as those used in the foregoing experimental examples so that the liquid crystal compositions a1', e1 and c2 were prepared. The compositions a1', e1 and c2 could reflect the light at the wavelengths of about 670 m, about 560 nm and about 490 nm, respectively. The ultraviolet absorber agent BT-175 (manufactured by Nippon Kayaku Co., Ltd.) was added at 1% by weight to the composition c2 to produce a liquid crystal composition c2".

The liquid crystal compositions a1', e1 and c2" had the dielectric anisotropies $\Delta\epsilon$ of 22, 6.5 and 17, respectively, and also had refractive index anisotropy values of 0.183, 0.179 and 0.176, respectively.

A polyimide-contained orientation film of 800 Å in thickness was formed on transparent electrodes, which were arranged on a PC film substrate, and spacers (manufactured by Sekisui Finechemical Co., Ltd.) of 6 µm in diameter were dispersed on the orientation film.

On transparent electrodes formed on the other PC film substrate, a polyimide-contained insulating film of 2000 Å in thickness was formed, and a polyimide-contained orientation film of 800 Å in thickness was formed thereon. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition a1' of an amount, which was calculated from the height of and area surrounded by the seal material, was applied onto the substrate, and both the substrates were fixed together by a fixing device. Thereafter, heating at 150° C. was performed for one hour to produce the liquid crystal cell A1'.

Then, a polyimide-contained orientation film of 800 Å in thickness was formed on transparent electrodes, which were arranged on a PC film substrate, and spacers (manufactured by Sekisui Finechemical Co., Ltd.) of 5 μm in diameter were dispersed on the orientation film.

On transparent electrodes formed on the other PC film substrate, a polyimide-contained insulating film of 2000 Å in thickness was formed, and a polyimide-contained orientation film of 800 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition e1 of an amount, which was calculated from the height of and area surrounded by the seal material, was applied onto the substrate, and both the substrates were fixed together by the fixing device. Thereafter, heating at 150° C. was performed for one hour to produce the liquid crystal cell E1.

Further, a polyimide-contained orientation film of 800 Å in thickness was formed on transparent electrodes, which were arranged on the PC film substrate, and spacers (manufactured by Sekisui Finechemical Co., Ltd.) of 3 μm in diameter were dispersed on the orientation film.

On transparent electrodes formed on the other PC film substrate, a polyimide-contained insulating film of 2000 Å in thickness was formed, and a polyimide-contained orientation film of 800 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition c2" of an amount, which was calculated from the height of and area surrounded by the seal material, was applied onto the substrate, and both the substrates were fixed together by the fixing device. Thereafter, heating at 150° C. was performed for one hour to produce the liquid crystal cell (liquid crystal element) C2".

The liquid crystal cells A1', E1 and C2" were filled with the liquid crystal compositions a1', e1 and c2" having thicknesses of 6 μm, 5 μm and 5 μm, respectively.

These three kinds of cells A1', E1 and C2" were layered in this order, and a black light absorber film was arranged on the rear surface of the layered structure.

The layered structure was driven with the predetermined voltages to set each cell selectively to the colored state and colorless state. It was observed that the layered structure exhibited the contrast of 6.4:1 (W/B).

In this layered type liquid crystal element, the liquid crystal layer of the element A1 remotest from the observation side had the largest thickness, and contained the liquid crystal composition a1' having the largest refractive index anisotropy value Δn. The liquid crystal composition a1' contained in the liquid crystal layer of the element A1' remotest from the observation side had the refractive index anisotropy value Δn of 0.17 or more. Further, a difference of 0.003 was present in refractive index anisotropy value Δn between the liquid crystal composition c2" on the observation side and the intermediate liquid crystal composition e1. Also, a difference of 0.004 was present in refractive index anisotropy value Δn between the liquid crystal compositions e1 and a1'.

Further, a difference of 0.007 was present in refractive index anisotropy value Δn between the liquid crystal composition c2" on the observation side and the liquid crystal composition a1' remotest from the observation side. Further, the liquid crystal composition c2" contains the ultraviolet absorber agent.

Compared with the experimental example 9, scattering of the light of the short wavelengths was reduced. Further, both the white display characteristics and the black display characteristics were good, and the layered type liquid crystal element could achieve high contrast.

For the color/colorless display, the liquid crystal compositions a1', e1 and c2" were supplied with drive voltages of 45/30 V, 75/50 V and 65/45 V, respectively.

Comparative Experimental Example 3

This examples used the foregoing nematic liquid crystal D and E, and also used nematic liquid crystal F, which had refractive index anisotropy value Δn of 0.214, dielectric anisotropy Δε of 6.9 and temperature $T_{NI}$ of transition to isotropic phase of 109° C. Predetermined amounts of chiral material R811 were added to the respective kinds of nematic liquid crystal D, E and F so that the liquid crystal compositions d2, e1 and f1 were prepared. The compositions d2, e1 and f1 could reflect the light at the wavelengths of about 680 nm, about 560 nm and about 460 nm, respectively.

The liquid crystal compositions d2, e1 and f1 had the dielectric anisotropies Δε of 7, 6.5 and 6.9, respectively, and also had refractive index anisotropy values of 0.165, 0.179 and 0.198, respectively.

A polyimide-contained orientation film of 800 Å in thickness was formed on transparent electrodes, which were arranged on a PC film substrate, and spacers (manufactured by Sekisui Finechemical Co., Ltd.) of 7 μm in diameter were dispersed on the orientation film.

On transparent electrodes formed on the other PC film substrate, a polyimide-contained insulating film of 2000 Å in thickness was formed, and a polyimide-contained orientation film of 800 Å in thickness was formed thereon. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition d2 of an amount, which was calculated from the height of and area surrounded by the seal material, was applied onto the substrate, and both the substrates were fixed together by a fixing device. Thereafter, heating at 150° C. was performed for one hour to produce the liquid crystal cell D2.

Then, a polyimide-contained orientation film of 800 Å in thickness was formed on transparent electrodes, which were arranged on the PC film substrate, and spacers (manufactured by Sekisui Finechemical Co., Ltd.) of 7 μm in diameter were dispersed on the orientation film.

On transparent electrodes formed on the other PC film substrate, a polyimide-contained insulating film of 2000 Å in thickness was formed, and a polyimide-contained orientation film of 800 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition e1 of an amount, which was calculated from the height of and area surrounded by the seal material, was applied onto the substrate, and both the substrates were fixed together by the mixing device. Thereafter, heating at 150° C. was performed for one hour to produce the liquid crystal cell E1.

Further, a polyimide-contained orientation film of 800 Å in thickness was formed on transparent electrodes, which were arranged on the PC film substrate, and spacers (manufactured by Sekisui Finechemical Co., Ltd.) of 7 μm in diameter were dispersed on the orientation film.

On transparent electrodes formed on the other PC film substrate, a polyimide-contained insulating film of 2000 Å in thickness was formed, and a polyimide-contained orientation film of 800 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition f1 of an amount, which was calculated from the height of and area surrounded by the seal material, was applied onto the substrate, and both the substrates were fixed together by the fixing device. Thereafter, heating at 150° C. was performed for one hour to produce the liquid crystal cell (liquid crystal element) F1.

The liquid crystal cells D2, E1 and F1 were filled with the liquid crystal compositions d2, e1 and f1 each having thickness of 7 μm.

These three kinds of cells D2, E1 and F1 were layered in this order, and a black light absorber film was arranged on the rear surface of the layered structure (i.e., rear surface of the liquid crystal cell D2).

The layered structure was driven with the predetermined voltages to set each cell selectively to the colored state and colorless state. It was observed that the layered structure exhibited the low contrast of 3.5:1 (W/B).

In this layered type liquid crystal element, all the liquid crystal layers have the thicknesses of 7 μm. The liquid crystal composition d2 had the refractive index anisotropy value Δn smaller than those of the other liquid crystal compositions, and is smaller than 0.17. When this layered type liquid crystal element was in the colorless state, scattering occurred to a large extent.

For the color/colorless display, the liquid crystal compositions d2, e1 and f1 were supplied with drive voltages of 75/50 V, 90/60 V and 70/45 V, respectively.

The following table 2 represents the results of the experimental examples 7–12 and the comparative experimental example 3 described above.

TABLE 2

| | Remotest Side Layer | Intermediate Layer | Observation Side Layer | Δn Difference (Nb) | Δn Difference (Op) | Content |
|---|---|---|---|---|---|---|
| Ex. 7 | | | | | | |
| Δn | 0.183 | 0.171 | 0.175 | 0.005/ | 0.007 | 5.8:1 |
| WL (nm) | 680 | 560 | 480 | 0.012 | | |
| TH (μm) | 6 | 5 | 4 | | | |
| DV (V) | 50/30 | 45/30 | 45/30 | | | |
| Ex. 8 | | | | | | |
| Δn | 0.182 | 0.17 | 0.17 | 0/ | 0.012 | 6.2:1 |
| WL (nm) | 670 | 550 | 470 | 0.012 | | |
| TH (μm) | 6 | 5 | 5 | | | |
| DV (V) | 45/30 | 45/30 | 50/35 | | | |
| Ex. 9 | | | | | | |
| Δn | 0.198 | 0.179 | 0.176 | 0.003/ | 0.022 | 5.8:1 |
| WL (nm) | 650 | 560 | 490 | 0.019 | | |
| TH (μm) | 6 | 5 | 3 | | | |
| DV (V) | 70/50 | 75/50 | 65/45 | | | |
| Ex. 10 | | | | | | |
| Δn | 0.198 | 0.179 | 0.176 | 0.003/ | 0.022 | 6.5:1 |
| WL (nm) | 650 | 560 | 490 | 0.019 | | MBT175 |
| TH (μm) | 6 | 5 | 3 | | | added |
| DV (V) | 70/50 | 75/50 | 65/45 | | | |
| Ex. 11 | | | | | | |
| Δn | 0.198 | 0.179 | 0.17 | 0.009/ | 0.028 | 6.0:1 |
| WL (nm) | 650 | 560 | 470 | 0.019 | | |
| TH (μm) | 6 | 5 | 5 | | | |
| DV (V) | 70/50 | 75/50 | 50/35 | | | |
| Ex. 12 | | | | | | |
| Δn | 0.183 | 0.179 | 0.176 | 0.003/ | 0.007 | 6.4:1 |
| WL (nm) | 670 | 560 | 490 | 0.004 | | MBT175 |
| TH (μm) | 6 | 5 | 3 | | | added |
| DV (V) | 45/30 | 75/50 | 65/45 | | | |
| C. Ex. 3 | | | | | | |
| Δn | 0.165 | 0.179 | 0.198 | 0.019/ | −0.033 | 3.5:1 |
| WL (nm) | 680 | 560 | 460 | 0.014 | | |
| TH (μm) | 7 | 7 | 7 | | | |
| DV (V) | 75/50 | 90/60 | 75/45 | | | |

Ex.: Experimental Example
C. Ex.: Comparative Experimental Example
Δn: Refractive Index Anisotropy Value
TH: Thickness of Substrate
WL: Selective Reflection Wavelength
DV: Drive Voltage
Δn Difference (Op): Δn Difference between layers on opposite ends
Δn Difference (Nb): Δn Difference between neighboring layers As is apparent from the experimental examples and the comparative experimental example described above as well as the table 2, each of the layered type liquid crystal elements in the experimental examples 7–12 has such a structure that at least one of the liquid crystal layers has the thickness different from those of the other liquid crystal layers, and the liquid crystal layer in the outermost position remote from the element observation side has the thickness equal to or larger than (but not exceeding 7 μm) the thicknesses of all the other liquid crystal layers on the observation side, and contains the liquid crystal material having the refractive index anisotropy value (e.g., 0.17 or more) equal to or larger than those of all the other liquid crystal layers on the observation side. The layered type liquid crystal element having the above structure can achieve bright display with good contrast. Further, the layered type liquid crystal elements of the experimental examples 7–12 require the lower drive voltages than that of the comparative example 3.

In connection with the neighboring liquid crystal layers, the following can be understood. A difference of about 0.01 or less is present in refractive index anisotropy value between the liquid crystal material contained in the liquid crystal layer on the element observation side and the liquid crystal material contained in the liquid crystal material remote from the element observation side. Further, a difference of about 0.03 or less, and more preferably of about 0.02 or less is present in refractive index anisotropy value between the liquid crystal material contained in the outermost liquid crystal layer on the element observation side and the liquid crystal material contained in the outermost liquid crystal material remote from the element observation side. Thereby, the contrast can be further improved.

By adding the ultraviolet absorber agents to the liquid crystal layers, as is done in the experimental examples 10 and 12, the scattering of the light of the short wavelengths is reduced, and the element can achieve good white display characteristics and good black display characteristics as well as high contrast.

In the experimental example 7–12, the liquid crystal layer for the red display is formed of the outermost liquid crystal layer remote from the element observation side, and contains the liquid crystal material having the selective reflection wavelength of 650 nm–690 nm. Also, the outermost liquid crystal layer on the observation side is the liquid crystal layer for blue display, and contains the liquid crystal material having the selective reflection wavelength of 460 nm–500 nm. Thereby, good color balance can be achieved.

Various experiments other than the foregoing experiments were performed. From the experiments, it could be understood that disadvantages did not occur in brightness and contrast if a difference of about 0.03 or less is present in refractive index anisotropy value between the liquid crystal material contained in the liquid crystal layer on the element observation side and the liquid crystal material contained in the liquid crystal layer remote from the element observation side, and a difference of about 0.04 or less is present in refractive index anisotropy value between the liquid crystal material contained in the liquid crystal layer in the outermost position on the element observation side and the liquid crystal material contained in the liquid crystal layer in the outermost position remote from the element observation side.

(II) Liquid Crystal Element of Fifth Type

Figure 8:
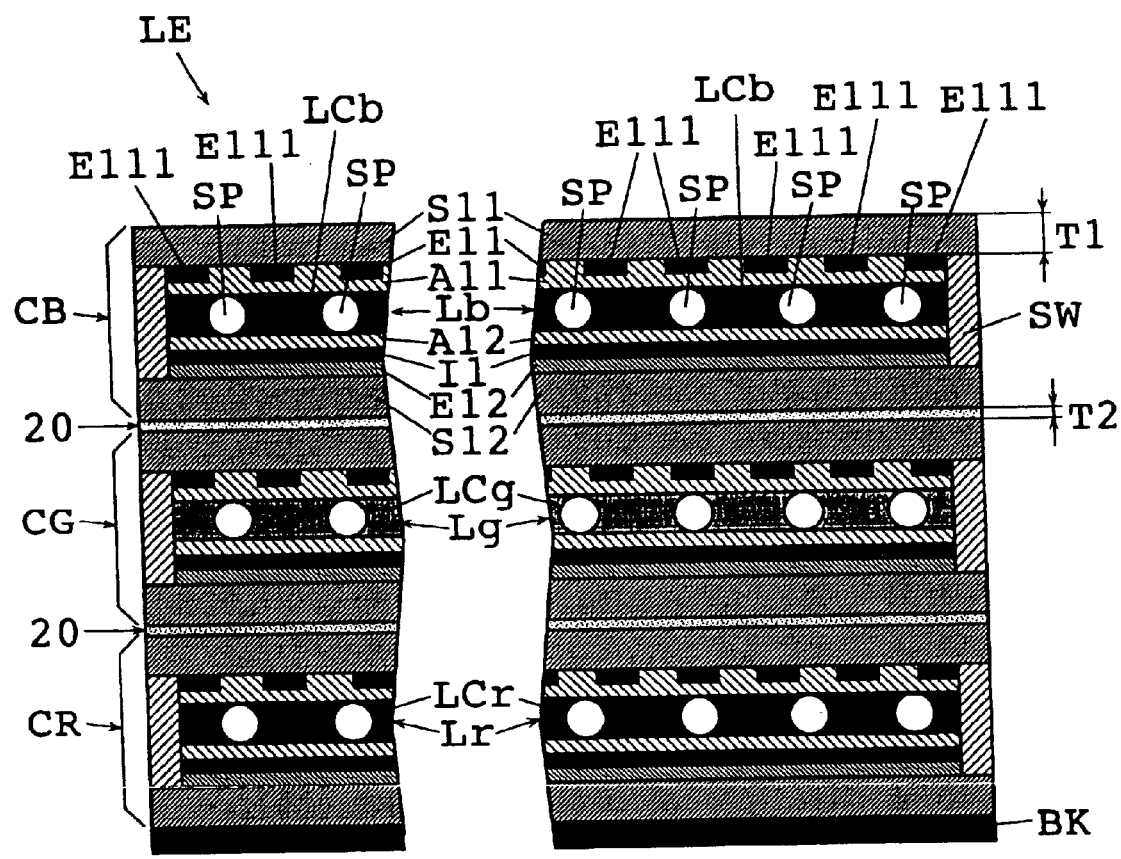
FIG. 8 is a schematic cross section showing further another example of the liquid crystal element of the layered type according to the invention.

FIG. 8 is a schematic cross section of an example of a layered type liquid crystal element of a fifth type.

The layered type liquid crystal element LE shown in FIG. 8 is formed of three liquid crystal elements (liquid crystal cells) CB, CG and CR.

The layered type liquid crystal element LE in this example is utilized as a display element of the reflection type, and images displayed on this display element are observed from the outer side (upper side in FIG. 8) of the liquid crystal element CB. Accordingly, the liquid crystal element CB is arranged on the side nearest to the display observation side (element observation side), and the liquid crystal element CR is disposed in the position remotest from the observation side. A black light absorber layer BK is arranged on the outer side of the liquid crystal element CR disposed in the position remotest from the observation side. The layered type liquid crystal element can perform full color display, as will be described later in greater detail.

The liquid crystal elements CB, CG and CR include different kinds of liquid crystal having the selective reflection wavelengths in the blue, green and red regions, respectively, as will be described later in greater detail. The liquid crystal elements CB, CG and CR are used for display in blue, green and red, respectively.

The neighboring two liquid crystal elements are adhered together by an adhesive layer 20 disposed therebetween. The adhesive layer 20 in this example is formed of double-coated adhesive tape. The adhesive on the double-coated adhesive tape may be acrylic adhesive. Instead of the double-coated adhesive tape, the adhesive layer 20 may be an adhesive agent. The adhesive agent may be ultraviolet-curing resin, thermosetting silicone-contained resin or the like.

The liquid crystal element CB for blue display has the following structure. The liquid crystal elements CG and CR have structures similar to the structure of the liquid crystal element CB described below.

The liquid crystal element CB has a pair of substrates S11 and S12, and a liquid crystal layer Lb held between the substrates.

Each of the substrates S11 and S12 in this example is a transparent film substrate made of resin. The transparent resin substrate material is, e.g., polyether sulfone (PES), polycarbonate (PC), polyethylene terephthalate or polyarylate (PA). The substrate of the liquid crystal element may be formed of a glass substrate instead of the resin substrate. However, the resin substrate can be thinner than the glass substrate so that the resin substrate can suppress lowering of the display characteristics (e.g., lowering of brightness and contrast), which may be caused by a large thickness of the substrate, and also has such advantages that the weight is low and the resistance against breakage is high.

The substrate S11 and S12 in this example have the same thickness T1. The substrate thickness T1 is in a range from 50 $\mu$m to 250 $\mu$m.

On the substrate S11, a transparent electrode E11 and an orientation film A11 are layered. The electrode E11 is formed of a plurality of belt-like electrode portions E111 which are parallel to each other with a predetermined spaced therebetween. The transparent electrode E11 may be formed of a transparent conductive film made of, e.g., ITO (Indium Tin Oxide), a metal electrode made of, e.g., aluminum or silicon, or a photoconductive film made of, e.g., amorphous silicon or BSO (Bismuth Silicon Oxide). The orientation film may be typically made of polyimide.

On the substrate S12, a transparent electrode E12, an insulating film I1 and an orientation film A12 are layered. Although not shown, the electrode E12 is formed of a plurality of belt-like electrode portions which extend parallel to each other with a predetermined space therebetween. The belt-like electrode portions of the electrode E12 cross the belt-like electrode portions E111 to form a so-called matrix structure. The insulating layer I1 is provided for keeping electrical insulation between the electrodes E11 and E12. The insulating layer (insulating film) may be formed of, e.g., an inorganic film made of, e.g., silicon oxide, or an organic film made of, e.g., polyimide resin, epoxy resin or the like. In the liquid crystal element CB, the insulating film is arranged on only one of the substrates (the substrate S12 in this example), but may be arranged on each of the substrates.

The liquid crystal layer Lb is disposed between the substrates S11 and S12 provided with the electrode and others as described above.

The liquid crystal layer Lb in this example includes liquid crystal LCb and spherical spacers SP. The spacers are preferably formed of particles made of a hard material, which is not deformed by the heat and pressure. For example, the spacer particles may be made of, e.g., an inorganic material such as finely divided glass fibers, silicate glass in the ball-like form or alumina powder, or spheric particles of an organic material such as divinylbenzene-contained cross-linked polymer or polystyrene-contained cross-linked polymer.

For preventing leakage of the liquid crystal LCb from the peripheral portions of the substrates, a seal wall SW made of a resin material is arranged on the peripheral portion of the substrate. The seal wall SW is disposed between the opposite substrates and has an annular or frame-like form.

The liquid crystal LCb in this example is a chiral nematic liquid crystal exhibiting the cholesteric phase in the room temperature. This chiral nematic liquid crystal is made of a nematic liquid crystal and a chiral material added thereto for obtaining a predetermined helical pitch, and more specifically for achieving the selective reflection wavelength region of a predetermined wavelength. By adjusting the amount of chiral material added to the nematic liquid crystal, the selective reflection wavelength of the chiral nematic liquid crystal can be adjusted. The selective wavelength of the liquid crystal LCb is set in the blue region.

When the liquid crystal exhibiting the cholesteric phase is in the planar state, wherein the helical axes are perpendicular to the substrate, it selectively reflects the light of a wavelength corresponding to a product of a helical pitch and an average refractive index of the liquid crystal. Accordingly, the liquid crystal in the planar state exhibits a color corresponding to the selective reflection wavelength if the selective reflection wavelength is in the visible range. By setting the selective reflection wavelength, e.g., in an infrared range, the liquid crystal in the planar state exhibits a transparent appearance.

The liquid crystal exhibiting the cholesteric phase scatters the light when it is in the focal conic state wherein the helical axes are oriented irregularly. This scattering causes an opaque appearance when the liquid crystal is in the focal conic state, and the helical pitch is larger than the visible light wavelength. The liquid crystal in the focal conic state exhibits a nearly transparent appearance if the helical pitch is short, similarly to the case where the selective reflection wavelength is in the visible range, and thereby the scattering does not occur to a large extent.

Accordingly, by changing the state of the liquid crystal between the planar state and the focal conic state, the liquid crystal exhibiting the cholesteric phase assumes, e.g., the selective reflection state (planar state) or the transparent state (focal conic state). If the selective reflection wavelength is in the infrared range, the liquid crystal exhibiting the cholesteric phase selectively assumes, e.g., the transparent state (planar state) and the opaque state (focal conic state) in accordance with change in state of the liquid crystal. The liquid crystal exhibiting the cholesteric phase can also assume the state where the planar state and the focal conic state are mixed.

The state of the liquid crystal LCb can be changed by applying a voltage across the electrodes E11 and E12. For example, the liquid crystal LCb can assume the planar state when a relatively high voltage is applied across the electrodes. When a relatively low voltage is applied across the electrodes, the liquid crystal LCb can assume the focal conic state. By applying an intermediate voltage across the electrodes, the liquid crystal LCb can assume the state where the planar state and the focal conic state are present in a mixed fashion. After stop of application of the voltage, these states of the liquid crystal are stably held.

The liquid crystal LCb has the selective reflection wavelength set in the blue wavelength region, as already described. Accordingly, when the liquid crystal LCb is in the planar state, it selectively reflects the light in the blue wavelength range, and exhibits a blue appearance. When the liquid crystal LCb is in the focal conic state, it becomes transparent. Therefore, the liquid crystal LCb can perform blue display.

The other liquid crystal elements CG and CR have structures similar to that of the liquid crystal CB already described. The liquid crystal element CG is provided for green display, and has a liquid crystal layer Lg which contains liquid crystal LCg having a selective reflection wavelength in the green wavelength region. The liquid crystal element CR is provided for red display, and has a liquid crystal layer Lr which contains liquid crystal LCr having a selective reflection wavelength in the red wavelength region. Each of the liquid crystal LCg and the liquid crystal LCb in this example is chiral nematic liquid crystal exhibiting the cholesteric phase in the room temperature, similarly to the liquid crystal LCb.

According to the layered type liquid crystal element LE including the liquid crystal elements CB, CG and CR layered together can selectively perform the display in blue, green and red as well as intermediate colors, and colors of mixture of two or three of such colors. As a result, the full color display can be performed. When the liquid crystal of all the liquid crystal elements is transparent, the black which is the color of the light absorber layer BK arranged outside the liquid crystal element CR is displayed. A method of driving the layered type liquid crystal element LE will be described later.

Dyes may be added to the liquid crystal element for improving the color purity in display performed by the selective reflection of incident light, and for absorbing light components lowering the transparency in the transparent state. Also, a color filter layer such as color glass filter or color film achieving similar effects may be arranged on the liquid crystal element. The dyes and the color filter layers may be employed in all the liquid crystal elements, or may be employed in only one or two of the liquid crystal elements. The dyes may be added to any one of the liquid crystal material, resin material, transparent electrode material and transparent substrate material, or may be added to two or more of them. For preventing lowering of the display quality, however, it is desired that neither dyes nor color filters impede the color display by the selective reflection of the liquid crystal elements.

Figure 9:
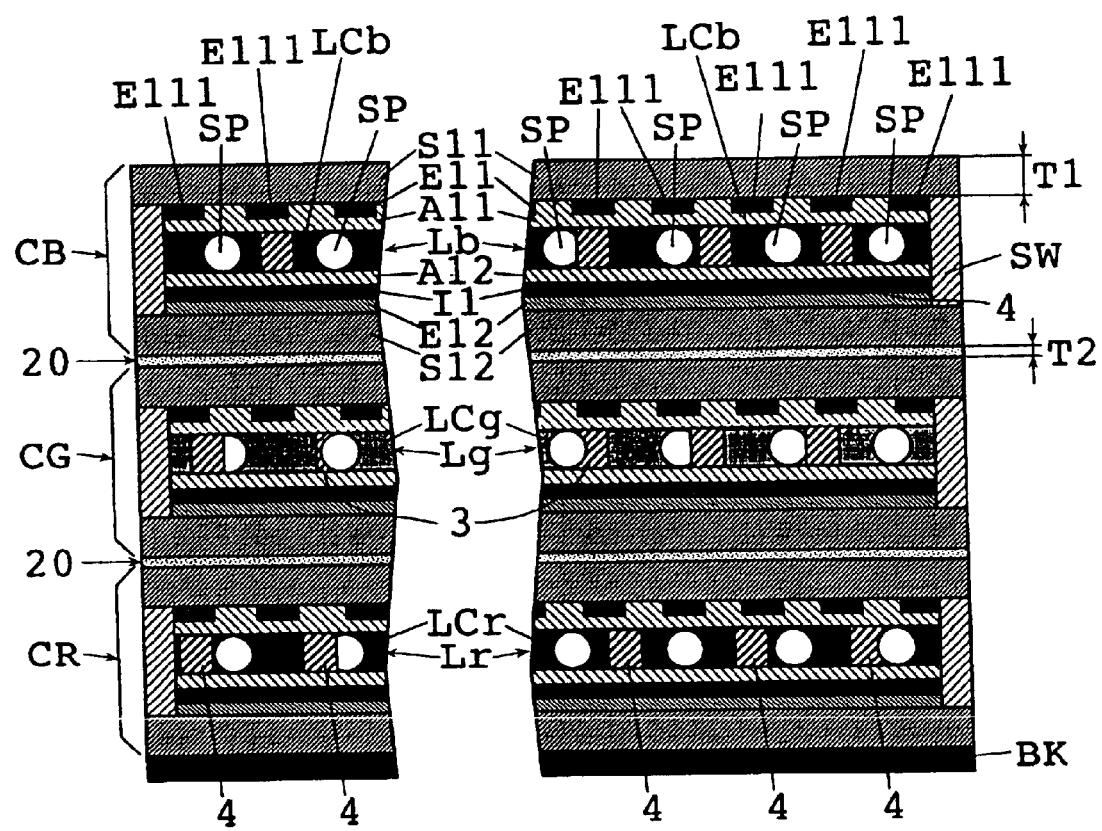
FIG. 9 is a schematic cross section showing further another example of the liquid crystal element of the layered type according to the invention.

Instead of or together with the spacers, the resin structures (columnar resin structures) 4 may be disposed between the opposite substrates of each liquid crystal element (see FIG. 9). The resin structures can be utilized for increasing the strength of the whole liquid crystal element, and for adhering the substrates together.

The resin structure may be made of a material which can be softened when heated, and can be solidified by cooling. An organic material which does not chemically react with the liquid crystal material, and has an appropriate elasticity is suitable. The resin material of the resin structure may be preferably a thermoplastic polymer material. The thermoplastic polymer material may be, e.g., polyvinyl chloride resin, polyvinylidene chloride resin, polyvinyl acetate resin, polymethacrylate ester resin, polyacrylate ester resin, polystyrene resin, polyamide resin, polyethylene resin, polypropylene resin, fluororesin, polyurethane resin, polyacrylonitrile resin, polyvinyl ether resin, polyvinyl ketone resin, polyether resin, polyvinyl pyrolidone resin, saturated polyester resin, polycarbonate resin, chlorinated polyether resin or the like. The resin structure may be made of a material containing one or more of the above materials.

The resin structure 3 may have a dot-like columnar form having a circular, square or elliptic section or the like, although not restricted thereto.

The resin structures within the display region are spaced from each other by a predetermined distance, and are arranged, e.g., in a matrix form in accordance with a predetermined arrangement rule.

The dot-like resin structures have sizes and pitches which are appropriately determined in accordance with the sizes of the liquid crystal element (liquid crystal display element) and the pixel resolution.

It is preferable to arrange the dot-like resin structures between the electrodes with priority because this increases the ratio of apertures.

It is preferable that the resin structures are arranged and disposed in a pattern other than a random pattern, which may be caused, e.g., by dispersion of the resin material. More specifically, it is preferable that the resin structures are equally spaced from each other, or are spaced by a distance which gradually varies in accordance with the position, or a predetermined pattern of arrangement is repeated regularly. Any one of these forms and arrangements may be employed, if these are determined in accordance with appropriate arrangement rules keeping an appropriate gap between the substrates, and not impeding image display. For example, the resin structures may take the form of stripes spaced by a predetermined distance from each other.

An example of a method of manufacturing the layered type liquid crystal element LE will now be described.

First, the respective liquid crystal elements CB, CG and CR are formed. The liquid crystal element CB is formed in the following manner.

For manufacturing the liquid crystal element CB, the transparent electrodes E11 and E12 formed of the plurality of belt-like transparent electrodes are first formed on the transparent electrodes S11 and S12, respectively. The transparent electrodes 11 and 12 are formed by forming conductive films (e.g., ITO films) on the substrates by a sputtering method or the like, and then patterning them by photolithography into predetermined configurations. A commercially available substrate which is uniformly provided with a conductive film may be employed, in which case the conductive film is patterned to form the electrode of a predetermined configuration.

Then, the orientation film A11 is formed on the electrode E11 of the substrate S11. On the electrode E12 of the substrate S12, the insulating film I1 and the orientation film A12 are successively formed. The insulating film and the orientation films can be made of appropriate film formation materials, and can be formed by the known method such as a sputtering method, a spin coat method or a roll coat method.

An annular wall made of the ultraviolet-curing resin or thermosetting resin is formed on the peripheral portion of one of the substrates S11 and S12. The wall made of this resin will form the seal wall SW for preventing leakage of the liquid crystal. This resin wall can be formed by applying the resin onto the substrate from the nozzle by the dispenser method or ink-jet method. The resin wall may be formed by a printing method using a screen or a metal mask. The resin wall can also be formed by a transfer method, in which resin is supplied onto a flat plate or a roller, and then is transferred onto the substrate.

When providing the resin structures as described before, the resin structures, which have predetermined configurations and are patterned into a predetermined arrangement form, are arranged on the other substrate, i.e., the substrate other than the substrate provided with the resin wall forming the seal wall. The resin structures are made of resin material paste prepared, e.g., by dissolving resin in solvent, and are formed in a printing method, in which the above resin material is squeezed out by a squeegee via a screen or a metal mask onto the substrate. The resin structures may also be prepared by a method such as a dispenser method or an ink jet method in which the resin material is supplied onto the substrate from a nozzle(s), or a transfer method, in which the resin material is supplied onto a flat plate or roller, and then is transferred onto the substrate. When forming the resin structures, it is preferable that the resin structure has a height larger than the desired thickness of the liquid crystal layer.

Then, the spacers SP are dispersed on the surface of at least one of the substrates S11 and S12 in a known method.

Then, a predetermined amount of droplets of the liquid crystal Lcb is applied onto an end of one of the substrates.

Figure 10:
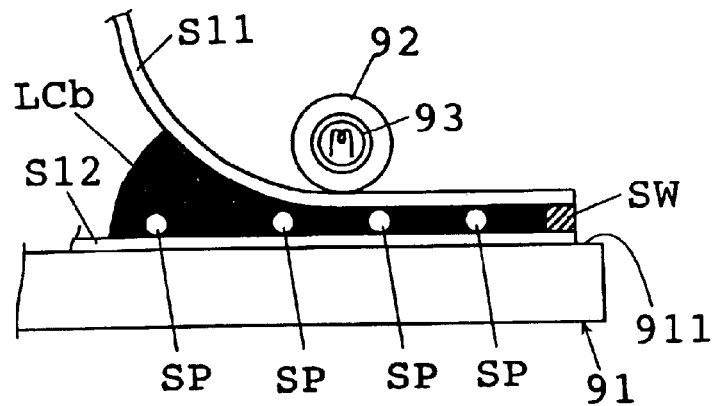
FIG. 10 shows by way of example a fixing device.

Then, the end of the other substrate is laid over the end of the substrate carrying the liquid crystal LCb, and both the substrates are overlaid together while spreading the liquid crystal from the above end toward the other end. When overlaying the substrates, a heat and a pressure is applied. For example, a fixing device shown in FIG. 10 is used for overlaying the substrates.

More specifically, the substrate carrying the liquid crystal is laid over a flat surface 911 of a substrate carrier member 911. The end of the other substrate is laid over the end of the substrate on the member 91, and these substrates are overlaid together by a roller 92 internally provided with a heater 93. For example, the roller 92 is moved in a predetermined direction (leftward in FIG. 10) at a predetermined speed so that the heat of the heater 93 and the pressured by the roller 92 are applied to both the substrates for overlaying them.

By overlaying the substrates together in the above manner, the liquid crystal element can be manufactured with high accuracy even if the substrate is formed of a flexible substrate such as a film substrate.

The pressure is applied to spread the liquid crystal while overlaying the substrates. Thereby, it is possible to suppress mixing of bubbles into the liquid crystal Lb.

If the seal wall is made of thermosetting resin, this can be hardened by the above heating. If the resin structures are made of a thermoplastic polymer material, it can be heated in the above manner, and then is cooled so that the resin structures are softened, and then is solidified, and thereby the resin structures can be adhered onto the opposite substrates. If the seal wall and/or the resin structures are made of materials having heat softening properties, the pressure is kept to push the substrates against each other until the material is cooled to a temperature lower than the softening temperature. If the seal wall is made of a photosetting resin, both the substrates are overlaid, and then the seal wall material is hardened by light irradiation.

Thereby, the liquid crystal CB of the structure shown in FIG. 8 can be produced. The liquid crystal elements CG and CR can be manufactured in a similar manner.

The three liquid crystal elements prepared in this manner are adhered together in the predetermined order by an adhesive material such as adhesive or double-coated adhesive tape, and the light absorber layer BK is arranged on the outer side of the liquid crystal element CR so that the liquid crystal element LE is manufactured.

Instead of the manner of dispersing, in advance, the spacers on the substrate, the spacers may be dispersed within the liquid crystal before being dropped onto the substrate. In this manner, the spacers can be disposed between the substrates, and the thickness of the liquid crystal can be adjusted.

Description will now be given on the method of driving the layered type liquid crystal element LE shown in FIG. 8.

As described above, the electrodes of each liquid crystal element have a matrix structure. Therefore, by performing simple matrix drive of each liquid crystal element, desired characters, graphics and others can be displayed.

A manner of the simple matrix drive of the liquid crystal element CB will now be described with reference to FIG. 11. This drive method is substantially the same as the drive method shown in FIG. 7.

Figure 11:
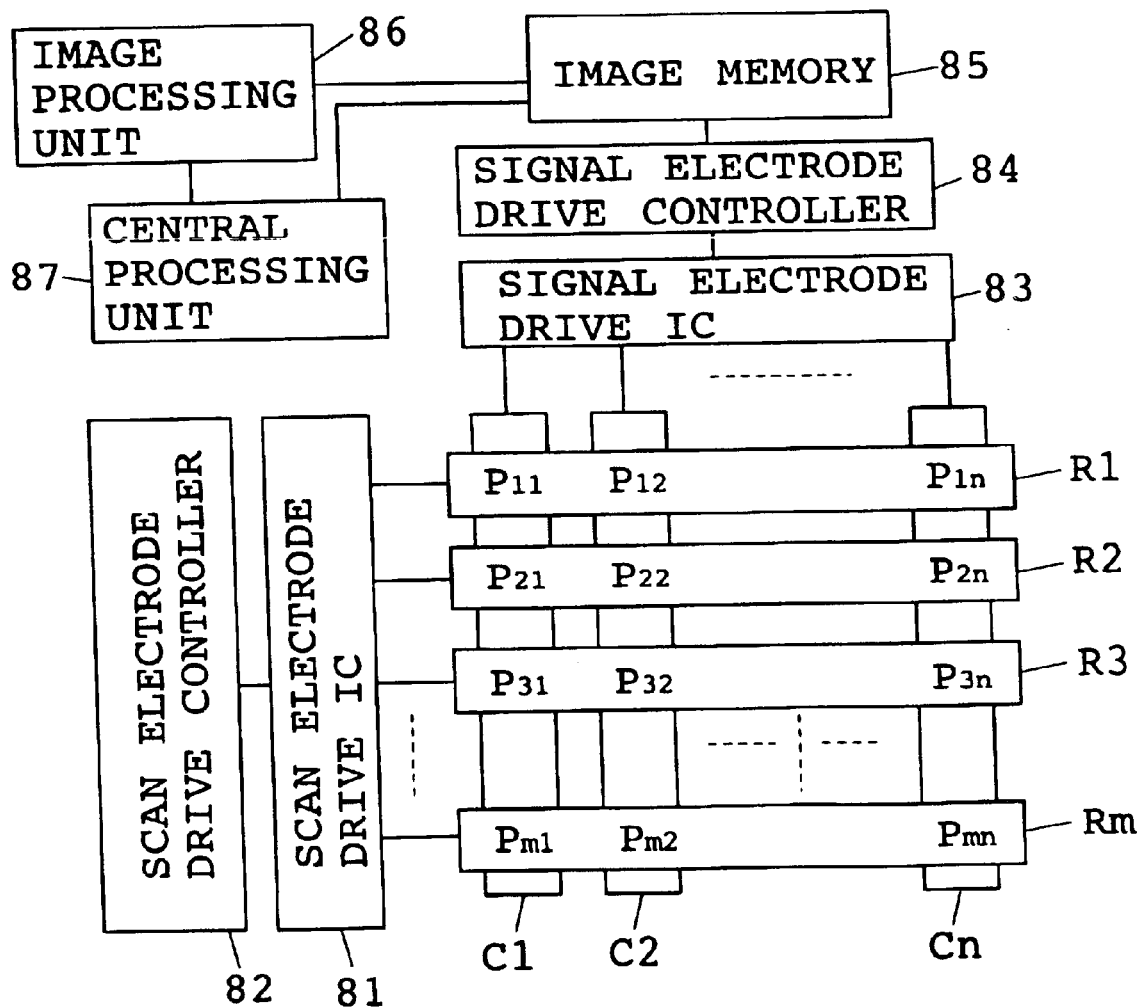
FIG. 11 shows by way of example a display drive control device of the liquid crystal element.

In FIG. 11, signal electrodes (column electrodes) C1–Cn (n: natural number) correspond the respective belt-like electrode portions E111 of the electrode E11 shown in FIG. 8. Scan electrodes (row electrodes) R1–Rm (m: natural number) correspond to the respective belt-like electrode portions of the electrode E12 in FIG. 8.

In the liquid crystal element CB, the orientations of the liquid crystal molecules can be changed in each region unit at a time. This region unit is defined by a region, where one scan electrode and one signal electrode cross each other, and a neighboring region thereof. In the liquid crystal element CB, each pixel is formed of the region, where one scan electrode and one signal electrode cross each other, and the neighboring region thereof. The pixel in the position of the crossing between the scan and signal electrodes Rp and Rq is represented as a pixel $P_{pq}$, where p is a natural number satisfying a relationship of $(1 \leq p \leq m)$ and q is a natural number satisfying a relationship of $(1 \leq q \leq n)$.

The liquid crystal element CB can display images based on the image data, which is written into an image memory 85 by an image processing unit 86 and a central processing unit 87 in the following manner.

The scan electrode drive IC 81 issues a select signal to a predetermined one of the scan electrodes R1–Rm for setting it to the selected state, and issues non-selection signals to the others for setting them to the unselected state. The scan electrode drive IC 81 switches the electrodes to be selected at predetermined time intervals, and the respective scan electrodes are successively set to the selected state. This control is performed by the scan electrode drive controller 82.

The signal electrode drive IC 83 simultaneously issues signal voltages corresponding to image data of the respective pixels to the respective signal electrodes for rewriting the respective pixels on the scan electrodes in the selected state. For example, when the scan electrode R1 is selected, the orientations of the liquid crystal molecules of the pixels $P_{11}$–$P_{1n}$ on the scan electrode R1 are changed in accordance with the pixel data of the respective pixels. The voltage difference between the voltage, which is applied to the scan electrode of the pixel to be driven, and the voltage applied to the signal electrode and corresponding to the image data is applied to the liquid crystal of the pixels to be driven. Therefore, the liquid crystal of the pixels to be driven changes its orientation in accordance with the image data. The signal electrode drive IC 83 changes the orientation of the liquid crystal of the pixel to be driven in accordance with the image data upon every change of the scan electrode. This control is performed in parallel with the operation of reading image data by the signal electrode drive controller 84 from the image memory 85.

The liquid crystal of the pixel to be driven is supplied with the voltage corresponding to the image data (tone data) of the pixel to be driven. In accordance with the image data of the pixel to be driven, the liquid crystal of the pixel to be driven can assume the planar state, the focal conic state or the state where these states are mixed at a ratio corresponding to the display tone. Accordingly, gradation display corresponding to the image data can be performed.

The liquid crystal elements CR and CG can be driven in accordance with the image data in a similar manner, and thereby can perform the gradation display. By driving the three liquid crystal elements CB, CG and CR in accordance with the image data, the full color display can be performed.

In the layered type liquid crystal element LE, the adhesive layer 20 has a thickness T2 equal to or smaller than ¼ of the substrate thickness of the liquid crystal element. More specifically, the thickness T2 of the adhesive layer 20 is equal to or smaller than ¼ of the substrate thickness T1, and thus is equal to or smaller than 30 μm. Owing to this setting of the thickness T2 of the adhesive layer 20, it is possible to suppress scattering of the light, and the layered type liquid crystal element can have relatively high transparency as a whole when the liquid crystal of all the liquid crystal layers are transparent. As a result, black display can be performed clearly. The reflectance can be relatively small when displaying black of the light absorber layer BK, and the contrast can be improved. Since the black can be displayed clearly when all the liquid crystal layers are transparent, the various colors can be displayed with high color purity when the respective liquid crystal layers are in the selective reflection state.

Description will now be given on experimental examples 13–18, which were performed for determining the contrast of layered type liquid crystal elements of the fifth type. The layered type liquid crystal elements in the experimental examples 13–18 have structures similar to that of the layered type liquid crystal element LE shown in FIG. 8 and including the three liquid crystal elements, which are layered together for displaying red, green and blue, respectively. In each of the layered type liquid crystal elements of the experimental examples 13–18, the adhesive layer had a thickness equal to or smaller than ¼ of the thickness of the liquid crystal element substrate, which was in a range from 50 μm to 250 μm.

For comparison with the layered type liquid crystal element, a layered type liquid crystal element, which had an adhesive layer larger than a quareter of the liquid crystal element substrate, was prepared for determining the contrast (comparative experimental example 4). This comparative example 4 will also be discussed.

EXPERIMENTAL EXAMPLE 13

First, the liquid crystal elements for red, green and blue were prepared in the following manner.

Liquid Crystal Element for Red Display

In the experimental example 13, a pair of substrates (first and second substrates) for forming the liquid crystal element for red display were formed of polyether sulfone (PES) films each having a thickness of 150 μm. These substrates were provided in advance with transparent electrodes, which were made of ITO (Indium Tin Oxide) and were patterned into a stripe-like form.

A polyimide-contained orientation film of 800 Å in thickness was formed on the transparent electrode arranged on the first substrate, and spacers (manufactured by Sekisui Finechemical Co., Ltd.) of 9 μm in diameter were dispersed on the orientation film.

On the transparent electrode formed on the second substrate, an inorganic insulating film of 2000 Å in thickness was formed, and the polyimide-contained orientation film of 800 Å in thickness was formed on the insulating film. Then, the seal material XN21S (manufactured by Mitsui Chemicals Co., Ltd.) was applied by screen printing onto the peripheral portion of the second substrate so that a wall having a predetermined height and a frame-like form was formed. This wall made of the seal material would form a seal wall for preventing leakage of the liquid crystal in later stages.

Thereafter, the liquid crystal composition LCr1 of an amount, which was calculated from the area of the region surrounded by the wall of the seal material on the second substrate and the height of this seal wall, was applied onto the second substrate region. The liquid crystal composition LCr1 was chiral nematic liquid crystal formed by adding a predetermined amount of chiral material S-811 (manufactured by Merck & Co.) to nematic liquid crystal having refractive index anisotropy value Δn of 0.187 and dielectric anisotropy Δε of 4.47. The liquid crystal composition LCr1 had the selective reflection wavelength of about 680 nM (red region), and exhibited the cholesteric phase in the room temperature.

The first and second substrates were fixed together by a fixing device shown in FIG. 10 with the liquid crystal composition LCr1 therebetween. The liquid crystal cell thus prepared was subjected to heating at 150° C. for one hour so that the seal wall was melted and adhered onto the first and second substrates. Thereafter, the element was cooled to the room temperature so that the liquid crystal element for red display was completed.

Liquid Crystal Element for Green Display

The liquid crystal element for green display was prepared similarly to the liquid crystal element for red display except for the followings.

The liquid crystal element for green display employed spacers of 7 μm in diameter instead of spacers of 9 μm in diameter. Thus, the liquid crystal element for green display included the liquid crystal layer of 7 μm in thickness. The liquid crystal element for green display employed liquid crystal composition LCg1 as the liquid crystal held between the two substrates. The liquid crystal composition LCg1 is chiral nematic liquid crystal formed by adding a predetermined amount of chiral material S-811 (manufactured by Merck & Co.) to nematic liquid crystal having refractive index anisotropy value Δn of 0.177 and dielectric anisotropy Δε of 5.33. The liquid crystal composition LCg1 had the selective reflection wavelength of about 560 nm (green region), and exhibited the cholesteric phase in the room temperature.

Liquid Crystal Element for Blue Display

The liquid crystal element for blue display was prepared similarly to the liquid crystal element for red display except for the followings.

The liquid crystal element for blue display employed spacers of 5 μm in diameter instead of spacers of 9 μm in diameter. Thus, the liquid crystal element for blue display included the liquid crystal layer of 5 μm in thickness. The liquid crystal element for blue display employed liquid crystal composition LCb1 as the liquid crystal held between the two substrates. The liquid crystal composition LCb1 is chiral nematic liquid crystal formed by adding a predetermined amount of chiral material S-811 (manufactured by Merck & Co.) to nematic liquid crystal having refractive index anisotropy value Δn of 0.20 and dielectric anisotropy Δε of 6.25. The liquid crystal composition LCb1 had the selective reflection wavelength of about 480 nm (blue region), and exhibited the cholesteric phase in the room temperature.

The liquid crystal elements for red, green and blue displays thus prepared were adhered together in this order. The neighboring liquid crystal elements were adhered together by a double-coated adhesive tape ("Double-Tack Tape" manufactured by Sekisui Chemical Co., Ltd.), which is coated with acrylic adhesive and has a thickness of 25 μm. In the experimental example 13, each adhesive layer was 25 μm in thickness.

More preferably, the neighboring liquid crystal elements were adhered by the double-coated adhesive tape in the following manner. A separator (release liner) was released from one side of the double-coated adhesive tape. While keeping one end of the tape away from the liquid crystal element, only the other end was adhered to the liquid crystal element. Then, a roller was brought into contact with the tape end already adhered to the element, and was moved toward the other end so that the tape was entirely pushed against the liquid crystal element. Then, a separator is released from the other side of the tape, and the other liquid crystal element to be adhered was placed on the tape. Then, the portion of the latter liquid crystal element was pushed against the former liquid crystal element while moving the portion to be pushed from one end to the other end by the roller. Thereby, the two liquid crystal elements were adhered together.

After fixing the three liquid crystal elements, the black light absorber was disposed on the outer side of the liquid crystal element for red display, which was located remotest from the observation side.

In these manners, the layered type liquid crystal element was prepared.

The characteristics of the layered type liquid crystal element thus prepared were measured by the reflective spectrocolorimeter CM-3700d (manufactured by Minolta Co., Ltd.). Y-values (white) were measured when the liquid crystal layers of the respective liquid crystal elements were kept in the selective reflection state (planar orientation state) and the white display was performed. Also, Y-values (black) were measured when the liquid crystal layers of the respective liquid crystal elements were kept in the transparent state (focal conic orientation state) and the black display was performed. When the liquid crystal layers of the respective liquid crystal elements were transparent, the color (black) of the light absorber film arranged on the outer side of the liquid crystal element for red display was displayed. The Y-value is a luminous reflectance.

The layered type liquid crystal element had the following characteristics. This layered type liquid crystal element had good white display characteristics and good black display characteristics, and exhibited good contrast (i.e., ratio between Y-value (white) and Y-value (black)).

Y-value (white): 29.0

Y-value (black): 4.8 contrast: 6.0:1

In this layered type liquid crystal element, the selective reflection state and the transparent state of the liquid crystal layer of the liquid crystal element for red display were achieved by the drive voltages of 90 V and 60 V, respectively. The selective reflection state and the transparent state of the liquid crystal layer of the liquid crystal element for green display were achieved by the drive voltages of 65 V and 45 V, respectively. The selective reflection state and the transparent state of the liquid crystal layer of the liquid crystal element for blue display were achieved by the drive voltages of 65 V and 40 V, respectively.

EXPERIMENTAL EXAMPLE 14

According to the experimental example 14, the layered type liquid crystal element, in which the liquid crystal elements for red, green and blue displays were layered in this order, was manufactured similarly to the experimental example 13 except for the followings.

As the substrate of each liquid crystal element, the experimental example 14 employed a PES film of 200 μm in thickness instead of the PES film of 150 μm in thickness.

In the experimental example 14, the thickness of the liquid crystal layer of the liquid crystal element for blue display was set to 7 μm by employing spacers of 7 μm in diameter. Thus, the liquid crystal elements for red, green and blue displays of the layered type liquid crystal element in the experimental example 14 had thicknesses of 9 μm, 7 μm and 7 μm, respectively.

In the experimental example 14, a double-coated adhesive tape ("Double-Tack Tape" manufactured by Sekisui Chemical Co., Ltd.), which is coated with acrylic adhesive and has a thickness of 40 μm, was employed for adhering the neighboring liquid crystal elements instead of the double-coated adhesive tape, which is coated with acrylic adhesive and has a thickness of 25 μm. Thus, each adhesive layer in the experimental example 14 has the thickness of 40 μm.

The display characteristics of the layered type liquid crystal element manufactured in the experimental example 14 were measured similarly to the experimental example 13. The layered type liquid crystal element manufactured in the experimental example 14 had the following characteristics. This layered type liquid crystal element had good white display characteristics and good black display characteristics, and exhibited good contrast.

Y-value (white): 28.6

Y-value (black): 5.1 contrast: 5.6:1

In this layered type liquid crystal element, the selective reflection state and the transparent state of the liquid crystal layer of the liquid crystal element for red display were achieved by the drive voltages of 90 V and 60 V, respectively. The selective reflection state and the transparent state of the liquid crystal layer of the liquid crystal element for green display were achieved by the drive voltages of 65 V and 45 V, respectively. The-selective reflection state and the transparent state of the liquid crystal layer of the liquid crystal element for blue display were achieved by the drive voltages of 70 V and 45 V, respectively.

EXPERIMENTAL EXAMPLE 15

According to the experimental example 15, the layered type liquid crystal element, in which the liquid crystal elements for red, green and blue displays were layered in this order, was manufactured similarly to the experimental example 13 except for the followings.

As the substrate of each liquid crystal element, the experimental example 15 employed a polycarbonate (PC) film of 150 μm in thickness instead of the PES film of 150 μm in thickness.

In the experimental example 15, the thickness of the liquid crystal layer of the liquid crystal element for red display was set to 7 μm by employing spacers of 7 μm in diameter. The thickness of the liquid crystal layer of the liquid crystal element for green display was set to 5 μm by employing spacers of 5 μm in diameter. Thus, the liquid crystal elements for red, green and blue displays of the layered type liquid crystal element in the experimental example 15 had thicknesses of 7 μm, 5 μm and 5 μm, respectively.

In the experimental example 15, a double-coated adhesive tape ("Double-Tack Tape" manufactured by Sekisui Chemical Co., Ltd.), which is coated with acrylic adhesive and has a thickness of 20 μm, was employed for adhering the neighboring liquid crystal elements instead of the double-coated adhesive tape, which is coated with acrylic adhesive and has a thickness of 25 μm. Thus, each adhesive layer in the experimental example 15 has the thickness of 20 μm.

The display characteristics of the layered type liquid crystal element manufactured in the experimental example 15 were measured similarly to the experimental example 13. The layered type liquid crystal element manufactured in the experimental example 15 had the following characteristics. This layered type liquid crystal element had good white display characteristics and good black display characteristics, and exhibited good contrast.

Y-value (white): 31.9

Y-value (black): 4.5 contrast: 7.1:1

In this layered type liquid crystal element, the selective reflection state and the transparent state of the liquid crystal layer of the liquid crystal element for red display were achieved by the drive voltages of 80 V and 50 V, respectively. The selective reflection state and the transparent state of the liquid crystal layer of the liquid crystal element for green display were achieved by the drive voltages of 60 V and 40 V, respectively. The selective reflection state and the transparent state of the liquid crystal layer of the liquid crystal element for blue display were achieved by the drive voltages of 65 V and 40 V, respectively.

EXPERIMENTAL EXAMPLE 16

According to the experimental example 16, the layered type liquid crystal element, in which the liquid crystal elements for red, green and blue displays were layered in this order, was manufactured similarly to the experimental example 13 except for the followings.

As the substrate of each liquid crystal element, the experimental example 16 employed a polycarbonate (PC) film of 100 μm in thickness instead of the PES film of 150 μm in thickness.

In the experimental example 16, the thickness of the liquid crystal layer of the liquid crystal element for red display was set to 7 μm by employing spacers of 7 μm in diameter. The thickness of the liquid crystal layer of the liquid crystal element for green display was set to 5 μm by employing spacers of 5 μm in diameter. Thus, the liquid crystal elements for red, green and blue displays of the layered type liquid crystal element in the experimental example 16 had thicknesses of 7 μm, 5 μm and 5 μm, respectively.

In the experimental example 16, a double-coated adhesive tape ("Double-Tack Tape" manufactured by Sekisui Chemical Co., Ltd.), which is coated with acrylic adhesive and has a thickness of 15 μm, was employed for adhering the neighboring liquid crystal elements instead of the double-coated adhesive tape, which is coated with acrylic adhesive and has a thickness of 25 μm. Thus, each adhesive layer in the experimental example 16 has the thickness of 15 μm.

The display characteristics of the layered type liquid crystal element manufactured in the experimental example 16 were measured similarly to the experimental example 13. The layered type liquid crystal element manufactured in the experimental example 16 had the following characteristics. This layered type liquid crystal element had good white display characteristics and good black display characteristics, and exhibited good contrast.

Y-value (white): 32.3

Y-value (black): 4.3 contrast: 7.5:1

In this layered type liquid crystal element, the selective reflection state and the transparent state of the liquid crystal layer of the liquid crystal element for red display were achieved by the drive voltages of 80 V and 50 V, respectively. The selective reflection state and the transparent state of the liquid crystal layer of the liquid crystal element for green display were achieved by the drive voltages of 60 V and 40 V, respectively. The selective reflection state and the transparent state of the liquid crystal layer of the liquid crystal element for blue display were achieved by the drive voltages of 65 V and 40 V, respectively.

EXPERIMENTAL EXAMPLE 17

According to the experimental example 17, the layered type liquid crystal element, in which the liquid crystal elements for red, green and blue displays were layered in this order, was manufactured similarly to the experimental example 13 except for the followings.

As the substrate of each liquid crystal element, the experimental example 17 employed a polycarbonate (PC) film of 150 μm in thickness instead of the PES film of 150 μm in thickness.

In the experimental example 17, the thickness of the liquid crystal layer of the liquid crystal element for red display was set to 7 μm by employing spacers of 7 μm in diameter. The thickness of the liquid crystal layer of the liquid crystal element for green display was set to 5 μm by employing spacers of 5 μm in diameter. Thus, the liquid crystal elements for red, green and blue displays of the layered type liquid crystal element in the experimental example 17 had thicknesses of 7 μm, 5 μm and 5 μm, respectively.

In the experimental example 17, adhesive made of ultraviolet-curing resin was employed for adhering the neighboring liquid crystal elements instead of the double-coated adhesive tape. More specifically, the neighboring liquid crystal elements in the experimental example 17 were adhered together by the ultraviolet-curing resin in the following manner. First, droplets of the ultraviolet-curing resin were applied to one of the liquid crystal elements to be adhered, and the other liquid crystal element was laid over the liquid crystal element carrying the ultraviolet-curing resin. Then, ultraviolet rays were emitted thereto so that the ultraviolet-curing resin between the liquid crystal elements was cured to adhere the neighboring liquid crystal elements together. Spacers (manufactured by Sekisui Finechemical Co., Ltd.) of 10 μm in diameter were disposed between the neighboring liquid crystal elements so that each adhesive layer had a thickness of 10 μm. In the example, the spacers were disposed between the neighboring liquid crystal elements by dispersing the spacers on the liquid crystal element other than the liquid crystal element carrying the ultraviolet-curing resin before these elements are overlaid together.

The display characteristics of the layered type liquid crystal element manufactured in the experimental example 17 were measured similarly to the experimental example 13. The layered type liquid crystal element manufactured in the experimental example 17 had the following characteristics. This layered type liquid crystal element had good white display characteristics and good black display characteristics, and exhibited good contrast.

Y-value (white): 32.5

Y-value (black): 4.6 contrast: 7.1:1

In this layered type liquid crystal element, the selective reflection state and the transparent state of the liquid crystal layer of the liquid crystal element for red display were achieved by the drive voltages of 80 V and 50 V, respectively. The selective reflection state and the transparent state of the liquid crystal layer of the liquid crystal element for green display were achieved by the drive voltages of 60 V and 40 V, respectively. The selective reflection state and the transparent state of the liquid crystal layer of the liquid crystal element for blue display were achieved by the drive voltages of 65 V and 40 V, respectively.

EXPERIMENTAL EXAMPLE 18

According to the experimental example 18, the layered type liquid crystal element, in which the liquid crystal elements for red, green and blue displays were layered in this order, was manufactured similarly to the experimental example 13 except for the followings.

As the substrate of each liquid crystal element, the experimental example 18 employed a polyacrylate (PA) film of 80 μm in thickness instead of the PES film of 150 μm in thickness.

In the experimental example 18, the thickness of the liquid crystal layer of the liquid crystal element for red display was set to 7 μm by employing spacers of 7 μm in diameter. The thickness of the liquid crystal layer of the liquid crystal element for green display was set to 5 μm by employing spacers of 5 μm in diameter. Thus, the liquid crystal elements for red, green and blue displays of the layered type liquid crystal element in the experimental example 18 had thicknesses of 7 μm, 5 μm and 5 μm, respectively.

In the experimental example 18, liquid crystal compositions LCr2, LCg2 and LCb2 were employed as the liquid crystal of the liquid crystal layers of the liquid crystal elements for red, green and blue displays, respectively. The liquid crystal composition LCr2 for the liquid crystal element for red display was chiral nematic liquid crystal formed by adding a predetermined amount of chiral material S-811 (manufactured by Merck & Co.) to nematic liquid crystal having refractive index anisotropy value $\Delta n$ of 0.174 and dielectric anisotropy $\Delta \epsilon$ of 4.63. The liquid crystal composition LCr2 had the selective reflection wavelength of about 680 nm (red region). The liquid crystal composition LCg2 for the liquid crystal element for green display was chiral nematic liquid crystal formed by adding a predetermined amount of chiral material S-811 (manufactured by Merck & Co.) to nematic liquid crystal having refractive index anisotropy value $\Delta n$ of 0.185 and dielectric anisotropy $\Delta \epsilon$ of 5.12. The liquid crystal composition LCg2 had the selective reflection wavelength of about 560 nm (green region). The liquid crystal composition LCb2 for the liquid crystal element for blue display was chiral nematic liquid crystal formed by adding a predetermined amount of chiral material S-811 (manufactured by Merck & Co.) to nematic liquid crystal having refractive index anisotropy value $\Delta n$ of 0.193 and dielectric anisotropy $\Delta \epsilon$ of 6.08. The liquid crystal composition LCb2 had the selective reflection wavelength of about 480 nm (blue region). All the liquid crystal compositions LCr2, LCg2 and LCb2 exhibited the cholesteric phase in the room temperature.

In the experimental example 18, a double-coated adhesive tape ("Double-Tack Tape" manufactured by Sekisui Chemical Co., Ltd.), which is coated with acrylic adhesive and has a thickness of 15 μm, was employed for adhering the neighboring liquid crystal elements instead of the double-coated adhesive tape, which is coated with acrylic adhesive and has a thickness of 25 μm. Thus, each adhesive layer in the experimental example 18 has the thickness of 15 μm.

The display characteristics of the layered type liquid crystal element manufactured in the experimental example 18 were measured similarly to the experimental example 13. The layered type liquid crystal element manufactured in the experimental example 18 had the following characteristics. This layered type liquid crystal element had good white display characteristics and good black display characteristics, and exhibited good contrast.

Y-value (white): 30.7

Y-value (black): 4.2 contrast: 7.3:1

In this layered type liquid crystal element, the selective reflection state and the transparent state of the liquid crystal layer of the liquid crystal element for red display were achieved by the drive voltages of 85 V and 55 V, respectively. The selective reflection state and the transparent state of the liquid crystal layer of the liquid crystal element for green display were achieved by the drive voltages of 90 V and 60 V, respectively. The selective reflection state and the transparent state of the liquid crystal layer of the liquid crystal element for blue display were achieved by the drive voltages of 95 V and 65 V, respectively.

Comparative Experimental Example 4

According to the comparative example 4, the layered type liquid crystal element, in which the liquid crystal elements for red, green and blue displays were layered in this order, was manufactured similarly to the experimental example 13 except for the followings.

As the substrate of each liquid crystal element, the comparative example 4 employed a PES film of 200 μm in thickness.

In the comparative example 4, the thickness of the liquid crystal layer of the liquid crystal element for blue display was set to 7 μm by employing spacers of 7 μm in diameter. Thus, the liquid crystal elements for red, green and blue displays of the layered type liquid crystal element in the comparative example 4 had thicknesses of 9 μm, 7 μm and 7 μm, respectively.

In the comparative example 4, a double-coated adhesive tape ("Double-Tack Tape" manufactured by Sekisui Chemical Co., Ltd.), which is coated with acrylic adhesive and has a thickness of 60 μm, was employed for adhering the neighboring liquid crystal elements instead of the double-coated adhesive tape, which is coated with acrylic adhesive and has a thickness of 25 μm. Thus, each adhesive layer in the comparative example 4 has the thickness of 60 μm.

The display characteristics of the layered type liquid crystal element manufactured in the comparative example 4 were measured similarly to the experimental example 13. The layered type liquid crystal element manufactured in the comparative example 4 had the following characteristics. Scattering occurred to a large extent in the layered type liquid crystal element, and the Y-value (black) became large when black display is performed. Therefore, the contrast was lower than that of the layered type liquid crystal elements of the experimental examples 13–18.

Y-value (white): 23.8

Y-value (black): 6.8 contrast: 3.5:1

In this layered type liquid crystal element, the selective reflection state and the transparent state of the liquid crystal layer of the liquid crystal element for red display were achieved by the drive voltages of 90 V and 60 V, respectively. The selective reflection state and the transparent state of the liquid crystal layer of the liquid crystal element for green display were achieved by the drive voltages of 65 V and 45 V, respectively. The selective reflection state and the transparent state of the liquid crystal layer of the liquid crystal element for blue display were achieved by the drive voltages of 70 V and 45 V, respectively.

The following table 3 represents the results of the experimental examples 13–18 and the comparative experimental example 4 described above.

TABLE 3

| Adhesive Layer | Adhesive Material | Thickness of Adhesive Layer | Substrate Material | Substrate Thickness | Contrast |
| --- | --- | --- | --- | --- | --- |
| Ex. 13 Double-side Adhesive Tape | aclyric | 25 μm | PES | 150 μm | 6.0:1 (29.0:4.8) |
| Ex. 14 Double-side Adhesive Tape | aclyric | 40 μm | PES | 200 μm | 5.6:1 (28.6:5.1) |
| Ex. 15 Double-side Adhesive Tape | aclyric | 20 μm | PC | 150 μm | 7.1:1 (31.9:4.5) |
| Ex. 16 Double-side Adhesive Tape | aclyric | 15 μm | PC | 100 μm | 7.5:1 (32.3:4.3) |
| Ex. 17 Adhesive | UV-curing resin | 10 μm | PC | 150 μm | 7.1:1 (32.5:4.6) |
| Ex. 18 Double-side Adhesive Tape | aclyric | 15 μm | PA | 80 μm | 7.3:1 (30.7:4.2) |
| C. Ex. 4 Double-side Adhesive Tape | aclyric | 60 μm | PES | 200 μm | 3.5:1 (23.8:6.8) |

Ex.: Experimental Example
C. Ex.: Comparative Experimental Example

It can be understood from the table 3 that the layered type liquid crystal elements of the experimental examples 13–18, in which the adhesive layer has a thickness equal to or smaller than ¼ of the thickness of the substrate, can achieve better contrast than the layered type liquid crystal element of the comparative example 4 having the adhesive layer which has a thickness larger than ¼ of the substrate thickness. The reason for this can be considered as follows. In the layered type liquid crystal element of the comparative example 4, the adhesive layer causes the light scattering to a large extent, and the Y-value (black) is large when each liquid crystal layer is transparent so that the contrast becomes low.

It can be seen from the Table 3 that the adhesive layer of the thickness of 30 μm or less can achieve better contrast than the adhesive layer larger than 30 μm.

(III) Liquid Crystal Elements of Sixth to Eighth Types

Figure 12:
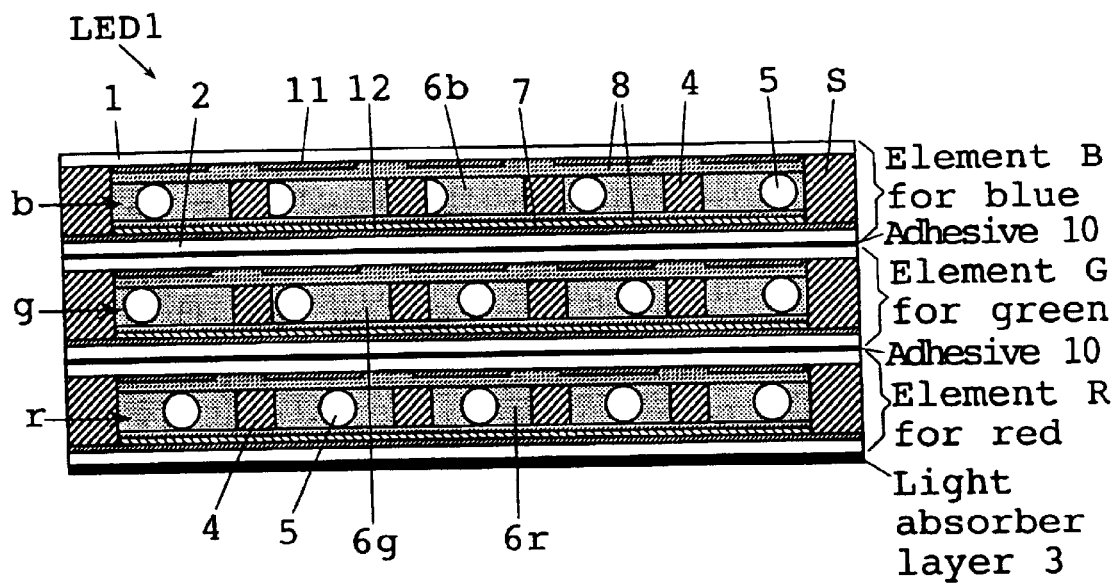
FIGS. 12–17 are schematic cross sections of further different examples of the liquid crystal element of the layered type according to the invention, respectively.
Figure 13:
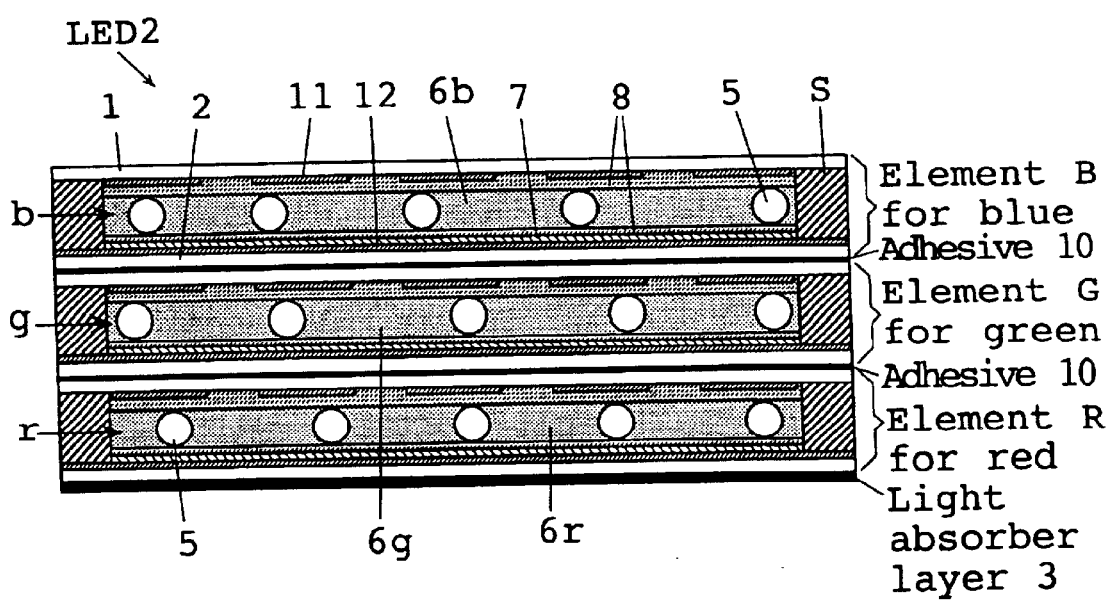
Figure 14:
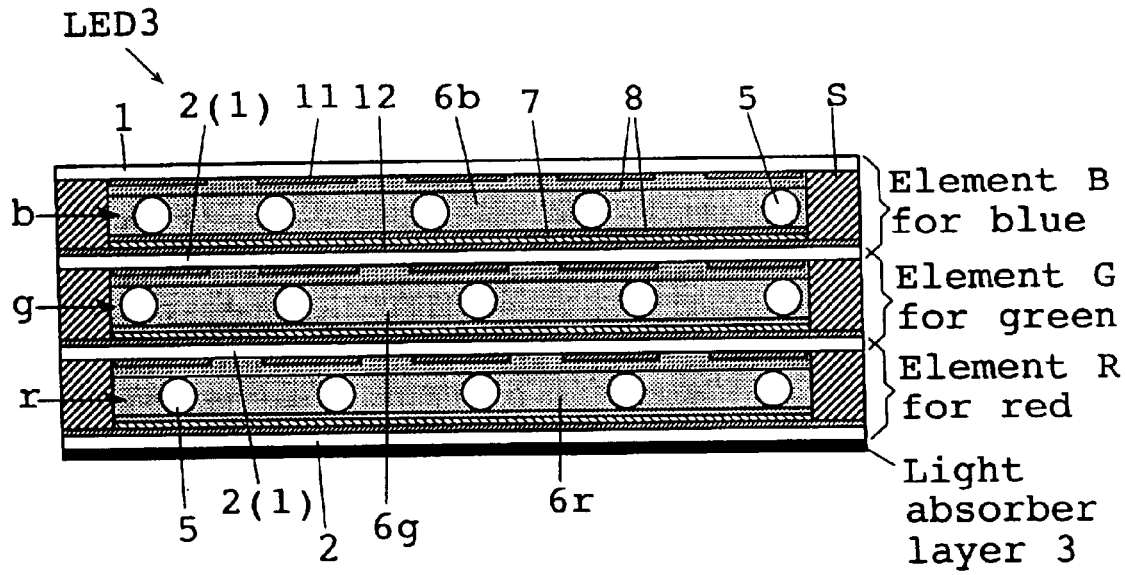

FIGS. 12, 13 and 14 show further different examples of the layered type liquid crystal elements.

The layered type liquid crystal elements shown in FIGS. 12, 13 and 14 are substantially the same as the layered type liquid crystal elements shown in FIGS. 1, 2 and 3 except for the points described below, respectively. Each of the elements shown in FIGS. 12–14 can be manufactured and driven similarly to the elements shown in FIGS. 1–3.

In FIGS. 12–14, parts and portions of the layered type liquid crystal elements, which are the same as or similar to those in FIGS. 1–3, bear the same reference numbers.

In each of the layered type liquid crystal elements shown in FIGS. 12–14, each of the liquid crystal elements B, G and R layered together includes the paired substrates 1 and 2, which hold a liquid crystal layer b, g or r therebetween, and are made of transparent resin film substrates.

In each of the layered type liquid crystal elements LED1, LED2 and LED3 shown in FIGS. 12–14, the orientation control film 8 is arranged on the transparent belt-like electrodes 11 on the substrate 1, and the insulating film 7 is arranged on the transparent belt-like electrodes 12 on the other substrate 2. Further, the orientation control film 8 is arranged on the insulating film 7 on the substrate 2. These insulating film and orientation film are employed only when necessary or desired.

Between the two transparent resin film substrates 1 and 2, at least the substrate on the element observation side has a thickness from 50 μm to 200 μm, and therefore has a small thickness without impairing of the display of the liquid crystal element of the layered type. The refractive index of the substrate 1 is 1.58 or more, and therefore is relatively large. Although the resin film substrate generally has a relatively large refractive index, it may be made of a material such as polyether sulfone (PES), polycarbonate (PC) or polyarylate (PA), whereby the resin film substrate can have the required refractive index of 1.58 or more. The upper limit of the refractive index of the resin film substrate is substantially 1.7 or less, although it depends on, e.g., the material of the substrate and/or the refractive index of the electrode formed on the substrate.

The electrode, which is formed on the resin film substrate having the thickness and refractive index described above, has a relatively large thickness from 1200 Å to 1500 Å. Since the electrode is relatively thick, the surface resistance of the electrode can be small, and is equal to or smaller than 200 ohm/square (200Ω/□) in this embodiment.

The electrode larger than 1500 Å in thickness is liable to cause disadvantages such as separation of the electrode and bending of the substrate due to a difference in thermal expansion between the electrode and the substrate carrying it. Therefore, the thickness of 1500 Å or less is preferable.

According to the layered type liquid crystal elements shown in FIGS. 12–14, at least the electrode of the electrodes 11 and 12 opposing to the liquid crystal layer b, g or r, which is located on the element observation side, has a relatively large thickness of 1200 Å–1500 Å. The electrode having such a large thickness increases the influence by the refractive index so that the interference of light in the wavelength range from red light to infrared rays is reduced in each of the liquid crystal layers b, g and r, and the brightness and contrast in the image display can be improved. Since the electrode has the surface resistance of 200 ohm/square (200Ω/□) or less, electrical conductivity can be easily achieved. At least the substrate on the element observation side has the refractive index of 1.58 or more, which is close to the refractive index of a usually employed transparent substrate. This suppresses unnecessary scattering of the light passing through the substrate and the electrode. This also improves the contrast.

According to the layered type liquid crystal elements shown in FIGS. 12–14, therefore, bright image display with high contrast can be performed, and electrical conductivity can be easily achieved.

In each of the layered type liquid crystal elements shown in FIGS. 12–14, at least the substrate 1 between the pair of resin film substrates 1 and 2, which is located on the element observation side, has a small thickness of 50 μm–200 μm, which does not impair the display characteristics of the liquid crystal element of the layered type. Although the substrate is formed of the thin resin film described above, the bending of the substrate can be suppressed because the electrode formed on the substrate has the thickness of 1200 Å to 1500 Å. This facilitates manufacturing of the element, and problems (e.g., breakage of electrode) due to bending of the substrate are prevented.

Brief description will be given on an example of manufacturing each liquid crystal element (each liquid crystal cell) in the layered type liquid crystal element LED1 shown in FIG. 12.

First, the plurality of belt-like transparent electrodes are formed on each of the two transparent electrodes 1 and 2. The transparent electrodes 11 and 12 are formed by forming ITO films on the substrates by a sputtering method or the like, and then patterning them by photolithography.

Then, the orientation control film 8 is formed on the transparent electrode formation surface of the substrate 1, and the insulating film 7 and/or the orientation control film 8 are formed on the transparent electrode formation surface of the substrate 2. The insulating film 7 and orientation control film 8 can be formed by a known method such as a sputtering method, spin coat method or a roll coat method using an inorganic material such as silicon oxide or an organic material such as polyimide resin.

Then, the resin structures 4 are formed on the electrode formation surface of one of the substrates 1 and 2, on which the transparent electrodes 11 (or 12), insulating film 7 and/or orientation control film 8 are formed in the above manner. The resin structures 4 are made of resin material paste prepared by dissolving resin in solvent, and are formed in a printing method, in which the resin material paste is squeezed out by a squeegee via a screen or a metal mask, and printing is effected on the substrate 1 (or 2) laid on a flat plate. Instead of the printing, the resin structures 4 may be prepared by a method such as a dispenser method or an ink jet method in which the resin material is supplied onto the substrate from a nozzle(s), or a transfer method in which the resin material supplied onto a flat plate or roller is transferred onto the substrate surface. When forming the resin structures, it is preferable that the resin structure has a height larger than the desired thickness of the liquid crystal layer.

The seal member S made of ultraviolet-curing resin, thermosetting resin or the like is arranged on the electrode formation surface of the other substrate 2 (or 1). The seal member S has a continuous and annular form extending on the peripheral portion of the substrate. The seal member S may be disposed in a method similar to that for the resin structures 4, and thus may be disposed by a method such as a dispenser method or an ink jet method executed by discharging resin onto the substrate from a nozzle, a printing method using a screen or a metal mask, or a transfer method executed by applying resin onto a flat plate or a roller, and then transferring it onto the substrate.

Then, the spacers 5 are dispersed on the surface of at least one of the substrates 1 and 2 in a known method.

The paired substrates 1 and 2 are overlaid together with the electrode formation surfaces opposed to each other, and the liquid crystal material 6b, 6g or 6r is disposed between the substrates. Pressure and heat are applied to the opposite sides of the substrate pair (1 and 2) thus arranged. The pressure and heat can be applied, e.g., in the following manner shown in FIG. 5. The substrate 1 carrying the resin structures is laid on the flat plate 91, and the other substrate 2 is laid over it. The pressure and heat are applied to the substrate pair by the heating and pressing roller 92 while moving the substrate pair through the position between the roller 92 and the flat plate 91.

The liquid crystal material is applied during the foregoing substrate overlaying step in such a manner that droplets of the liquid crystal material 6b, 6g or 6r are applied onto the substrates 1 and/or 2 for disposing the liquid crystal material at the same time as the overlaying of the substrates. In this case, the spacers may be disposed within the liquid crystal material before application, and the droplets of the liquid crystal material containing the spacers may be applied onto the electrode formation surfaces of the substrate 1 and/or 2.

As shown in FIG. 5, droplets of the liquid crystal material 6b, 6g or 6r may be applied onto an end of the substrate 1 or 2, and then may be spread toward the other end while overlaying the substrates 1 and 2 by the roller 92. Thereby, the liquid crystal material can be disposed over the entire area of the substrate. This manner can suppress such a situation that bubbles are generated and held within the liquid crystal material when overlaying the substrates 1 and 2.

The application of the pressure to the substrates 1 and 2 is continued until the substrate temperature lowers to or below the softening temperature of the resin material forming the resin structures 4, and then is stopped. If the seal member S is made of a photosetting resin material, light irradiation is performed to solidify the seal member S after the above processing. Through the above processing, the liquid crystal element is produced.

The liquid crystal elements B, G and R for the blue display, green display and red display are produced in the similar manner except for the selective reflection wavelengths of the liquid crystal materials to be used. The three layers of the liquid crystal elements thus produced are layered together, and the neighboring liquid crystal elements B and G as well as the neighboring liquid crystal elements G and R are mutually adhered by transparent adhesive or adhesive sheets 10 (generally referred to as "adhesive 10" in the figures), which is configured to eliminate or minimize an adverse effect on the layered type liquid crystal element characteristics. Further, the light absorber layer 3 is formed on the outer surface of the red display liquid crystal element R. Thus the layered type liquid crystal element capable of full color display is formed.

The layered type liquid crystal element LED2 shown in FIG. 13 is manufactured in the same manner as the layered type liquid crystal element LED1 except for that the formation of the resin structures 4 is not performed, and the step shown in FIG. 5 is replaced with the step shown in FIG. 6 not forming the resin structures 4. Others are the same as the manner of manufacturing the layered type liquid crystal element LED1.

The layered type liquid crystal element LED3 shown in FIG. 14 is manufactured in the same manner as the layered type liquid crystal element LED1 except for the following steps. The electrodes as well as the insulating films and orientation control films, if necessary, are formed in advance on the opposite surfaces of each of the substrates located between the neighboring liquid crystal elements B and G and between neighboring liquid crystal elements G and R. One of the liquid crystal elements is first formed, and then the other liquid crystal elements are successively formed on the element already formed, or are formed on the opposite sides of the element already formed.

Description will now be given on specific experimental examples 19–25 relating to the liquid crystal elements of the sixth to eighth types as well as the comparative experimental examples 5–8, although the invention is not restricted thereto. The layered type liquid crystal elements in the following experimental examples 19–24 and the comparative examples 5–8 have the substantially same structures as the layered type liquid crystal element LED2 shown in FIG. 13. In each of the layered type liquid crystal elements of the following experimental examples 19–24 and the comparative examples 5–8, the neighboring liquid crystal elements are fixed together by an acrylic adhesive sheet. The liquid crystal element in the experimental example 25 has the substantially same structure as the liquid crystal element R for red display in the layered type liquid crystal element LED2 shown in FIG. 13.

In the respective examples described below, the contrast was determined by measuring the luminous reflectance (Y-values) with the reflective spectrocolorimeter CM-3700d (manufactured by Minolta Co., Ltd.). A smaller Y-value means a high transparency. The contrast is given by (Y-value in the high reflectance state)/(Y-value in the low reflectance state). In the layered type liquid crystal element having the three-layer structure in each of the experimental examples described below (except for the example 25), a high reflectance state (i.e., white or nearly white state) was attained when the liquid crystal cells (liquid crystal elements) in all the layers were simultaneously set to the colored state, and a low reflectance state, in which all the elements became transparent or nearly transparent so that the black light absorber film could be viewed, was attained when the liquid crystal cells in all the layers were simultaneously set to the colorless state. Accordingly, the contrast is represented as the reflectance ratio (W/B) between the white display and black display. In the liquid crystal element of the experimental example 25, a high reflectance state (i.e., red or nearly red state) was attained when the liquid crystal cells (liquid crystal elements) was set to the colored state, and a low reflectance state, in which the element became transparent or nearly transparent so that the black light absorber film could be viewed, was attained when the liquid crystal cell was set to the colorless state. Accordingly, the contrast is represented as the reflectance ratio (R/B) between the red display and black display.

EXPERIMENTAL EXAMPLE 19

Predetermined amounts (i.e., 17%, 22% and 26% by weight) of chiral materials S-811 (manufactured by Merck & Co.) were added to nematic liquid crystal A having refractive index anisotropy value $\Delta n$ of 0.187 and dielectric anisotropy $\Delta \epsilon$ of 4.47, nematic liquid crystal B ($\Delta n=0.177$, $\Delta \epsilon$ of 5.33) and nematic liquid crystal C ($\Delta n=0.20$, $\Delta \epsilon=6.25$) so that liquid crystal compositions a1, b1 and c1 were prepared. The compositions a1, b1 and c1 could reflect the light of the wavelengths of about 680 nm, about 560 nm and about 480 nm, respectively.

The liquid crystal compositions a1, b1 and c1 have dielectric anisotropy $\Delta \epsilon$ of 12, 11 and 11, and refractive index anisotropy value $\Delta n$ of 0.18, 0.15 and 0.16, respectively.

First, a polyimide-contained orientation film of 800 Å in thickness was formed on transparent electrodes, which had a thickness of 1300 Å and a surface resistance of 125 ohm/square ($\Omega/\square$), and were arranged on a polyether sulfone (PES) film substrate having a thickness of 150 μm and a refractive index of 1.65. Then, spacers (manufactured by Sekisui Finechemical Co., Ltd.) of 9 μm in diameter were dispersed on the orientation film.

On transparent electrodes, which had a thickness of 1300 Å and a surface resistance of 125 ohm/square, and were formed on the other PES film substrate having a thickness of 150 μm and a refractive index of 1.65, a polyimide-contained insulating film of 2000 Å in thickness was formed, and a polyimide-contained orientation film of 1500 Å in thickness was formed on the insulating film.

Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition a1 of an amount, which was calculated from the height of and area surrounded by the seal material, was applied onto the substrate, and both the substrates were fixed together by the fixing device shown in FIG. 6. Thereafter, heating at 150° C. was performed for one hour to produce the liquid crystal cell (liquid crystal element) A1.

Then, a polyimide-contained orientation film of 800 Å in thickness was formed on transparent electrodes, which had a thickness of 1300 Å and a surface resistance of 125 ohm/square, and were arranged on a polyether sulfone (PES) film substrate having a thickness of 150 μm and a refractive index of 1.65. Then, spacers (manufactured by Sekisui Finechemical Co., Ltd.) of 7 μm in diameter were dispersed on the orientation film.

On transparent electrodes, which had a thickness of 1300 Å and a surface resistance of 125 ohm/square, and were formed on the other PES film substrate having a thickness of 150 μm and a refractive index of 1.65, a polyimide-contained insulating film of 2000 Å in thickness was formed, and a polyimide-contained orientation film of 1500 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition b1 of an amount, which was calculated from the height of and area surrounded by the seal material, was applied onto the substrate, and both the substrates were fixed together by a similar fixing device. Thereafter, heating at 150° C. was performed for one hour to produce the liquid crystal cell B1.

Further, a polyimide-contained orientation film of 800 Å in thickness was formed on a transparent electrodes, which had a thickness of 1300 Å and a surface resistance of 125 ohm/square, and were arranged on a PES film substrate having a thickness of 150 μm and a refractive index of 1.65. Then, spacers (manufactured by Sekisui Finechemical Co., Ltd.) of 7 μm in diameter were dispersed on the orientation film.

On transparent electrodes, which had a thickness of 1300 Å and a surface resistance of 125 ohm/square, and were formed on the other PES film substrate having a thickness of 150 μm and a refractive index of 1.65, a polyimide-contained insulating film of 2000 Å in thickness was formed, and a polyimide-contained orientation film of 1500 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition c1 of an amount, which was calculated from the height of and area surrounded by the seal material, was-applied onto the substrate, and both the substrates were fixed together by the fixing device. Thereafter, heating at 150° C. was performed for one hour to produce the liquid crystal cell C1.

These three kinds of cells A1, B1 and C1 were layered in this order, and a black light absorber film was arranged on the rear surface of the layered structure (i.e., external (rear) surface of the liquid crystal cell A1).

The layered structure was driven with the predetermined voltages to set each cell selectively to the colored state and colorless state. When viewed from the side of the cell C1, the layered structure exhibited the contrast of 6.0:1 (W/B), and thus it had good display characteristics for both the black and white, and achieved the element of high contrast.

EXPERIMENTAL EXAMPLE 20

The liquid crystal compositions a1, b1 and c1 prepared similarly to the experimental example 19 were used.

First, a polyimide-contained orientation film of 800 Å in thickness was formed on transparent electrodes, which had a thickness of 1400 Å and a surface resistance of 80 ohm/square ($\Omega/\Box$), and were arranged on a polycarbonate (PC) film substrate having a thickness of 100 μm and a refractive index of 1.58. Then, spacers (manufactured by Sekisui Finechemical Co., Ltd.) of 9 μm in diameter were dispersed on the orientation film.

On transparent electrodes, which had a thickness of 1400 Å and a surface resistance of 80 ohm/square, and were formed on the other PC film substrate having a thickness of 100 μm and a refractive index of 1.58, a polyimide-contained insulating film of 2000 Å in thickness was formed, and a polyimide-contained orientation film of 1500 Å in thickness was formed on the insulating film.

Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition a1 of an amount, which was calculated from the height of and area surrounded by the seal material, was applied onto the substrate, and both the substrates were fixed together by the fixing device. Thereafter, heating at 150° C. was performed for one hour to produce the liquid crystal cell A1.

Then, a polyimide-contained orientation film of 800 Å in thickness was formed on transparent electrodes, which had a thickness of 1400 Å and a surface resistance of 80 ohm/square, and were arranged on a PC film substrate having a thickness of 100 μm and a refractive index of 1.58. Then, spacers (manufactured by Sekisui Finechemical Co., Ltd.) of 7 μm in diameter were dispersed on the orientation film.

On transparent electrodes, which had a thickness of 1400 Å and a surface resistance of 80 ohm/square, and were formed on the other PC film substrate having a thickness of 100 μm and a refractive index of 1.58, a polyimide-contained insulating film of 2000 Å in thickness was formed, and a polyimide-contained orientation film of 1500 Å in thickness was formed on the insulating film. Then, a seal material XN21S (manufactured by Mitsui Chemicals Co., Ltd.) was applied by screen printing onto the peripheral portion of one of the substrates so that a wall of a predetermined height was formed.

Thereafter, the liquid crystal composition b1 of an amount, which was calculated from the height of and area surrounded by the seal material, was applied onto the substrate, and both the substrates were fixed together by the fixing device. Thereafter, heating at 150° C. was performed for one hour to produce the liquid crystal cell B1.

Further, a polyimide-contained orientation film of 800 Å in thickness was formed on transparent electrodes, which had a thickness of 1400 Å and a surface resistance of 80 ohm/square, and were arranged on a PC film substrate having a thickness of 100 μm and a refractive index of 1.58. Then, spacers (manufactured by Sekisui Finechemical Co., Ltd.) of 7 μm in diameter were dispersed on the orientation film.

On transparent electrodes, which had a thickness of 1400 Å and a surface resistance of 80 ohm/square, and were formed on the other PC film substrate having a thickness of 100 μm and a refractive index of 1.58, a polyimide-contained insulating film of 2000 Å in thickness was formed, and a polyimide-contained orientation film of 1500 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition c1 of an amount, which was calculated from the height of and area surrounded by the seal material, was applied onto the substrate, and both the substrates were fixed together by the fixing device. Thereafter, heating at 150° C. was performed for one hour to produce the liquid crystal cell C1.

These three kinds of cells A1, B1 and C1 were layered in this order, and a black light absorber film was arranged on the rear surface of the layered structure (i.e., external (rear) surface of the liquid crystal cell A1).

The layered structure was driven with the predetermined voltages to set each cell selectively to the colored state and colorless state. The layered structure exhibited the contrast of 5.6:1 (W/B), and thus it had good display characteristics for both the black and white, and achieved the element of high contrast.

EXPERIMENTAL EXAMPLE 21

The liquid crystal compositions a1, b1 and c1 prepared similarly to the experimental example 19 were used.

First, a polyimide-contained orientation film of 800 Å in thickness was formed on transparent electrodes, which had a thickness of 1200 Å and a surface resistance of 160 ohm/square ($\Omega/\square$), and were arranged on a polyarylate (PA) film substrate having a thickness of 200 $\mu$m and a refractive index of 1.6. Then, spacers (manufactured by Sekisui Finechemical Co., Ltd.) of 9 $\mu$m in diameter were dispersed on the orientation film.

On transparent electrodes, which had a thickness of 1200 Å and a surface resistance of 160 ohm/square, and were formed on the other polyarylate film substrate having a thickness of 200 $\mu$m and a refractive index of 1.6, a polyimide-contained insulating film of 2000 Å in thickness was formed, and a polyimide-contained orientation film of 1500 Å in thickness was formed on the insulating film.

Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition a1 of an amount, which was calculated from the height of and area surrounded by the seal material, was applied onto the substrate, and both the substrates were fixed together by the fixing device. Thereafter, heating at 150° C. was performed for one hour to produce the liquid crystal cell A1.

Then, a polyimide-contained orientation film of 800 Å in thickness was formed on transparent electrodes, which had a thickness of 1200 Å and a surface resistance of 160 ohm/square, and were arranged on a polyarylate film substrate having a thickness of 200 $\mu$m and a refractive index of 1.6. Then, spacers (manufactured by Sekisui Finechemical Co., Ltd.) of 7 $\mu$m in diameter were dispersed on the orientation film.

On transparent electrodes, which had a thickness of 1200 Å and a surface resistance of 160 ohm/square, and were formed on the other polyarylate film substrate having a thickness of 200 $\mu$m and a refractive index of 1.6, a polyimide-contained insulating film of 2000 Å in thickness was formed, and a polyimide-contained orientation film of 1500 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition b1 of an amount, which was calculated from the height of and area surrounded by the seal material, was applied onto the substrate, and both the substrates were fixed together by the fixing device. Thereafter, heating at 150° C. was performed for one hour to produce the liquid crystal cell B1.

Further, a polyimide-contained orientation film of 800 Å in thickness was formed on transparent electrodes, which had a thickness of 1200 Å and a surface resistance of 160 ohm/square, and were arranged on a polyarylate film substrate having a thickness of 200 $\mu$m and a refractive index of 1.6. Then, spacers (manufactured by Sekisui Finechemical Co., Ltd.) of 7 $\mu$m in diameter were dispersed on the orientation film.

On transparent electrodes, which had a thickness of 1200 Å and a surface resistance of 160 ohm/square, and were formed on the other polyarylate film substrate having a thickness of 200 $\mu$m and a refractive index of 1.6, a polyimide-contained insulating film of 2000 Å in thickness was formed, and a polyimide-contained orientation film of 1500 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition c1 of an amount, which was calculated from the height of and area surrounded by the seal material, was applied onto the substrate, and both the substrates were fixed together by the fixing device. Thereafter, heating at 150° C. was performed for one hour to produce the liquid crystal cell C1.

These three kinds of cells A1, B1 and C1 were layered in this order, and a black light absorber film was arranged on the rear surface of the layered structure (i.e., external (rear) surface of the liquid crystal cell A1).

The layered structure was driven with the predetermined voltages to set each cell selectively to the colored state and colorless state. The layered structure exhibited the contrast of 5.5:1 (W/B), and thus it had good display characteristics for both the black and white, and achieved the element of high contrast.

EXPERIMENTAL EXAMPLE 22

The liquid crystal compositions a1, b1 and c1 prepared similarly to the experimental example 19 were used.

First, a polyimide-contained orientation film of 800 Å in thickness was formed on transparent electrodes, which had a thickness of 1450 Å and a surface resistance of 65 ohm/square ($\Omega/\square$), and were arranged on a polyether sulfone (PES) film substrate having a thickness of 150 $\mu$m and a refractive index of 1.65. Then, spacers (manufactured by Sekisui Finechemical Co., Ltd.) of 9 $\mu$m in diameter were dispersed on the orientation film.

On transparent electrodes, which had a thickness of 1450 Å and a surface resistance of 65 ohm/square, and were formed on the other PES film substrate having a thickness of 150 $\mu$m and a refractive index of 1.65, a polyimide-contained insulating film of 2000 Å in thickness was formed, and a polyimide-contained orientation film of 1500 Å in thickness was formed on the insulating film.

Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition a1 of an amount, which was calculated from the height of and area surrounded by the seal material, was applied onto the substrate, and both the substrates were fixed together by the fixing device. Thereafter, heating at 150° C. was performed for one hour to produce the liquid crystal cell A1.

Then, a polyimide-contained orientation film of 800 Å in thickness was formed on transparent electrodes, which had a thickness of 1450 Å and a surface resistance of 65 ohm/square, and were arranged on a PES film substrate having a thickness of 150 μm and a refractive index of 1.65. Then, spacers (manufactured by Sekisui Finechemical Co., Ltd.) of 7 μm in diameter were dispersed on the orientation film.

On transparent electrodes, which had a thickness of 1450 Å and a surface resistance of 65 ohm/square, and were formed on the other PES film substrate having a thickness of 150 μm and a refractive index of 1.65, a polyimide-contained insulating film of 2000 Å in thickness was formed, and a polyimide-contained orientation film of 1500 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition b1 of an amount, which was calculated from the height of and area surrounded by the seal material, was applied onto the substrate, and both the substrates were fixed together by the fixing device. Thereafter, heating at 150° C. was performed for one hour to produce the liquid crystal cell B1.

Further, a polyimide-contained orientation film of 800 Å in thickness was formed on transparent electrodes, which had a thickness of 1450 Å and a surface resistance of 65 ohm/square, and were arranged on a PES film substrate having a thickness of 150 μm and a refractive index of 1.65. Then, spacers (manufactured by Sekisui Finechemical Co., Ltd.) of 7 μm in diameter were dispersed on the orientation film.

On transparent electrodes, which had a thickness of 1450 Å and a surface resistance of 65 ohm/square, and were formed on the other PES film substrate having a thickness of 150 μm and a refractive index of 1.65, a polyimide-contained insulating film of 2000 Å in thickness was formed, and a polyimide-contained orientation film of 1500 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition c1 of an amount, which was calculated from the height of and area surrounded by the seal material, was applied onto the substrate, and both the substrates were fixed together by the fixing device. Thereafter, heating at 150° C. was performed for one hour to produce the liquid crystal cell C1.

These three kinds of cells A1, B1 and C1 were layered in this order, and a black light absorber film was arranged on the rear surface of the layered structure (i.e., external (rear) surface of the liquid crystal cell A1).

The layered structure was driven with the predetermined voltages to set each cell selectively to the colored state and colorless state. The layered structure exhibited the contrast of 5.8:1 (W/B), and thus it had good display characteristics for both the black and white, and achieved the element of high contrast.

EXPERIMENTAL EXAMPLE 23

The liquid crystal compositions a1, b1 and c1 prepared similarly to the experimental example 19 were used.

First, a polyimide-contained orientation film of 800 Å in thickness was formed on transparent electrodes, which had a thickness of 1350 Å and a surface resistance of 100 ohm/square (Ω/□), and were arranged on a polyether sulfone (PES) film substrate having a thickness of 130 μm and a refractive index of 1.65. Then, spacers (manufactured by Sekisui Finechemical Co., Ltd.) of 9 μm in diameter were dispersed on the orientation film.

On transparent electrodes, which had a thickness of 1400 Å and a surface resistance of 120 ohm/square, and were formed on the other PES film substrate having a thickness of 150 μm and a refractive index of 1.65, a polyimide-contained insulating film of 2000 Å in thickness was formed, and a polyimide-contained orientation film of 1500 Å in thickness was formed on the insulating film.

Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition a1 of an amount, which was calculated from the height of and area surrounded by the seal material, was applied onto the substrate, and both the substrates were fixed together by the fixing device. Thereafter, heating at 150° C. was performed for one hour to produce the liquid crystal cell A1.

Then, a polyimide-contained orientation film of 800 Å in thickness was formed on transparent electrodes, which had a thickness of 1350 Å and a surface resistance of 100 ohm/square, and were arranged on a PES film substrate having a thickness of 130 μm and a refractive index of 1.65. Then, spacers (manufactured by Sekisui Finechemical Co., Ltd.) of 7 μm in diameter were dispersed on the orientation film.

On transparent electrodes, which had a thickness of 1400 Å and a surface resistance of 120 ohm/square, and were formed on the other PES film substrate having a thickness of 150 μm and a refractive index of 1.65, a polyimide-contained insulating film of 2000 Å in thickness was formed, and a polyimide-contained orientation film of 1500 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition b1 of an amount, which was calculated from the height of and area surrounded by the seal material, was applied onto the substrate, and both the substrates were fixed together by the fixing device. Thereafter, heating at 150° C. was performed for one hour to produce the liquid crystal cell B1.

Further, a polyimide-contained orientation film of 800 Å in thickness was formed on transparent electrodes, which had a thickness of 1350 Å and a surface resistance of 100 ohm/square, and were arranged on a PES film substrate having a thickness of 130 μm and a refractive index of 1.65. Then, spacers (manufactured by Sekisui Finechemical Co., Ltd.) of 7 μm in diameter were dispersed on the orientation film.

On transparent electrodes, which had a thickness of 1400 Å and a surface resistance of 120 ohm/square, and were formed on the other PES film substrate having a thickness of 150 μm and a refractive index of 1.65, a polyimide-contained insulating film of 2000 Å in thickness was formed, and a polyimide-contained orientation film of 1500 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition c1 of an amount, which was calculated from the height of and area surrounded by the seal material, was applied onto the substrate, and both the substrates were fixed together by the fixing device. Thereafter, heating at 150° C. was performed for one hour to produce the liquid crystal cell C1.

These three kinds of cells A1, B1 and C1 were layered in this order, and a black light absorber film was arranged on the rear surface of the layered structure (i.e., external (rear) surface of the liquid crystal cell A1).

The layered structure was driven with the predetermined voltages to set each cell selectively to the colored state and colorless state. The layered structure exhibited the contrast of 6.2:1 (W/B), and thus it had good display characteristics for both the black and white, and achieved the element of high contrast.

EXPERIMENTAL EXAMPLE 24

The liquid crystal compositions a1, b1 and c1 prepared similarly to the experimental example 19 were used.

First, a polyimide-contained orientation film of 800 Å in thickness was formed on transparent electrodes, which had a thickness of 1500 Å and a surface resistance of 55 ohm/square ($\Omega/\square$), and were arranged on a polyether sulfone (PES) film substrate having a thickness of 200 $\mu$m and a refractive index of 1.65. Then, spacers (manufactured by Sekisui Finechemical Co., Ltd.) of 9 $\mu$m in diameter were dispersed on the orientation film.

On transparent electrodes, which had a thickness of 1500 Å and a surface resistance of 55 ohm/square, and were formed on the other PES film substrate having a thickness of 200 $\mu$m and a refractive index of 1.65, a polyimide-contained insulating film of 2000 Å in thickness was formed, and a polyimide-contained orientation film of 1500 Å in thickness was formed on the insulating film.

Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition a1 of an amount, which was calculated from the height of and area surrounded by the seal material, was applied onto the substrate, and both the substrates were fixed together by the fixing device. Thereafter, heating at 150° C. was performed for one hour to produce the liquid crystal cell A1.

Then, a polyimide-contained orientation film of 800 Å in thickness was formed on transparent electrodes, which had a thickness of 1500 Å and a surface resistance of 55 ohm/square, and were arranged on a PES film substrate having a thickness of 200 $\mu$m and a refractive index of 1.65. Then, spacers (manufactured by Sekisui Finechemical Co., Ltd.) of 7 $\mu$m in diameter were dispersed on the orientation film.

On transparent electrodes, which had a thickness of 1500 Å and a surface resistance of 55 ohm/square, and were formed on the other PES film substrate having a thickness of 200 $\mu$m and a refractive index of 1.65, a polyimide-contained insulating film of 2000 Å in thickness was formed, and a polyimide-contained orientation film of 1500 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition b1 of an amount, which was calculated from the height of and area surrounded by the seal material, was applied onto the substrate, and both the substrates were fixed together by the fixing device. Thereafter, heating at 150° C. was performed for one hour to produce the liquid crystal cell B1.

Further, a polyimide-contained orientation film of 800 Å in thickness was formed on transparent electrodes, which had a thickness of 1500 Å and a surface resistance of 55 ohm/square, and were arranged on a PES film substrate having a thickness of 200 $\mu$m and a refractive index of 1.65. Then, spacers (manufactured by Sekisui Finechemical Co., Ltd.) of 7 $\mu$m in diameter were dispersed on the orientation film.

On transparent electrodes, which had a thickness of 1500 Å and a surface resistance of 55 ohm/square, and were formed on the other PES film substrate having a thickness of 200 $\mu$m and a refractive index of 1.65, a polyimide-contained insulating film of 2000 Å in thickness was formed, and a polyimide-contained orientation film of 1500 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition c1 of an amount, which was calculated from the height of and area surrounded by the seal material, was applied onto the substrate, and both the substrates were fixed together by the fixing device. Thereafter, heating at 150° C. was performed for one hour to produce the liquid crystal cell C1.

These three kinds of cells A1, B1 and C1 were layered in this order, and a black light absorber film was arranged on the rear surface of the layered structure (i.e., external (rear) surface of the liquid crystal cell A1).

The layered structure was driven with the predetermined voltages to set each cell selectively to the colored state and colorless state. The layered structure exhibited the contrast of 5.9:1 (W/B), and thus it had good display characteristics for both the black and white, and achieved the element of high contrast.

EXPERIMENTAL EXAMPLE 25

The liquid crystal composition a1 prepared similarly to the experimental example 19 was used.

First, a polyimide-contained orientation film of 800 Å in thickness was formed on transparent electrodes, which had a thickness of 1300 Å and a surface resistance of 100 ohm/square ($\Omega/\square$), and were arranged on a PES film substrate having a thickness of 150 $\mu$m and a refractive index of 1.65. Then, spacers (manufactured by Sekisui Finechemical Co., Ltd.) of 9 $\mu$m in diameter were dispersed on the orientation film. on transparent electrodes, which had a thickness of 1300 Å and a surface resistance of 100 ohm/square, and were formed on the other PES film substrate having a thickness of 150 $\mu$m and a refractive index of 1.65, a polyimide-contained insulating film of 2000 Å in thickness was formed, and a polyimide-contained orientation film of 800 Å in thickness was formed on the insulating film.

Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition a1 of an amount, which was calculated from the height of and area surrounded by the seal material, was applied onto the substrate, and both the substrates were fixed together by the fixing device shown in FIG. 6. Thereafter, heating at 150° C. was performed for one hour to produce a liquid crystal cell A0.

A black light absorber film was arranged on the rear surface of the external (rear) surface of the liquid crystal cell A0.

The cell was driven with the predetermined voltages to set the cell selectively to the colored state and colorless state. The cell exhibited the contrast of 6.3:1 (R/B), and thus it had good display characteristics for both the red and black, and achieved the element of high contrast.

Comparative Experimental Example 5

The liquid crystal compositions a1, b1 and c1 prepared similarly to the experimental example 19 were used.

First, a polyimide-contained orientation film of 800 Å in thickness was formed on transparent electrodes, which had a thickness of 800 Å and a surface resistance of 240 ohm/square ($\Omega/\square$) and were arranged on a PES film substrate having a thickness of 150 μm and a refractive index of 1.65. Then, spacers (manufactured by Sekisui Finechemical Co., Ltd.) of 9 μm in diameter were dispersed on the orientation film.

On transparent electrodes, which had a thickness of 800 Å and a surface resistance of 240 ohm/square, and were formed on the other PES film substrate having a thickness of 150 μm and a refractive index of 1.65, a polyimide-contained insulating film of 2000 Å in thickness was formed, and a polyimide-contained orientation film of 1500 Å in thickness was formed on the insulating film.

Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition a1 of an amount, which was calculated from the height of and area surrounded by the seal material, was applied onto the substrate, and both the substrates were fixed together by the fixing device. Thereafter, heating at 150° C. was performed for one hour to produce the liquid crystal cell A1.

Then, a polyimide-contained orientation film of 800 Å in thickness was formed on transparent electrodes, which had a thickness of 800 Å and a surface resistance of 240 ohm/square, and were arranged on a PES film substrate having a thickness of 150 μm and a refractive index of 1.65. Then, spacers (manufactured by Sekisui Finechemical Co., Ltd.) of 7 μm in diameter were dispersed on the orientation film.

On transparent electrodes, which had a thickness of 800 Å and a surface resistance of 240 ohm/square, and were formed on the other PES film substrate having a thickness of 150 μm and a refractive index of 1.65, a polyimide-contained insulating film of 2000 Å in thickness was formed, and a polyimide-contained orientation film of 1500 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition b1 of an amount, which was calculated from the height of and area surrounded by the seal material, was applied onto the substrate, and both the substrates were fixed together by the fixing device. Thereafter, heating at 150° C. was performed for one hour to produce the liquid crystal cell B1.

Further, a polyimide-contained orientation film of 800 Å in thickness was formed on transparent electrodes, which had a thickness of 800 Å and a surface resistance of 240 ohm/square, and were arranged on a PES film substrate having a thickness of 150 μm and a refractive index of 1.65. Then, spacers (manufactured by Sekisui Finechemical Co., Ltd.) of 7 μm in diameter were dispersed on the orientation film.

On transparent electrodes, which had a thickness of 800 Å and a surface resistance of 240 ohm/square, and were formed on the other PES film substrate having a thickness of 150 μm and a refractive index of 1.65, a polyimide-contained insulating film of 2000 Å in thickness was formed, and a polyimide-contained orientation film of 1500 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition c1 of an amount, which was calculated from the height of and area surrounded by the seal material, was applied onto the substrate, and both the substrates were fixed together by the fixing device. Thereafter, heating at 150° C. was performed for one hour to produce the liquid crystal cell C1.

These three kinds of cells A1, B1 and C1 were layered in this order, and a black light absorber film was arranged on the rear surface of the layered structure (i.e., external (rear) surface of the liquid crystal cell A1).

The layered structure was driven with the predetermined voltages to set each cell selectively to the colored state and colorless state. The layered structure exhibited the contrast of 4.5:1 (W/B).

Comparative Experimental Example 6

The liquid crystal compositions a1, b1 and c1 prepared similarly to the experimental example 19 were used.

First, a polyimide-contained orientation film of 800 Å in thickness was formed on transparent electrodes, which had a thickness of 2000 Å and a surface resistance of 50 ohm/square ($\Omega/\square$), and were arranged on a polyether sulfone (PES) film substrate having a thickness of 150 μm and a refractive index of 1.65. Then, spacers (manufactured by Sekisui Finechemical Co., Ltd.) of 9 μm in diameter were dispersed on the orientation film.

On transparent electrodes, which had a thickness of 2000 Å and a surface resistance of 50 ohm/square, and were formed on the other PES film substrate having a thickness of 150 μm and a refractive index of 1.65, a polyimide-contained insulating film of 2000 Å in thickness was formed, and a polyimide-contained orientation film of 1500 Å in thickness was formed on the insulating film.

Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition a1 of an amount, which was calculated from the height of and area surrounded by the seal material, was applied onto the substrate, and both the substrates were fixed together by the fixing device. Thereafter, heating at 150° C. was performed for one hour to produce the liquid crystal cell A1.

Then, a polyimide-contained orientation film of 800 Å in thickness was formed on transparent electrodes, which had a thickness of 2000 Å and a surface resistance of 50 ohm/square, and were arranged on a PES film substrate having a thickness of 150 μm and a refractive index of 1.65. Then, spacers (manufactured by Sekisui Finechemical Co., Ltd.) of 7 μm in diameter were dispersed on the orientation film.

On transparent electrodes, which had a thickness of 2000 Å and a surface resistance of 50 ohm/square, and were formed on the other PES film substrate having a thickness of 150 μm and a refractive index of 1.65, a polyimide-contained insulating film of 2000 Å in thickness was formed, and a polyimide-contained orientation film of 1500 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition b1 of an amount, which was calculated from the height of and area surrounded by the seal material, was applied onto the substrate, and both the substrates were fixed together by the fixing device. Thereafter, heating at 150° C. was performed for one hour to produce the liquid crystal cell B1.

Further, a polyimide-contained orientation film of 800 Å in thickness was formed on transparent electrodes, which had a thickness of 2000 Å and a surface resistance of 50 ohm/square, and were arranged on a PES film substrate having a thickness of 150 μm and a refractive index of 1.65. Then, spacers (manufactured by Sekisui Finechemical Co., Ltd.) of 7 μm in diameter were dispersed on the orientation film.

On transparent electrodes, which had a thickness of 2000 Å and a surface resistance of 50 ohm/square, and were formed on the other PES film substrate having a thickness of 150 μm and a refractive index of 1.65, a polyimide-contained insulating film of 2000 Å in thickness was formed, and a polyimide-contained orientation film of 1500 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition c1 of an amount, which was calculated from the height of and area surrounded by the seal material, was applied onto the substrate, and both the substrates were fixed together by the fixing device. Thereafter, heating at 150° C. was performed for one hour to produce the liquid crystal cell C1.

These three kinds of cells A1, B1 and C1 could not be layered to form the three-layer structure because each film substrate in these cells bent or curved after the heating for one hour. Accordingly, it was impossible to determine the contrast of the layered structure.

Comparative Experimental Example 7

The liquid crystal compositions a1, b1 and c1 prepared similarly to the experimental example 19 were used.

First, a polyimide-contained orientation film of 800 Å in thickness was formed on transparent electrodes, which had a thickness of 800 Å and a surface resistance of 280 ohm/square (Ω/□), and were arranged on a polycarbonate (PC) film substrate having a thickness of 100 μm and a refractive index of 1.58. Then, spacers (manufactured by Sekisui Finechemical Co., Ltd.) of 9 μm in diameter were dispersed on the orientation film.

On transparent electrodes, which had a thickness of 800 Å and a surface resistance of 280 ohm/square, and were formed on the other PC film substrate having a thickness of 100 μm and a refractive index of 1.58, a polyimide-contained insulating film of 2000 Å in thickness was formed, and a polyimide-contained orientation film of 1500 Å in thickness was formed on the insulating film.

Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition a1 of an amount, which was calculated from the height of and area surrounded by the seal material, was applied onto the substrate, and both the substrates were fixed together by the fixing device. Thereafter, heating at 150° C. was performed for one hour to produce the liquid crystal cell A1.

Then, a polyimide-contained orientation film of 800 Å in thickness was formed on transparent electrodes, which had a thickness of 800 Å and a surface resistance of 280 ohm/square, and were arranged on a PC film substrate having a thickness of 100 μm and a refractive index of 1.58. Then, spacers (manufactured by Sekisui Finechemical Co., Ltd.) of 7 μm in diameter were dispersed on the orientation film.

On transparent electrodes, which had a thickness of 800 Å and a surface resistance of 280 ohm/square, and were formed on the other PC film substrate having a thickness of 100 μm and a refractive index of 1.58, a polyimide-contained insulating film of 2000 Å in thickness was formed, and a polyimide-contained orientation film of 1500 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition b1 of an amount, which was calculated from the height of and area surrounded by the seal material, was applied onto the substrate, and both the substrates were fixed together by the fixing device. Thereafter, heating at 150° C. was performed for one hour to produce the liquid crystal cell B1.

Further, a polyimide-contained orientation film of 800 Å in thickness was formed on transparent electrodes, which had a thickness of 800 Å and a surface resistance of 280 ohm/square, and were arranged on a PC film substrate having a thickness of 100 μm and a refractive index of 1.58. Then, spacers (manufactured by Sekisui Finechemical Co., Ltd.) of 7 μm in diameter were dispersed on the orientation film.

On transparent electrodes, which had a thickness of 800 Å and a surface resistance of 280 ohm/square, and were formed on the other PC film substrate having a thickness of 100 μm and a refractive index of 1.58, a polyimide-contained insulating film of 2000 Å in thickness was formed, and a polyimide-contained orientation film of 1500 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition c1 of an amount, which was calculated from the height of and area surrounded by the seal material, was applied onto the substrate, and both the substrates were fixed together by the fixing device. Thereafter, heating at 150° C. was performed for one hour to produce the liquid crystal cell C1.

These three kinds of cells A1, B1 and C1 were layered in this order, and a black light absorber film was arranged on the rear surface of the layered structure (i.e., external (rear) surface of the liquid crystal cell A1).

The layered structure was driven with the predetermined voltages to set each cell selectively to the colored state and colorless state. The layered structure exhibited the contrast of 4.2:1 (W/B).

Comparative Experimental Example 8

The liquid crystal compositions a1, b1 and c1 prepared similarly to the experimental example 19 were used.

First, a polyimide-contained orientation film of 800 Å in thickness was formed on transparent electrodes, which had a thickness of 1000 Å and a surface resistance of 230 ohm/square($\Omega/\square$), and were arranged on a polyarylate (PA) film substrate having a thickness of 300 μm and a refractive index of 1.6. Then, spacers (manufactured by Sekisui Finechemical Co., Ltd.) of 9 μm in diameter were dispersed on the orientation film.

On transparent electrodes, which had a thickness of 1000 Å and a surface resistance of 230 ohm/square, and were formed on the other PA film substrate having a thickness of 300 μm and a refractive index of 1.6, a polyimide-contained insulating film of 2000 Å in thickness was formed, and a polyimide-contained orientation film of 1500 Å in thickness was formed on the insulating film.

Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition a1 of an amount, which was calculated from the height of and area surrounded by the seal material, was applied onto the substrate, and both the substrates were fixed together by the fixing device. Thereafter, heating at 150° C. was performed for one hour to produce the liquid crystal cell A1.

Then, a polyimide-contained orientation film of 800 Å in thickness was formed on transparent electrodes, which had a thickness of 1000 Å and a surface resistance of 230 ohm/square, and were arranged on a PA film substrate having a thickness of 300 μm and a refractive index of 1.6. Then, spacers (manufactured by Sekisui Finechemical Co., Ltd.) of 7 μm in diameter were dispersed on the orientation film.

On transparent electrodes, which had a thickness of 1000 Å and a surface resistance of 230 ohm/square, and were formed on the other PA film substrate having a thickness of 300 μm and a refractive index of 1.6, a polyimide-contained insulating film of 2000 Å in thickness was formed, and a polyimide-contained orientation film of 1500 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition b1 of an amount, which was calculated from the height of and area surrounded by the seal material, was applied onto the substrate, and both the substrates were fixed together by the fixing device. Thereafter, heating at 150° C. was performed for one hour to produce the liquid crystal cell B1.

Further, a polyimide-contained orientation film of 800 Å in thickness was formed on transparent electrodes, which had a thickness of 1000 Å and a surface resistance of 230 ohm/square, and were arranged on a PA film substrate having a thickness of 300 μm and a refractive index of 1.6. Then, spacers (manufactured by Sekisui Finechemical Co., Ltd.) of 7 μm in diameter were dispersed on the orientation film.

On transparent electrodes, which had a thickness of 1000 Å and a surface resistance of 230 ohm/square, and were formed on the other PA film substrate having a thickness of 300 μm and a refractive index of 1.6, a polyimide-contained insulating film of 2000 Å in thickness was formed, and a polyimide-contained orientation film of 1500 Å in thickness was formed on the insulating film. Then, the seal material XN21S (manufactured by Mitsui Chemicals Co., Ltd.) was applied by screen printing onto the peripheral portion of one of the substrates so that a wall of a predetermined height was formed.

Thereafter, the liquid crystal composition c1 of an amount, which was calculated from the height of and area surrounded by the seal material, was applied onto the substrate, and both the substrates were fixed together by the fixing device. Thereafter, heating at 150° C. was performed for one hour to produce the liquid crystal cell C1.

These three kinds of cells A1, B1 and C1 were layered in this order, and a black light absorber film was arranged on the rear surface of the layered structure (i.e., external (rear) surface of the liquid crystal cell A1).

The layered structure was driven with the predetermined voltages to set each cell selectively to the colored state and colorless state. The layered structure exhibited the contrast of 3.8:1 (W/B).

The following table 4 represents the results of the experimental examples and the comparative examples described above.

TABLE 4

| | Substrate Material | Substrate Thickness (μm) | Transparent Electrode Thickness (Å) | Surface Resistance ($\Omega/\square$) | Bend | Contrast |
|---|---|---|---|---|---|---|
| Ex. 19 | PES(1.65) | 150 | 1300 | 125 | no | 6.0:1 |
| Ex. 20 | Polycarbonate(1.58) | 100 | 1400 | 80 | no | 5.6:1 |
| Ex. 21 | Polyarylate (1.6) | 200 | 1200 | 160 | no | 5.5:1 |
| Ex. 22 | PES(1.65) | 150 | 1450 | 65 | no | 5.8:1 |
| Ex. 23 | PES(1.65) | 130 | 1350 | 100 | no | 6.2:1 |
| Ex. 24 | PES(1.65) | 200 | 1500 | 55 | no | 5.9:1 |
| Ex. 25 | PES(1.65) | 150 | 1300 | 100 | no | 6.3:1 |
| C. Ex. 5 | PES(1.65) | 150 | 800 | 240 | no | 4.5:1 |
| C. Ex. 6 | PES(1.65) | 150 | 2000 | 50 | yes | unmeasurable |
| C. Ex. 7 | Polycarbonate(1.58) | 100 | 600 | 280 | no | 4.2:1 |
| C. Ex. 8 | Polyarylate (1.6) | 300 | 1000 | 230 | no | 3.8:1 |

Ex.: Experimental Example
C. Ex.: Comparative Experimental Example

As can be seen from the table 4, the elements according to the invention, which were used in the experimental examples 19–25, exhibited contrast of 5.5:1–6.3:1, and thus all the elements exhibited high contrast. In contrast to this, the layered type liquid crystal elements, which were used in the comparative experimental examples 5, 7 and 8, and used the electrodes each having a thickeness smaller than 1200 Å, exhibited the contrast of 3.8:1–4.5:1, and thus low contrast. In the comparative experimental example 6, the film substrate bent due to the electrode having a large thickness exceeding 1500 Å.

(IV) Liquid Crystal Element of Ninth Type

Figure 15:
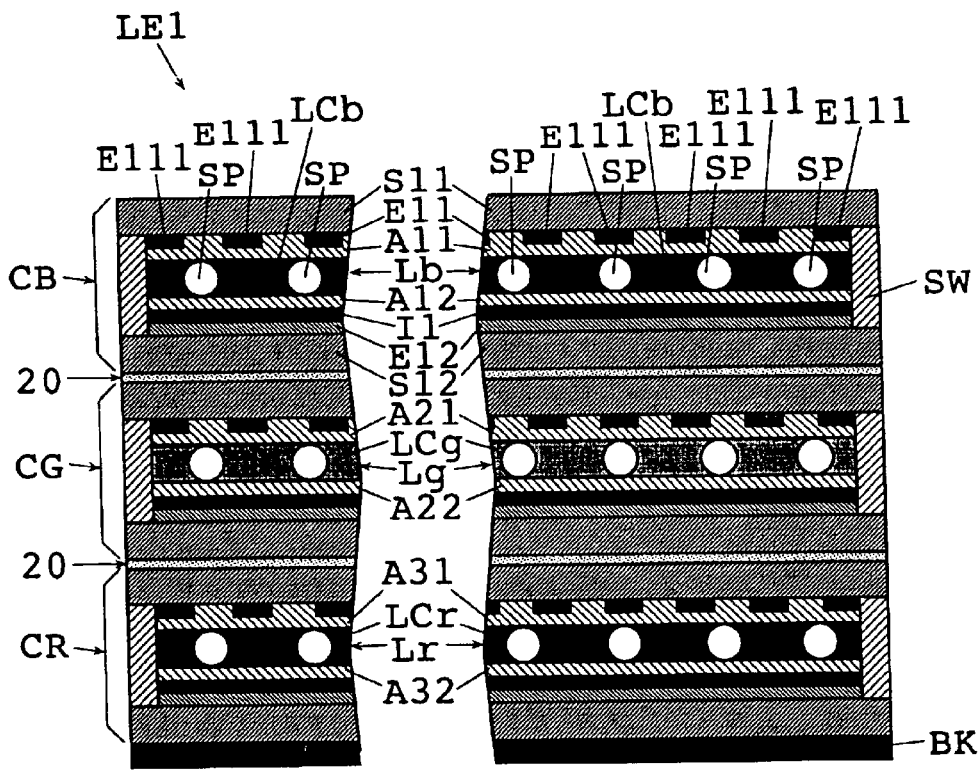

FIG. 15 is a schematic cross section of further another example of the layered type liquid crystal element.

The layered type liquid crystal element LE1 shown in FIG. 15 is formed of three liquid crystal elements (liquid crystal cells) CB, CG and CR layered together.

The layered type liquid crystal element LE1 in this example is utilized as a display element of the reflection type, and images displayed on this display element are observed from the outer side (upper side in FIG. 15) of the liquid crystal element CB. Accordingly, the liquid crystal element CB is arranged on the side nearest to the display observation side (element observation side), and the liquid crystal element CR is disposed in the position remotest from the observation side. The black light absorber layer BK is arranged on the outer side of the liquid crystal element CR disposed in the position remotest from the observation side. The layered type liquid crystal element LE1 can perform full color display, as will be described later in greater detail.

The liquid crystal elements CB, CG and CR are used for display in blue, green and red, respectively. The liquid crystal elements CB, CG and CR include different kinds of liquid crystal layers Lb, Lg and Lr (liquid crystal LCb, LCg and LCr) having the selective reflection wavelengths in the blue, green and red regions, respectively, as will be described later in greater detail. Accordingly, the three liquid crystal layers Lb, Lg and Lr are layered in the layered type liquid crystal element LE1. The liquid crystal layer Lb is located nearest to the observation side, and the liquid crystal layer Lr is located remotest from the observation side.

The neighboring two liquid crystal elements are adhered together by the adhesive layer 20 disposed therebetween. The adhesive layer 20 in this example is formed of double-coated adhesive tape. The adhesive on the double-coated adhesive tape may be acrylic adhesive. Instead of the double-coated adhesive tape, the adhesive layer 20 may be an adhesive agent. The adhesive agent may be ultraviolet-curing resin, thermosetting silicon-contained resin or the like.

The liquid crystal element CB for blue display has the following structure. The liquid crystal elements CG and CR have structures similar to the structure of the liquid crystal element CB described below.

The liquid crystal element CB has the pair of substrates S11 and S12, and the liquid crystal layer Lb held between the substrates.

Each of the substrates S11 and S12 in this example is a transparent film substrate made of resin. The transparent resin substrate material is, e.g., polyether sulfone (PES), polycarbonate (PC), polyethylene terephthalate or polyarylate (PA). The substrate of the liquid crystal element may be formed of a glass substrate instead of the resin substrate. On the substrate S11, the transparent electrode E11 and the orientation film A11 are layered. The electrode E11 is formed of the plurality of belt-like electrode portions E111 which are parallel to each other with a predetermined spaced therebetween. The orientation film may be typically made of polyimide. The orientation film A11 is not subjected to the rubbing in the manufacturing process.

On the substrate S12, the transparent electrode E12, the insulating film I1 and the orientation film A12 are layered. Although not shown, the electrode E12 is formed of the plurality of belt-like electrode portions which extend parallel to each other with a predetermined space therebetween. The belt-like electrode portions of the electrode E12 cross the belt-like electrode portions E111 to form a so-called matrix structure. The insulating layer I1 is provided for keeping electrical insulation between the electrodes E11 and E12. In the liquid crystal element CB, the insulating film is arranged on only one of the substrates (the substrate S12 in this example), but may be arranged on each of the substrates. Similarly to the orientation film A11, the orientation film A12 is not subjected to the rubbing in the manufacturing process.

The liquid crystal layer Lb is disposed between the substrates S11 and S12 provided with the orientation films and others as described above. The orientation films A11 and A12 are in contact with the liquid crystal layer Lb. The orientation films A11 and A12 are provided for the liquid crystal layer Lb, and are opposed to the liquid crystal layer Lb.

The liquid crystal layer Lb in this example includes liquid crystal LCb and spherical spacers SP.

For preventing leakage of the liquid crystal LCb from the peripheral portions of the substrates, the seal wall SW made of a resin material is arranged on the peripheral portion of the substrate. The seal wall SW is disposed between the opposite substrates and has an annular or frame-like form.

The liquid crystal LCb in this example is a chiral nematic liquid crystal exhibiting the cholesteric phase in the room temperature. This chiral nematic liquid crystal is made of a nematic liquid crystal and a chiral material added thereto for obtaining a predetermined helical pitch, and more specifically for achieving the selective reflection wavelength region of a predetermined wavelength. By adjusting the amount of chiral material added to the nematic liquid crystal, the selective reflection wavelength of the chiral nematic liquid crystal can be adjusted. The selective wavelength of the liquid crystal LCb is set in the blue region.

The state of the liquid crystal LCb can be changed by applying a voltage across the electrodes E11 and E12. For example, the liquid crystal LCb can assume the planar state when a relatively high voltage is applied across the electrodes. When a relatively low voltage is applied across the electrodes, the liquid crystal LCb can assume the focal conic state. By applying an intermediate voltage across the electrodes, the liquid crystal LCb can assume the state where the planar state and the focal conic state are present in a mixed fashion. After stop of application of the voltage, these states of the liquid crystal are stably held.

The liquid crystal LCb has the selective reflection wavelength set in the blue wavelength region, as already described. Accordingly, when the liquid crystal LCb is in the planar state, it selectively reflects the light in the blue wavelength range, and exhibits a blue appearance. When the liquid crystal LCb is in the focal conic state, it becomes transparent. Therefore, the liquid crystal LCb can perform blue display.

The other liquid crystal elements CG and CR have structures similar to that of the liquid crystal CB already described.

The liquid crystal element CG is provided for green display, and has a liquid crystal layer Lg which contains liquid crystal LCg having a selective reflection wavelength in the green wavelength region. The liquid crystal element CR is provided for red display, and has a liquid crystal layer Lr which contains liquid crystal LCr having a selective reflection wavelength in the red wavelength region. Each of the liquid crystal LCg and the liquid crystal LCb in this example is chiral nematic liquid crystal exhibiting the cholesteric phase in the room temperature, similarly to the liquid crystal LCb.

Orientation films A21 and A22 are provided for liquid crystal layer Lg of liquid crystal element CG. Orientation films A31 and A32 are provided for liquid crystal layer Lr of liquid crystal element CR. Similarly to the orientation films of the liquid crystal element CB, orientation films A21, A22, A31 and A32 are not subjected to the rubbing.

According to the layered type liquid crystal element LE1 including the liquid crystal elements CB, CG and CR (liquid crystal layers Lb, Lg and Lr) layered together can selectively perform the display in blue, green and red as well as intermediate colors, and colors of mixture of two or three of such colors. As a result, the full color display can be performed. When the liquid crystal of all the liquid crystal elements (liquid crystal layers) is transparent, the black which is the color of the light absorber layer BK arranged outside the liquid crystal element CR is displayed. A method of driving the layered type liquid crystal element LE1 is similar to that already described with reference to FIG. 11.

Dye(s) may be added to the liquid crystal element for improving the color purity in display performed by the selective reflection, and for absorbing light components lowering the transparency in the transparent state. Also, a color filter layer such as color glass filter or color film achieving similar effects may be arranged on the liquid crystal element. The dyes and the color filter layers may be employed in all the liquid crystal elements, or may be employed in only one or two of the liquid crystal elements. The dye(s) may be added to any one of the liquid crystal material, resin material, transparent electrode material and transparent substrate material, or may be added to two or more of them. For preventing lowering of the display quality, however, it is desired that neither dyes nor color filters impede the color display by the selective reflection of the liquid crystal elements.

Figure 16:
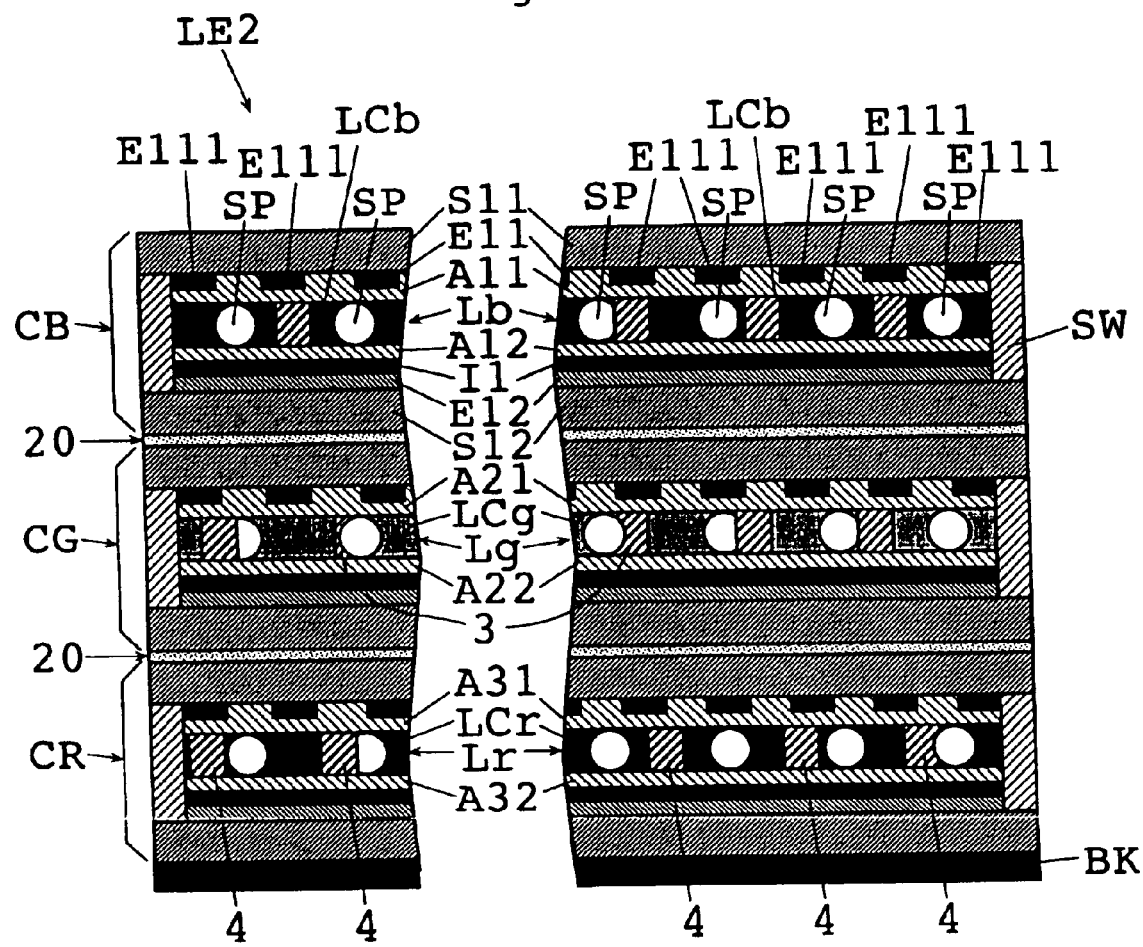

Instead of or together with the spacers, the resin structures (columnar resin structures) 4 may be disposed between the opposite substrates of each liquid crystal element (see FIG. 16). In FIG. 16 showing the layered type liquid crystal element LE2, the members having the substantially same functions as those of the layered type liquid crystal element LE1 shown in FIG. 15 bear the same reference numbers. The resin structures can be utilized for increasing the strength of the whole liquid crystal element, for adhering the substrate together, and for maintaining the desired gap between the substrates.

An example of a method of manufacturing the layered type liquid crystal element LE1 will now be described, which is similar to the method of manufacturing the element LE shown in FIG. 8.

First, the respective liquid crystal elements CB, CG and CR are formed. The liquid crystal element CB is formed in the following manner.

For manufacturing the liquid crystal element CB, the transparent electrodes E11 and E12 formed of the plurality of belt-like transparent electrodes are first formed on the transparent substrates S11 and S12, respectively.

Then, the orientation film A11 is formed on the electrode E11 of the substrate S11. On the electrode E12 of the substrate S12, the insulating film I1 and the orientation film A12 are successively formed.

Rubbing is not effected on the orientation films A11 and A12.

An annular wall made of the ultraviolet-curing resin or thermosetting resin is formed on the peripheral portion of one of the substrates S11 and S12. The wall made of this resin will form the seal wall SW for preventing leakage of the liquid crystal.

If providing the resin structures as described before, the resin structures, which have predetermined configurations and are patterned into a predetermined arrangement form, are arranged on the other substrate, i.e., the substrate other than the substrate provided with the resin wall forming the seal wall.

Then, the spacers SP are dispersed on the surface of at least one of the substrates S11 and S12 in a known method.

Then, a predetermined amount of droplets of the liquid crystal LCb is applied onto an end of one of the substrates.

Then, the end of the other substrate is laid over the end of the substrate carrying the liquid crystal LCb, and both the substrates are overlaid together while spreading the liquid crystal from the above end toward the other end. When overlaying the substrates, a heat and a pressure is applied. For example, a fixing device shown in FIG. 10 is used for overlaying the substrates.

In the above manner, the liquid crystal CB of the structure shown in FIG. 15 can be produced. The liquid crystal elements CG and CR can be manufactured in a similar manner.

The three liquid crystal elements prepared in this manner are adhered together in the predetermined order by an adhesive material such as adhesive or double-coated adhesive tape, and the light absorber layer BK is arranged on the outer side of the liquid crystal element CR so that the liquid crystal element LE1 is manufactured.

Instead of the manner of dispersing, in advance, the spacers on the substrate, the spacers may be dispersed within the liquid crystal before being dropped onto the substrate. In this manner, the spacers can be disposed between the substrates, and the thickness of the liquid crystal can be adjusted.

In the layered type liquid crystal element LE1 shown in FIG. 15, the liquid crystal layers Lb, Lg and Lr for display in blue, green and red are layered in this order from the observation side, and the orientation film is arranged for each liquid crystal layer. As already described, the orientation films A11 and A12 are provided for the liquid crystal layer Lb. Also, the orientation films A21 and A22 are provided for the liquid crystal layer Lg, and the orientation films A31 and A32 are provided for the liquid crystal layer Lr.

In the layered type liquid crystal element LE1, all the orientation films provided in the liquid crystal layers do not have a uniform pretilt angle. More specifically, the pretilt angle of the orientation film provided for at least one of the liquid crystal layers is different from the pretilt angle of the orientation film provided for another liquid crystal layer. In this layered type liquid crystal element LE1, the pretilt angle of the orientation film provided for the liquid crystal layer Lb nearest to the observation side is equal to or larger than those of the orientation films provided for the other liquid crystal layers Lg and Lr.

It is assumed that the orientation films A11 and A12 provided for the liquid crystal layer Lb nearest to the observation side have pretilt angles $\theta 11$ and $\theta 12$, respectively. Also, it is assumed that the orientation films A21 and A22 provided for the liquid crystal layer Lg arranged in the middle or intermediate position have pretilt angles $\theta 21$ and $\theta 22$, respectively, and the orientation films A31 and A32 provided for the liquid crystal layer Lr remotest from the observation side have pretilt angles $\theta 31$ and $\theta 32$, respectively.

In this example, the orientation films arranged for the same liquid crystal layer have the equal pretilt angles. Thus, the orientation films satisfy the relationship of $\theta 11 = \theta 12$ $(=\theta 1)$, $\theta 21 = \theta 22$ $(=\theta 2)$ and $\theta 31 = \theta 32$ $(=\theta 3)$.

As already described, the layered type liquid crystal element LE1 satisfies the relationship of $(\theta \geq \theta 2)$ and $(\theta 1 \geq \theta 3)$, and also satisfy the relationships of $(\theta > \theta 2)$ and/or $(\theta 1 > \theta 3)$.

In the layered type liquid crystal element LE1, for example, the pretilt angle θ1 for the liquid crystal layer Lb nearest to the observation side is larger than the pretilt angles θ2 and θ3 for the orientation films of the other liquid crystal layers Lg and Lr.

In the layered type liquid crystal element LE1, the pretilt angles of the orientation films affect the contrast of the whole element LE1, and the pretilt angle of the orientation film arranged for the liquid crystal layer Lb nearest to the observation side exerts the largest influence on the contrast of the whole element LE1.

In the layered type liquid crystal element LE1, the pretilt angle θ1 of the orientation film provided for the liquid crystal layer Lb nearest to the observation side is equal to or larger than the pretilt angle θ2 and θ3 of the orientation films provided for the other liquid crystal layers Lg and Lr. Therefore, it is possible to increase the transparency of the whole element LE1, which can be obtained when all the liquid crystal layers are transparent. Further, at least one of the orientation films which are provided for the liquid crystal layers Lg and Lr other than the liquid crystal layer Lb nearest to the observation side has the pretilt angle, which is smaller than the pretilt angle θ1 of the orientation film provided for the liquid crystal layer Lb nearest to the observation side. Thereby, intended brightness can be ensured. Owing to these features, the layered type liquid crystal element LE1 can perform bright display with high contrast.

In the layered type liquid crystal element LE1, no orientation film is subjected to the rubbing, as already described. Therefore, the liquid crystal molecules in the liquid crystal layers are inclined with respect to the substrates at a substantially uniform angle but in irregular random directions. Therefore, change in tone of the display colors can be smaller, e.g., even when the direction of view changes. Thus, the dependency on the angle of view is small in he layered type liquid crystal element LE1.

In the layered type liquid crystal element LE1, the orientation films provided for the liquid crystal layers Lg and Lr other than the liquid crystal layer Lb nearest to the observation side may have the equal pretilt angles, and thus may satisfy the relationship of θ2=θ3. This improves the manufacturing efficiency of the whole element LE1 because both the orientation films provided for the liquid crystal layers Lg and Lr can be formed on the substrates in the same manufacturing steps using the same material. Therefore, the layered type liquid crystal element LE1 can be inexpensive.

Description will now be given on experimental examples 26–33, in which the layered type liquid crystal elements of the ninth type were manufactured, and the contrast thereof were determined. The layered type liquid crystal elements of the experimental examples 26–33 have the same structures as the layered type liquid crystal element LE1 shown in FIG. 15, in which the liquid crystal elements (liquid crystal cells) for red, green and blue displays are layered. In each of the layered type liquid crystal elements of the experimental examples 26–33, the orientation films for the liquid crystal layer for blue display nearest to the observation side have the pretilt angle larger than the pretilt angles of the orientation films provided for the other liquid crystal layers for the green and red displays.

For comparison, layered type liquid crystal elements, in which the orientation films provided for the respective liquid crystal layers have the pretilt angles no satisfying the foregoing relationships, are manufactured, and the contrast thereof was determined (comparative experimental examples 9–11). In each of the layered type liquid crystal elements of the comparative examples 9 and 10, all the orientation films provided for the liquid crystal layers have the same pretilt angle. In the layered type liquid crystal element of the comparative example 11, the orientation films provided for the liquid crystal layer nearest to the observation side have the pretilt angle not exceeding the pretilt angle of the orientation film provided for at least one of the other liquid crystal layers. These comparative experimental examples 9–11 will also be described.

In all the experimental examples 26–33 and the comparative examples 9–11, the pretilt angles of the orientation films were measured at the room temperature in a crystal rotation method with nematic liquid crystal ZLI5081 (manufactured by Merck & Co.).

EXPERIMENTAL EXAMPLE 26

According to the experimental example 26, the liquid crystal elements for red, green and blue displays, which include the liquid crystal layers for red, green and blue displays, respectively, were manufactured in the following manner.

Liquid Crystal Element for Red Display
(liquid crystal element remotest from the observation side)

Polycarbonate (PC) films, on which transparent electrodes were already formed, were employed as a pair of substrates (first and second substrates) for forming the liquid crystal element for red display, and the orientation films and others were formed on the substrates in the following manner.

A polyimide-contained orientation film of 800 Å in thickness was formed on the transparent electrode formed on the first substrate. This orientation film has the pretilt angle of 5 degrees with respect to the nematic liquid crystal. Then, spacers (manufactured by Sekisui Finechemical Co., Ltd.) of 9 μm in diameter were dispersed on the orientation film.

On the transparent electrode arranged on the second substrate, a polyimide-contained insulating film of 2000 Å in thickness was formed. Further, a polyimide-contained orientation film of 800 Å in thickness was further formed on the insulating film. This orientation film on the second substrate has the pretilt angle of 5 degrees with respect to the nematic liquid crystal, which is equal to that of the orientation film on the first substrate.

Then, the seal material XN21S (manufactured by Mitsui Chemicals Co., Ltd.) was applied by screen printing onto the peripheral portion of the first substrate so that a wall of a predetermined height was formed. The wall made of this resin formed a seal wall for preventing leakage of the liquid crystal in a later stage.

Thereafter, the liquid crystal composition LCr of an amount, which was calculated from the area of the region surrounded by the wall of the seal material on the first substrate and the height of this seal wall, was applied onto the first substrate region. The liquid crystal composition LCr was chiral nematic liquid crystal formed by adding chiral material S-811 (manufactured by Merck & Co.) at 17% by weight to nematic liquid crystal having refractive index anisotropy value Δn of 0.18 and dielectric anisotropy Δε of 12. The liquid crystal composition LCr had the selective reflection wavelengths of about 680 nm (red region), and exhibited the cholesteric phase in the room temperature.

The first and second substrates were fixed together by the fixing device shown in FIG. 10 with the liquid crystal composition LCr therebetween. The liquid crystal cell thus prepared was subjected to heating at 150° C. for one hour so that the seal material was melted and adhered onto the first and second substrates. Thereafter, the element was cooled to the room temperature so that the liquid crystal element for red display was completed. The orientation films provided for this liquid crystal layer had the pretilt angle of 5 degrees.

Liquid Crystal Element For Green Display (liquid crystal element in the middle position)

The liquid crystal element for green display was prepared similarly to the liquid crystal element for red display except for the followings.

The liquid crystal element for green display employed spacers of 7 μm in diameter instead of spacers of 9 μm in diameter. Thus, the liquid crystal element for green display included the liquid crystal layer of 7 μm in thickness.

The liquid crystal element for green display employed liquid crystal composition LCg as the liquid crystal held between the two substrates. The liquid crystal composition LCg is chiral nematic liquid crystal formed by adding chiral material S-811 (manufactured by Merck & Co.) at 22% by weight to nematic liquid crystal having refractive index anisotropy value Δn of 0.15 and dielectric anisotropy Δε of 11. The liquid crystal composition LCg had the selective reflection wavelengths of about 560 nm (green region), and exhibited the cholesteric phase in the room temperature.

The liquid crystal element for green display thus prepared included the liquid crystal layer for green display, and the orientation films provided for this liquid crystal layer had the pretilt angle of 5 degrees.

Liquid Crystal Element for Blue Display (liquid crystal element nearest to the observation side)

The liquid crystal element for blue display was prepared similarly to the liquid crystal element for red display except or the followings.

The liquid crystal element for blue display employed spacers of 5 μm in diameter instead of spacers of 9 μm in diameter. Thus, the liquid crystal element for blue display included the liquid crystal layer of 5 μm in thickness.

The liquid crystal element for blue display employed liquid crystal composition LCb as the liquid crystal held between the two substrates. The liquid crystal composition LCb is chiral nematic liquid crystal formed by adding chiral material S-811 (manufactured by Merck & Co.) at 26% by weight to nematic liquid crystal having refractive index anisotropy value Δn of 0.16 and dielectric anisotropy Δε of 11. The liquid crystal composition LCb had the selective reflection wavelengths of about 480 mm (blue region), and exhibited the cholesteric phase in the room temperature.

The orientation films provided for this liquid crystal element for green display thus prepared had the pretilt angle of 7 degrees with respect to the nematic liquid crystal.

The liquid crystal element for blue display thus prepared included the liquid crystal layer for blue display, and the orientation films provided for this liquid crystal layer had the pretilt angle of 7 degrees.

The liquid crystal elements for red, green and blue displays thus prepared were adhered together in this order.

The neighboring liquid crystal elements were adhered together. Then, the black light absorber film was disposed on the outer side of the liquid crystal element for red display, which was located remotest from the observation side.

In these manners, the layered type liquid crystal element was prepared. The orientation films provided for the liquid crystal layers for red, green and blue displays of the layered type liquid crystal element of this experimental example had the pretilt angles of 5, 5 and 7 degrees, respectively. Thus, the pretilt angle of the orientation film provided for the liquid crystal: layer (liquid crystal layer for blue display) nearest to the observation side was larger than the pretilt angles of the orientation films provided for the other liquid crystal layers.

The characteristics of the layered type liquid crystal element thus prepared were measured by the reflective spectrocolorimeter CM-3700d (manufactured by Minolta Co., Ltd.). Y-values (white) were measured when the liquid crystal layers of the respective liquid crystal elements were kept in the selective reflection state (planar orientation state) and the white display was performed. Also, Y-values (black) were measured when the liquid crystal layers of the respective liquid crystal elements were kept in the transparent state (focal conic orientation state) and the black display was performed. When the liquid crystal layers of the respective liquid crystal elements were transparent, the color (black) of the light absorber film arranged on the outer side of the liquid crystal element for red display was displayed. The Y-value is a luminous reflectance. The larger value in contrast represents better contrast.

The layered type liquid crystal element of the experimental example 26 had good white display characteristics and good black display characteristics, and exhibited good contrast of 6.0. Particularly, it had good black display characteristics. More specifically, the light scattering was small, the transparency is high and the Y-value (black) is high when the respective liquid crystal layers were in the transparent state. Therefore, the layered type liquid crystal element of this example had good contrast.

EXPERIMENTAL EXAMPLE 27

According to the experimental example 27, the layered type liquid crystal element including the liquid crystal elements for red, green and blue displays layered in this order was manufactured similarly to the experimental example 26 except for the followings.

In the experimental example 27, the orientation films provided for the liquid crystal layer for blue display had the pretilt angle of 9 degrees with respect to the nematic liquid crystal. Thus, the orientation films provided for the liquid crystal layers for red, green and blue displays of the layered type liquid crystal element of this experimental example had the pretilt angles of 5, 5 and 9 degrees, respectively. In the layered type liquid crystal element of this experimental example 27, the pretilt angle of each of the orientation films provided for the liquid crystal layer (liquid crystal layer for blue display) nearest to the observation side is larger than the pretilt angles of the orientation films provided for the other liquid crystal layers, similarly to the layered type liquid crystal element of the experimental example 26.

The characteristics of the layered type liquid crystal element prepared in the experimental example 27 were measured similarly to the experimental example 26.

The layered type liquid crystal element of the experimental example 27 had good white display characteristics and good black display characteristics, and exhibited good contrast of 6.5. Particularly, it had good black display characteristics so that the layered type liquid crystal element of this example had good contrast.

EXPERIMENTAL EXAMPLE 28

According to the experimental example 28, the layered type liquid crystal element including the liquid crystal elements for red, green and blue displays layered in this order was manufactured similarly to the experimental example 26 except for the followings.

In the experimental example 28, the orientation films provided for the liquid crystal layer for blue display had the pretilt angle of 8 degrees with respect to the nematic liquid crystal. Thus, the orientation films provided for the liquid crystal layers for red, green and blue displays of the layered type liquid crystal element of this experimental example had the pretilt angles of 5, 5 and 8 degrees, respectively. In the layered type liquid crystal element of this experimental example 28, the pretilt angle of each of the orientation films provided for the liquid crystal layer (liquid crystal layer for blue display) nearest to the observation side was larger than the pretilt angles of the orientation films provided for the other liquid crystal layers, similarly to the layered type liquid crystal element of the experimental example 26.

The characteristics of the layered type liquid crystal element prepared in the experimental example 28 were measured similarly to the experimental example 26.

The layered type liquid crystal element of the experimental example 28 had good white display characteristics and good black display characteristics, and exhibited good contrast of 6.2. Particularly, it had good black display characteristics so that the layered type liquid crystal element of this example had good contrast.

EXPERIMENTAL EXAMPLE 29

According to the experimental example 29, the layered type liquid crystal element including the liquid crystal elements for red, green and blue displays layered in this order was manufactured similarly to the experimental example 26 except for the followings.

In the experimental example 29, the orientation films provided for the liquid crystal layer for red display had the pretilt angle of 3 degrees with respect to the nematic liquid crystal. Thus, the orientation films provided for the liquid crystal layers for red, green and blue displays of the layered type liquid crystal element of this experimental example had the pretilt angles of 3, 5 and 7 degrees, respectively. In the layered type liquid crystal element of this experimental example 29, the pretilt angle of each of the orientation films provided for the liquid crystal layer (liquid crystal layer for blue display) nearest to the observation side was larger than the pretilt angles of the orientation films provided for the other liquid crystal layers, similarly to the layered type liquid crystal element of the experimental example 26.

The characteristics of the layered type liquid crystal element prepared in the experimental example 29 were measured similarly to the experimental example 26.

The layered type liquid crystal element of the experimental example 29 had good white display characteristics and good black display characteristics, and exhibited good contrast of 6.1. Particularly, it had good black display characteristics so that the layered type liquid crystal element of this example had good contrast.

EXPERIMENTAL EXAMPLE 30

According to the experimental example 30, the layered type liquid crystal element including the liquid crystal elements for red, green and blue displays layered in this order was manufactured similarly to the experimental example 26 except for the followings.

In the experimental example 30, the orientation films provided for the liquid crystal layer for red display had the pretilt angle of 3 degrees with respect to the nematic liquid crystal. Further, the orientation films provided for the liquid crystal layer for green display had the pretilt angle of 3 degrees with respect to the nematic liquid crystal. Thus, the orientation films provided for the liquid crystal layers for red, green and blue displays of the layered type liquid crystal element of this experimental example had the pretilt angles of 3, 3 and 7 degrees, respectively. In the layered type liquid crystal element of this experimental example 30, the pretilt angle of each of the orientation films provided for the liquid crystal layer (liquid crystal layer for blue display) nearest to the observation side was larger than the pretilt angles of the orientation films provided for the other liquid crystal layers, similarly to the layered type liquid crystal element of the experimental example 26.

The characteristics of the layered type liquid crystal element prepared in the experimental example 30 were measured similarly to the experimental example 26.

The layered type liquid crystal element of the experimental example 30 had good white display characteristics and good black display characteristics, and exhibited good contrast of 5.8. Particularly, it had good black display characteristics so that the layered type liquid crystal element of this example had good contrast.

EXPERIMENTAL EXAMPLE 31

According to the experimental example 31, the layered type liquid crystal element including the liquid crystal elements for red, green and blue displays layered in this order was manufactured similarly to the experimental example 26 except for the followings.

In the experimental example 31, the orientation films provided for the liquid crystal layer for red display had the pretilt angle of 6 degrees with respect to the nematic liquid crystal. Also, the orientation films provided for the liquid crystal layer for green display had the pretilt angle of 6 degrees with respect to the nematic liquid crystal. Further, the orientation films provided for the liquid crystal layer for blue display had the pretilt angle of 8 degrees with respect to the nematic liquid crystal. Thus, the orientation films provided for the liquid crystal layers for red, green and blue displays of the layered type liquid crystal element of this experimental example had the pretilt angles of 6, 6 and 8 degrees, respectively. In the layered type liquid crystal element of this experimental example 31, the pretilt angle of each of the orientation films provided for the liquid crystal layer (liquid crystal layer for blue display) nearest to the observation side was larger than the pretilt angles of the orientation films provided for the other liquid crystal layers, similarly to the layered type liquid crystal element of the experimental example 26.

The characteristics of the layered type liquid crystal element prepared in the experimental example 31 were measured similarly to the experimental example 26.

The layered type liquid crystal element of the experimental example 31 had good white display characteristics and good black display characteristics, and exhibited good contrast of 6.2. Particularly, it had good black display characteristics so that the layered type liquid crystal element of this example had good contrast.

EXPERIMENTAL EXAMPLE 32

According to the experimental example 32, the layered type liquid crystal element including the liquid crystal elements for red, green and blue displays layered in this order was manufactured similarly to the experimental example 26 except for the followings.

In the experimental example 32, the orientation films provided for the liquid crystal layer for red display had the pretilt angle of 4 degrees with respect to the nematic liquid crystal. Also, the orientation films provided for the liquid crystal layer for blue display had the pretilt angle of 9 degrees with respect to the nematic liquid crystal. Thus, the orientation films provided for the liquid crystal layers for red, green and blue displays of the layered type liquid crystal element of this experimental example had the pretilt angles of 4, 5 and 9 degrees, respectively. In the layered type liquid crystal element of this experimental example 32, the pretilt angle of each of the orientation films provided for the liquid crystal layer (liquid crystal layer for blue display) nearest to the observation side was larger than the pretilt angles of the orientation films provided for the other liquid crystal layers, similarly to the layered type liquid crystal element of the experimental example 26.

The characteristics of the layered type liquid crystal element prepared in the experimental example 32 were measured similarly to the experimental example 26.

The layered type liquid crystal element of the experimental example 32 had good white display characteristics and good black display characteristics, and exhibited good contrast of 6.0. Particularly, it had good black display characteristics so that the layered type liquid crystal element of this example had good contrast.

EXPERIMENTAL EXAMPLE 33

According to the experimental example 33, the layered type liquid crystal element including the liquid crystal elements for red, green and blue displays layered in this order was manufactured similarly to the experimental example 26 except for the followings.

In the experimental example 33, the orientation films provided for the liquid crystal layer for red display had the pretilt angle of 3 degrees with respect to the nematic liquid crystal. Also, the orientation films provided for the liquid crystal layer for green display had the pretilt angle of 3 degrees with respect to the nematic liquid crystal. Further, the orientation films provided for the liquid crystal layer for blue display had the pretilt angle of 5 degrees with respect to the nematic liquid crystal. Thus, the orientation films provided for the liquid crystal layers for red, green and blue displays of the layered type liquid crystal element of this experimental example had the pretilt angles of 3, 3 and 5 degrees, respectively. In the layered type liquid crystal element of this experimental example 33, the pretilt angle of each of the orientation films provided for the liquid crystal layer (liquid crystal layer for blue display) nearest to the observation side was larger than the pretilt angles of the orientation films provided for the other liquid crystal layers, similarly to the layered type liquid crystal element of the experimental example 26.

The characteristics of the layered type liquid crystal element prepared in the experimental example 33 were measured similarly to the experimental example 26.

The layered type liquid crystal element of the experimental example 33 had good white display characteristics and good black display characteristics, and exhibited good contrast of 4.9. Particularly, it had good white display characteristics so that the layered type liquid crystal element of this example had good contrast.

Comparative Experimental Example 9

According to the comparative example 9, the layered type liquid crystal element including the liquid crystal elements for red, green and blue displays layered in this order was manufactured similarly to the experimental example 26 except for the followings.

In the comparative example 9, the orientation films provided for the liquid crystal layer for blue display had the pretilt angle of 5 degrees with respect to the nematic liquid crystal. Thus, the orientation films provided for the liquid crystal layers for red, green and blue displays of the layered type liquid crystal element of this comparative example had the pretilt angles of 5, 5 and 5 degrees, respectively.

The characteristics of the layered type liquid crystal element prepared in the comparative example 9 were measured similarly to the experimental example 26.

The layered type liquid crystal element of the comparative example 9 exhibited contrast of 3.7, and thus had bad contrast. Particularly, it had bad black display characteristics (large Y-value (black)) so that the contrast is low.

Comparative Experimental Example 10

According to the comparative example 10, the layered type liquid crystal element including the liquid crystal elements for red, green and blue displays layered in this order was manufactured similarly to the experimental example 26 except for the followings.

In the comparative example 10, the orientation films provided for the liquid crystal layer for red display had the pretilt angle of 7 degrees with respect to the nematic liquid crystal. Also, the orientation films provided for the liquid crystal layer for green display had the pretilt angle of 7 degrees with respect to the nematic liquid crystal. Thus, the orientation films provided for the liquid crystal layers for red, green and blue displays of the layered type liquid crystal element of this comparative example had the pretilt angles of 7, 7 and 7 degrees, respectively.

The characteristics of the layered type liquid crystal element prepared in the comparative example 10 were measured similarly to the experimental example 26.

The layered type liquid crystal element of the comparative example 10 exhibited contrast of 4.2, and thus had bad contrast. Particularly, it had bad white display characteristics (small Y-value (white)) so that the brightness is low, and the contrast is low.

Comparative Experimental Example 11

According to the comparative example 11, the layered type liquid crystal element including the liquid crystal elements for red, green and blue displays layered in this order was manufactured similarly to the experimental example 26 except for the followings.

In the comparative example 11, the orientation films provided for the liquid crystal layer for red display had the pretilt angle of 7 degrees with respect to the nematic liquid crystal. Also, the orientation films provided for the liquid crystal layer for blue display had the pretilt angle of 5 degrees with respect to the nematic liquid crystal. Thus, the orientation films provided for the liquid crystal layers for red, green and blue displays of the layered type liquid crystal element of this comparative example had the pretilt angles of 7, 5 and 5 degrees, respectively. In the layered type liquid crystal element of this comparative example 11, the pretilt angle of each of the orientation films provided for the liquid crystal layer (liquid crystal layer for blue display) nearest to the observation side is equal to or lower, than the pretilt angles of the orientation films provided for the other liquid crystal layers.

The characteristics of the layered type liquid crystal element prepared in the comparative example 11 were measured similarly to the experimental example 26.

The layered type liquid crystal element of the comparative example 11 exhibited contrast of 3.5, and thus had bad contrast. Particularly, it had bad black display characteristics (large Y-value (black)) so that the contrast is low.

The following table 5 represents the results of the experimental examples 26–33 and the comparative experimental examples 9–11 described above.

TABLE 5

| | Pretilt Angle of Orientation Film for Remotest side Layer (Red) | Pretilt Angle of Orientation Film for Intermediate Layer (Green) | Pretilt Angle of Orientation Film for Observation side Layer (Blue) | Contrast |
|---|---|---|---|---|
| Ex. 26 | 5° | 5° | 7° | 6.0 |
| Ex. 27 | 5° | 5° | 9° | 6.5 |
| Ex. 28 | 5° | 5° | 8° | 6.2 |
| Ex. 29 | 3° | 5° | 7° | 6.1 |
| Ex. 30 | 3° | 3° | 7° | 5.8 |
| Ex. 31 | 6° | 6° | 8° | 6.2 |
| Ex. 32 | 4° | 5° | 9° | 6.0 |
| Ex. 33 | 3° | 3° | 5° | 4.9 |
| C. Ex. 9 | 5° | 5° | 5° | 3.7 |
| C. Ex. 10 | 7° | 7° | 7° | 4.2 |
| C. Ex. 11 | 7° | 5° | 5° | 3.5 |

Ex.: Experimental Example
C. Ex.: Comparative Experimental Example

In the layered type liquid crystal elements in the experimental examples 26–33, as can be seen from the table 5, the orientation films provided for the liquid crystal layers nearest to the observation side (i.e., liquid crystal layer for blue display) had the pretilt angles larger than the pretilt angles of the orientation films provided for the other liquid crystal layers, and these layered type liquid crystal elements could achieve better contrast than the layered type liquid crystal elements of the comparative examples 9–11, in which the pretilt angles had the relationships other than the above. It can be considered that good contrast can be achieved even by the structure including the orientation film, which is provided for the liquid crystal layer nearest to the observation side, and has the pretilt angle equal to or larger than the pretilt angles of the orientation films provided for the other liquid crystal layers, if the orientation films provided for the liquid crystal layers other than the liquid crystal layer nearest to the observation side includes the orientation film having the smaller pretilt angle than the orientation film provided for the liquid crystal layer nearest to the observation side.

It can be understood from the experimental examples 26, 27, 28, 30, 31 and 33 that good contrast can be achieved by the structure, in which the orientation films provided for the liquid crystal layers (for green and red display) other than the liquid crystal layer (for blue display) nearest to the observation side have the pretilt angles smaller than the orientation film provided for the liquid crystal layer nearest to the observation side, even if the orientation films provided for the liquid crystal layers (for green and red display) other than the liquid crystal layer (for blue display) nearest to the observation side have the equal pretilt angles.

The following can also be seen. If the orientation film provided for the liquid crystal layer nearest to the observation side has the pretilt angle of 5 degrees (preferably, 7 degrees) or more, good contrast can be achieved. If the orientation film provided for the liquid crystal layer other than that nearest to the observation side has the pretilt angle of 3 degrees (preferably, 5 degrees) or more, good contrast can be achieved.

From the results of the comparative example 11 and others, the following can be seen. If the orientation film, which is provided for the liquid crystal layer nearest to the observation side, has the pretilt angle equal to or smaller than the pretilt angles of the orientation films provided for the other liquid crystal layers in contrast to the invention, good contrast cannot be achieved.

Figure 17:
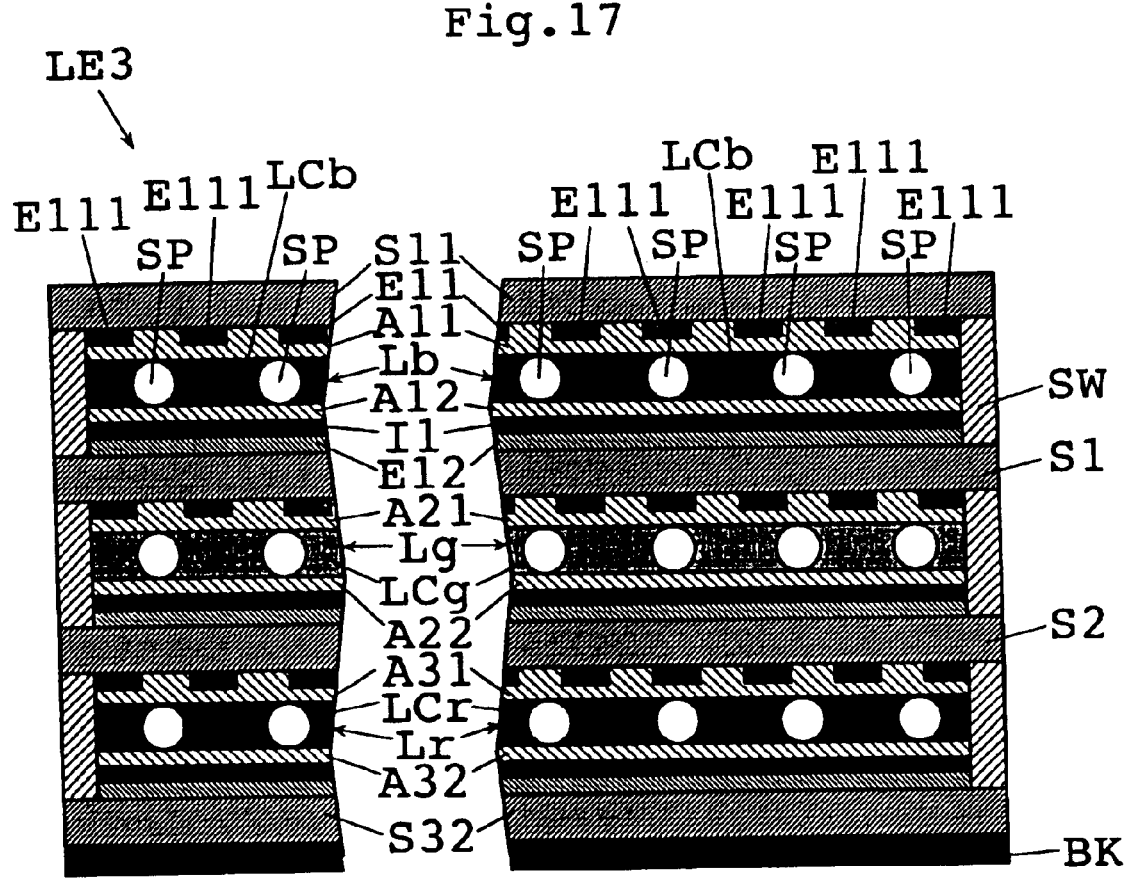

In the layered type liquid crystal element of the ninth type, only one substrate may be disposed between the neighboring liquid crystal layers, and may be utilized commonly for holding the liquid crystal layers, as is done, e.g., in the layered type liquid crystal element LE3 shown in FIG. 17.

In the layered type liquid crystal element LE3 shown in FIG. 17, a substrate S1 is disposed between the neighboring liquid crystal layers Lb and Lg, and a substrate S2 is disposed between the neighboring liquid crystal layers Lg and Lr. The orientation film A12 and others provided for the liquid crystal layer Lb are formed on one of the surfaces of the substrate S1, and the orientation film A21 and others provided for the liquid crystal layer Lg are formed on the other surface. Similar structures are employed for the substrate S2.

In the layered type liquid crystal element LE3, the liquid crystal layer Lb is held between the substrates S11 and S1. The liquid crystal layer Lg is held between the substrates S1 and S2. The liquid crystal layer Lr is held between the substrates S2 and S32. Thus, the substrate S1 is utilized commonly for holding the liquid crystal layers Lb and Lg and other purposes. Likewise, the substrate S2 is utilized commonly for holding the liquid crystal layers Lg and Lr and other purposes.

This layered type liquid crystal element LE3 can achieve high contrast by employing the orientation films, which are provided for the respective liquid crystal layers, and have the pretilt angles satisfying the relationships similar to that of the layered type liquid crystal element LE1.

The layered type liquid crystal element LE3 can reduce the whole thickness, compared with the layered type liquid crystal element LE1 and others.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A liquid crystal element of a layered type comprising:
    a plurality of liquid crystal elements layered and adhered together, wherein
    each of said liquid crystal elements has a pair of substrates and a liquid crystal layer held between said substrates, and an adhesive layer disposed between the neighboring substrates of the neighboring liquid crystal elements for adhering the neighboring liquid crystal elements has a thickness not exceeding a quarter of a thickness of at least one of the neighboring substrates.

2. The liquid crystal element of the layered type according to claim 1, wherein
    the thickness of said adhesive layer is 30 $\mu$m or less.

3. The liquid crystal element of the layered type according to claim 1, wherein
    the thickness of said substrate is in a range from 50 $\mu$m to 250 $\mu$m.

4. The liquid crystal element of the layered type according to claim 1, wherein
    said liquid crystal elements layered together are three or more in number.

5. The liquid crystal element of the layered type according to claim 1, wherein
    said substrate is formed of a resin substrate.

* * * * *